US012133153B2

(12) United States Patent
Raghothaman et al.

(10) Patent No.: US 12,133,153 B2
(45) Date of Patent: Oct. 29, 2024

(54) FRONTHAUL INTERFACE FOR USE WITH A CLOUD RADIO ACCESS NETWORK

(71) Applicant: CommScope Technologies LLC, Hickory, NC (US)

(72) Inventors: Balaji B Raghothaman, Chester Springs, PA (US); Irfaan Ahamed Salahuddeen, Acton, MA (US); Arthur J. Barabell, Sudbury, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/048,724

(22) Filed: Oct. 21, 2022

(65) Prior Publication Data

US 2023/0131685 A1 Apr. 27, 2023

Related U.S. Application Data

(63) Continuation of application No. 16/918,691, filed on Jul. 1, 2020, now Pat. No. 11,496,943.

(Continued)

(51) Int. Cl.
*H04W 40/02* (2009.01)
*H04L 5/00* (2006.01)
(Continued)

(52) U.S. Cl.
CPC ........... *H04W 40/02* (2013.01); *H04L 5/0044* (2013.01); *H04L 5/0048* (2013.01);
(Continued)

(58) Field of Classification Search
CPC . H04W 88/02; H04W 74/0833; H04W 76/15; H04W 12/06; H04W 80/08;
(Continued)

(56) References Cited

U.S. PATENT DOCUMENTS 7,260,558 B1 8/2007 Cheng et al.
9,961,688 B1 5/2018 Anvari
(Continued)

FOREIGN PATENT DOCUMENTS

CN 105703811 A 6/2016
CN 105981417 A 9/2016
(Continued)

OTHER PUBLICATIONS

Boivie et al., "Explicit Multicast (Xcast) Concepts and Options", Network Working Group, Request for Comments: 5058, Nov. 2007, pp. 1 through 35.
(Continued)

*Primary Examiner* — Yee F Lam
(74) *Attorney, Agent, or Firm* — Fogg & Powers LLC

(57) ABSTRACT

A system includes a plurality of remote units; a centralized unit communicatively coupled to the plurality of remote units via a fronthaul network; and an entity that performs deep packet inspection. The centralized unit transmits sets of data to the plurality of remote units across the fronthaul network in packets, each of the sets of data mapped to at least one of the plurality of remote units and each of the packets including a respective indicator indicating each remote unit the associated packet is intended for, wherein each indicator comprises a plurality of bit positions where each bit position is mapped to a different one of the plurality of remote units. The entity performs the deep packet inspection on the packets to determine each remote unit the packets are intended for and communicate each packet to each remote unit the packet is intended for over the fronthaul network.

20 Claims, 23 Drawing Sheets

Related U.S. Application Data

(60) Provisional application No. 62/956,402, filed on Jan. 2, 2020, provisional application No. 62/895,625, filed on Sep. 4, 2019, provisional application No. 62/870,025, filed on Jul. 2, 2019.

(51) Int. Cl.

| | | |
|---|---|---|
| *H04L 12/18* | (2006.01) | |
| *H04L 69/164* | (2022.01) | |
| *H04L 69/22* | (2022.01) | |
| *H04W 4/06* | (2009.01) | |
| *H04W 24/10* | (2009.01) | |
| *H04W 72/04* | (2023.01) | |
| *H04W 72/21* | (2023.01) | |
| *H04W 88/08* | (2009.01) | |
| *H04W 92/20* | (2009.01) | |

(52) U.S. Cl.
CPC ........ *H04L 12/1845* (2013.01); *H04L 69/164* (2013.01); *H04L 69/22* (2013.01); *H04W 4/06* (2013.01); *H04W 24/10* (2013.01); *H04W 72/04* (2013.01); *H04W 72/21* (2023.01); *H04W 88/085* (2013.01); *H04W 92/20* (2013.01); *H04L 12/189* (2013.01)

(58) Field of Classification Search
CPC ...... H04W 80/02; H04W 88/08; H04B 7/024; H04B 7/0404; H04B 7/086; H04B 7/0617; H04L 25/0226; H04L 5/0053; H04L 5/0051; H04L 27/364
See application file for complete search history.

(56) References Cited

U.S. PATENT DOCUMENTS

| | | | |
|---|---|---|---|
| 10,158,573 | B1 | 12/2018 | Lee et al. |
| 10,652,898 | B2 | 5/2020 | Qvarfordt et al. |
| 10,779,211 | B2 | 9/2020 | Lee et al. |
| 10,904,752 | B2 | 1/2021 | Kim et al. |
| 11,082,118 | B2 | 8/2021 | Raghavan et al. |
| 11,089,640 | B2 | 8/2021 | Gao et al. |
| 11,438,822 | B2 | 9/2022 | Salahuddeen et al. |
| 2005/0157675 | A1 | 7/2005 | Feder et al. |
| 2008/0201772 | A1 | 8/2008 | Mondaeev et al. |
| 2010/0234035 | A1 | 9/2010 | Fujishima et al. |
| 2011/0287791 | A1 | 11/2011 | Fujishima et al. |
| 2011/0299427 | A1 | 12/2011 | Chu et al. |
| 2012/0287914 | A1 | 11/2012 | Smith |
| 2013/0188640 | A1 | 7/2013 | Cors et al. |
| 2014/0031049 | A1 | 1/2014 | Sundaresan et al. |
| 2014/0219162 | A1 | 8/2014 | Eyuboglu et al. |
| 2014/0233359 | A1 | 8/2014 | Ishida et al. |
| 2014/0233591 | A1 | 8/2014 | Cho et al. |
| 2016/0037550 | A1 | 2/2016 | Barabell et al. |
| 2016/0135227 | A1 | 5/2016 | Hahn et al. |
| 2016/0174128 | A1 | 6/2016 | Oren et al. |
| 2016/0191372 | A1 | 6/2016 | Zhang et al. |
| 2016/0234773 | A1 | 8/2016 | Choi et al. |
| 2016/0242147 | A1 | 8/2016 | Tarlazzi et al. |
| 2016/0277201 | A1 | 9/2016 | Thubert et al. |
| 2016/0277964 | A1 | 9/2016 | Xu et al. |
| 2016/0353424 | A1 | 12/2016 | Stirling-Gallacher et al. |
| 2016/0365957 | A1 | 12/2016 | Lee et al. |
| 2017/0104669 | A1 | 4/2017 | Bell et al. |
| 2017/0126853 | A1 | 5/2017 | Goel et al. |
| 2017/0164336 | A1 | 6/2017 | Boldi et al. |
| 2017/0178492 | A1 | 6/2017 | de Cordes et al. |
| 2018/0020382 | A1 | 1/2018 | Kim et al. |
| 2018/0070246 | A1 | 3/2018 | Jack et al. |
| 2018/0287696 | A1 | 10/2018 | Barbieri et al. |
| 2018/0332614 | A1 | 11/2018 | Shanmugaraju et al. |
| 2019/0069187 | A1 | 2/2019 | Ashrafi |
| 2019/0116533 | A1 | 4/2019 | Lee et al. |
| 2019/0149988 | A1* | 5/2019 | Kim ....................... H04B 7/086 726/3 |
| 2019/0190820 | A1 | 6/2019 | Roeland et al. |
| 2019/0245740 | A1 | 8/2019 | Kachhla |
| 2019/0357173 | A1 | 11/2019 | Sandberg |
| 2020/0053738 | A1 | 2/2020 | Harada et al. |
| 2020/0128414 | A1* | 4/2020 | Mishra ................ H04W 72/542 |
| 2020/0214022 | A1 | 7/2020 | Harstead et al. |
| 2020/0245206 | A1 | 7/2020 | Allan |
| 2020/0337113 | A1 | 10/2020 | Na et al. |
| 2020/0344715 | A1 | 10/2020 | Radian |
| 2021/0006371 | A1 | 1/2021 | Raghothaman et al. |
| 2021/0006944 | A1 | 1/2021 | Raghothaman et al. |
| 2021/0007039 | A1 | 1/2021 | Salahuddeen et al. |
| 2022/0174577 | A1 | 6/2022 | Raghothaman et al. |
| 2022/0256432 | A1 | 8/2022 | Salahuddeen et al. |

FOREIGN PATENT DOCUMENTS

| | | |
|---|---|---|
| CN | 108541360 A | 9/2018 |
| CN | 108777875 A | 11/2018 |
| CN | 208777875 U | 4/2019 |
| EP | 0619662 A2 | 10/1994 |
| EP | 0619662 A3 | 11/1995 |
| EP | 3176960 A1 | 6/2017 |
| JP | 2015520556 A | 7/2015 |
| WO | 2016208614 A1 | 12/2016 |
| WO | 2017010693 A1 | 1/2017 |
| WO | 2017169064 A1 | 10/2017 |
| WO | 2018009340 A1 | 1/2018 |
| WO | 2018233809 A1 | 12/2018 |

OTHER PUBLICATIONS

China National Intellectual Property Administration, "Notification of the First Office Action from CN Application No. 202080056388.0 dated Aug. 10, 2022", from Foreign Counterpart to U.S. Appl. No. 16/918,691, pp. 1 through 11, Published: CN.

CPRI, "Common Public Radio Interface (CPRI); Interface Specification", CPRI Specification V6.0, Aug. 30, 2013, pp. 1 through 128, Ericsson AB.

CPRI, "Common Public Radio Interface; eCPRI Interface Specification", eCPRI Specification V2.0, May 10, 2019, pp. 1 through 109, Ericsson AB.

Wikipedia, "Multilayer Switch", Oct. 27, 2018, pp. 1 through 6, https://en.wikipedia.org/w/index.php?title=Multilayer_switch&oldid=865995718.

U.S. Patent and Trademark Office, "Restriction Requirement", U.S. Appl. No. 16/918,715, Jan. 27, 2022, pp. 1 through 6, Published: US.

U.S. Patent and Trademark Office, "Office Action", U.S. Appl. No. 16/918,738, Jul. 22, 2021, pp. 1 through 34, Published: US.

International Searching Authority, "International Search Report and Written Opinion from PCT Application No. PCT/US2020/040519", from Foreign Counterpart to U.S. Appl. No. 16/918,715, filed Oct. 13, 2020, pp. 1 through 10, Published: WO.

International Searching Authority, "International Search Report and Written Opinion from PCT Application No. PCT/US2020/040521", from Foreign Counterpart to U.S. Appl. No. 16/918,738, filed Oct. 22, 2020, pp. 1 through 12, Published: WO.

International Searching Authority, "International Search Report and Written Opinion from PCT Application No. PCT/US2020/040541", from Foreign Counterpart to U.S. Appl. No. 16/918,691, filed Oct. 22, 2020, pp. 1 through 10, Published: WO.

O-RAN, "O-RAN Fronthaul Working Group Control, User and Synchronization Plane Specification", ORAN-WG4. CUS.0-v01.00 Technical Specification, at least as early as Feb. 1, 2019, pp. 1 through 186, O-RAN Alliance.

Salahuddeen, Irfaan A., "Fronthaul Interface for a Centralized Radio Access Network", U.S. Appl. No. 15/931,367, filed May 13, 2020, pp. 1 through 58, Published: US.

Samsung, "Function split between central and remote node (fronthaul)", 3GPP TSG-RAN WG2 Meeting #93bis, Dubrovnik, Croatia, Apr. 11-15, 2016, R2-162229, pp. 1 through 3.

(56) References Cited

OTHER PUBLICATIONS

U.S. Patent and Trademark Office, "Final Office Action", U.S. Appl. No. 16/918,691, Mar. 7, 2022, pp. 1 through 18, Published: US.

U.S. Patent and Trademark Office, "Final Office Action", U.S. Appl. No. 16/918,715, Aug. 1, 2022, pp. 1 through 33, Published: US.

U.S. Patent and Trademark Office, "Notice of Allowance", U.S. Appl. No. 16/918,691, Jul. 7, 2022, pp. 1 through 18, Published: US.

U.S. Patent and Trademark Office, "Notice of Allowance", U.S. Appl. No. 16/918,738, Feb. 16, 2022, pp. 1 through 13, Published: US.

U.S. Patent and Trademark Office, "Notice of Allowance", U.S. Appl. No. 16/918,738, Apr. 15, 2022, pp. 1 through 11, Published: US.

U.S. Patent and Trademark Office, "Notice of Allowance", U.S. Appl. No. 17,674,433, Jul. 27, 2022, pp. 1 through 42, Published: US.

U.S. Patent and Trademark Office, "Office Action", U.S. Appl. No. 16/918,691, Oct. 1, 2021, pp. 1 through 30, Publsihed: US.

U.S. Patent and Trademark Office, "Office Action", U.S. Appl. No. 16/918,715, Mar. 21, 22, pp. 1 through 58, Published: US.

U.S. Patent and Trademark Office, "Office Action", U.S. Appl. No. 16/918,715, Feb. 13, 2023, pp. 1 through 33, Published: US.

Japanese Patent Office, "Notice of Reason for Rejection", from JP Application No. 2021-578036, Feb. 24, 2023, from Foreign Counterpart to U.S. Appl. No. 16/918,691, pp. 1 through 6, Published: JP.

U.S. Patent and Trademark Office, "Notice of Allowance", U.S. Appl. No. 17/726,732, Apr. 17, 2023, pp. 1 through 16, Published: US.

U.S. Patent and Trademark Office, "Notice of Allowance", U.S. Appl. No. 16/918,715, Jul. 25, 2023, pp. 1 through 33, Published: US.

Chen et al., "Robust Resource Allocation and Clustering Formulation for Multicast C-RAN with Impaired CSI", 2017 IEEE International Conference on Communications (ICC), IEEE, May 21, 2017, pp. 1 through 6, XP033132545.

China National Intellectual Property Administration, "Notification of the First Office Action", from CN Application No. 202080057586.9, Jun. 22, 2023, from Foreign Counterpart to U.S. Appl. No. 16/918,738, pp. 1 through 12, Published: CN.

European Patent Office, "Extended European Search Report", from EP Application No. 20834918.3, from Foreign Counterpart to U.S. Appl. No. 16/918,691, filed Jun. 27, 2023, pp. 1 through 14, Published: EP.

Kim et al., "Grouped NOMA Multicast Transmission for F-RAN With Wireless Fronthaul and Edge Caching", 2019 16th International Symposium on Wireless Communication Systems (ISWCS), IEEE, Aug. 27, 2019, pp. 145 through 149, XP033636262.

Redana et al., "5G PPP Architecture Working Group—View on 5G Architecture, Version 3.0", Jun. 19, 2019, retrieved on Jun. 10, 2020 from https://5g-ppp.eu/wp/content/uploads/2019/07/5G-PPP-5G Architecture-White-Paper_v3.0_PublicConsultation.pdf, pp. 1 through 166, XP055736939.

Vargas et al.., "RAN Logical Architecture and Interfaces for 5G-Xcast", Feb. 28, 2019, retrieved Nov. 27, 2019 from http://5g-xcast.eu/wp-content/uploads/2019/03/5G-Scast_D3.3_v2.0_web.pdf, pp. 1 through 95, XP055646813.

ZTE, "Discussion on the protocol architecture for standalone NR", 3GPP TSG-RAN2 Meeting #93bis, R2-162623, Drubrovnik, Croatia, Apr. 11-15, 2016, pp. 1 through 4.

European Patent Office, "Extended European Search Report", from EP Application No. 20834147.9, from Foreign Counterpart to U.S. Appl. No. 16/918,738, filed Jul. 28, 2023, pp. 1 through 9, Published: EP.

China National Intellectual Property Administration, "Notification of the First Office Action", from CN Application No. 202210484914.4, Jun. 17, 2023, from Foreign Counterpart to U.S. Appl. No. 16/918,691, pp. 1 through 11, Published: CN.

European Patent Office, "Extended European Search Report", from EP Application No. 20835226.0, from Foreign Counterpart to U.S. Appl. No. 16/918,691, Jul. 3, 2023, pp. 1 through 10, Published: EP.

Japanese Patent Office, "Notice of Allowance", from JP Application No. 2021-578036, Jun. 2, 2023, from Foreign Counterpart to U.S. Appl. No. 16/918,691, pp. 1 through 3, Published: JP.

Japanese Patent Office, "Notice of Reason for Rejection", dated May 17, 2024 from JP Application No. 2021-578034, from Foreign Counterpart to U.S. Appl. No. 16/918,691, pp. 1 through 8, Published: JP.

Umesh et al., "Overview of O-RAN Fronthaul Specifications" NTT Docomo Technical Journal, vol. 21, No. 1, Jul. 2019, pp. 46 through 59.

\* cited by examiner

FRONTHAUL INTERFACE FOR USE WITH A CLOUD RADIO ACCESS NETWORK

CROSS-REFERENCE TO RELATED APPLICATIONS

This application is a continuation of U.S. patent application Ser. No. 16/918,691 titled "FRONTHAUL INTERFACE FOR USE WITH A CLOUD RADIO ACCESS NETWORK" filed on Jul. 1, 2020, which claims priority to U.S. Provisional Patent Application No. 62/870,025 titled "FRONTHAUL INTERFACE FOR USE WITH A CLOUD RADIO ACCESS NETWORK" filed on Jul. 2, 2019; U.S. Provisional Patent Application No. 62/895,625 titled "FRONTHAUL INTERFACE FOR USE WITH A CLOUD RADIO ACCESS NETWORK" filed on Sep. 4, 2019; and U.S. Provisional Patent Application No. 62/956,402 titled "DEEP PACKET INSPECTION IN A FRONTHAUL NETWORK OF A CLOUD RADIO ACCESS NETWORK" filed on Jan. 2, 2020, all of which are incorporated herein by reference in their entireties.

BACKGROUND

In a cloud radio access network (C-RAN), geographically-separate remote units are controlled by a centralized unit and provide wireless service to user equipment (UEs). In a C-RAN, the centralized unit may communicate with the remote units via a fronthaul network (also referred to as a "fronthaul interface"). It may be desirable to implement a fronthaul network of a C-RAN with certain functionality described herein.

SUMMARY

One embodiment is directed to a cloud radio access network (C-RAN). The C-RAN comprises a plurality of remote units (RUs), each being configured to exchange radio frequency (RF) signals with at least one user equipment (UE). The C-RAN also comprises a central unit communicatively coupled to the plurality of RUs via a fronthaul interface. The central unit is configured to determine sets of data to be sent to a plurality of remote units across the fronthaul interface. The central unit is also configured to determine a mapping of each of the sets of data to at least one of the plurality of remote units. The central unit is also configured to add a respective indicator, based on the mapping, to each set of data, wherein each respective indicator indicates each remote unit that the respective set of data is intended for. The central unit is also configured to broadcast the sets of data, each with the respective indicator, to the plurality of remote units.

Another embodiment is directed to a cloud radio access network (C-RAN) comprising a plurality of remote units, each being configured to exchange radio frequency signals with at least one user equipment (UE). The C-RAN further comprising a central unit communicatively coupled to the plurality of remote units via a fronthaul network. The fronthaul network is configured to implement a plurality of multicast groups. Each of the multicast groups includes a respective group of the remote units. The central unit is configured to: determine sets of data to be sent to respective subsets of the remote units across the fronthaul network; determine a mapping of each of the sets of data to a respective one of the subsets of the remote units; and, for each of the sets of data, if at least one of the multicast groups wholly contains the respective subset of remote units mapped to that set of data, transmit that set of data to the respective subset of remote units over the fronthaul network by multicasting that set of data to the multicast group that best matches the respective subset of remote units mapped to that set of data.

Another embodiment is directed to a cloud radio access network (C-RAN) comprising a plurality of remote units, each being configured to exchange radio frequency signals with at least one user equipment (UE). The C-RAN further comprises a central unit communicatively coupled to the plurality of remote units via a fronthaul network and an entity configured to perform deep packet inspection, the entity communicatively coupled to the central unit via the fronthaul network. The central unit is configured to: determine sets of data to be sent to a plurality of remote units across the fronthaul network; determine a mapping of each of the sets of data to at least one of the plurality of remote units; add a respective indicator, based on the mapping, to packets for each set of data, wherein each respective indicator indicates each remote unit that the respective packet and set of data is intended for; and transmit the packets for the sets of data, each with the respective indicator, to the entity over the fronthaul network. The entity is configured to perform deep packet inspection on each of the packets in order to determine each remote unit that packet is intended for and communicate that packet to each remote unit that packet is intended for over the fronthaul network.

Another embodiment is directed to a cloud radio access network (C-RAN) comprising a plurality of remote units (RUs), each being configured to exchange radio frequency (RF) signals with at least one UE. The C-RAN also includes a central unit communicatively coupled to the plurality of RUs via a fronthaul interface. The fronthaul interface includes at least one ETHERNET switch configured to perform deep packet inspection on a received packet in order to determine whether an RU identification is present in the packet. The RU identification, if present in the packet, indicates at least one RU the packet is intended for. When the RU identification is present in the packet, the at least one ETHERNET switch is also configured to communicate, for each of the at least one RU, at least a portion of the packet to the RU based on a comparison of the RU identification with at least one bit pattern for the RU.

DRAWINGS

Understanding that the drawings depict only exemplary configurations and are not therefore to be considered limiting in scope, the exemplary configurations will be described with additional specificity and detail through the use of the accompanying drawings, in which.

Figure 1A:
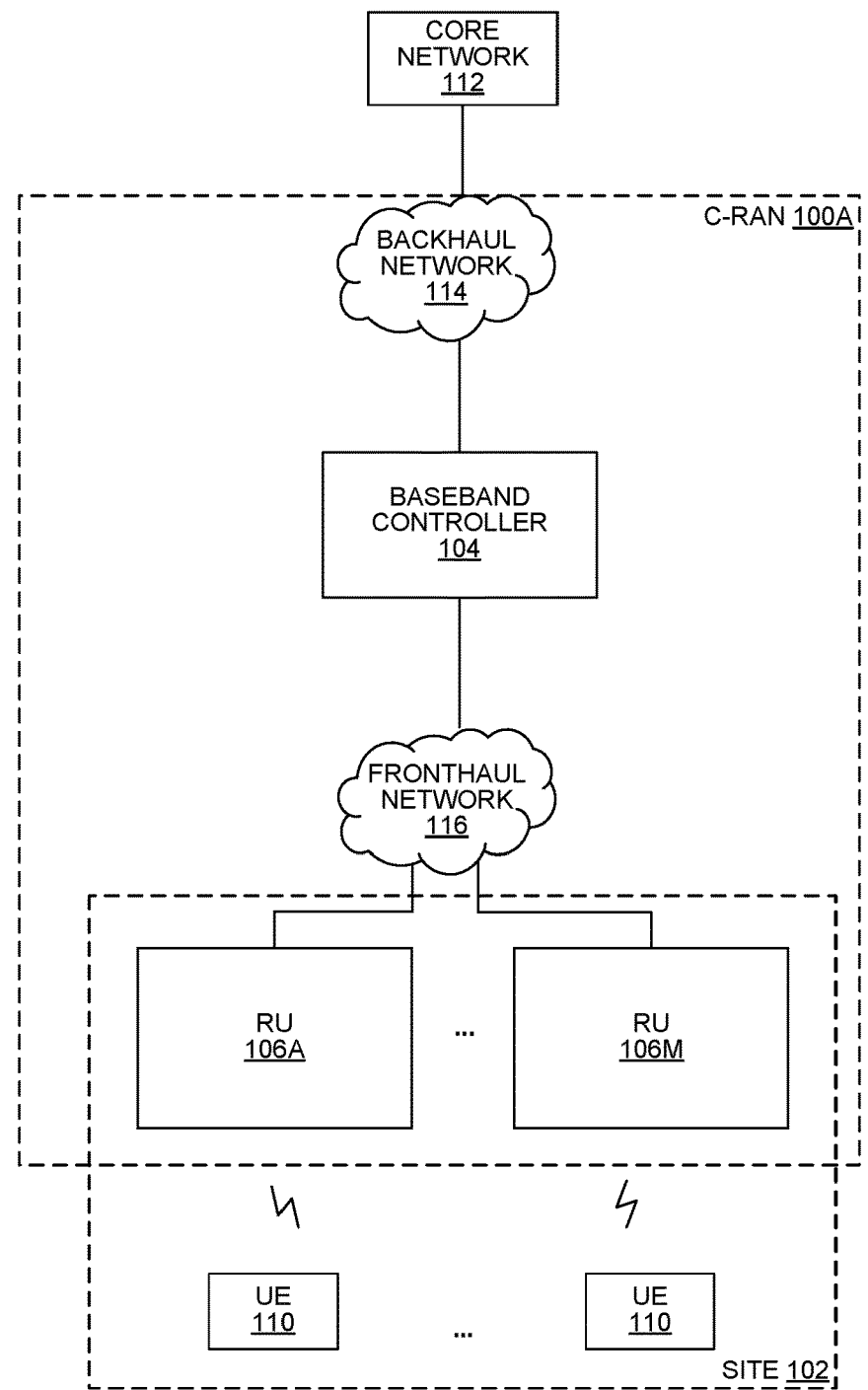
FIG. 1A is a block diagram illustrating an exemplary configuration of a communication system that includes 3GPP Fourth Generation (4G) components.

In accordance with common practice, the various described features are not drawn to scale but are drawn to emphasize specific features relevant to the exemplary configurations.

DETAILED DESCRIPTION

A cloud radio access network (C-RAN) is one way to implement a distributed RAN. Typically, for each cell implemented by a C-RAN, one or more controllers (also called "baseband controllers", "central units" or "distributed units") interact with multiple remote units (RUs) in order to provide wireless service to various items of user equipment (UEs). In a C-RAN, the RUs may communicate with at least one controller via a fronthaul interface. The fronthaul interface may utilize at least one computing device (e.g., switch) that facilitates communication between the RUs and DUs (in 5G) or a baseband controller (in 4G). For example, the fronthaul interface may be implemented using at least one ETHERNET switch and/or router. In addition, the fronthaul interface may be implemented using different physical links, e.g., copper, multi-rate, multi-mode cables, etc.

Frequency reuse includes using the same frequency resource(s) for multiple sets of UEs, each set of UEs being under a different, geographically diverse set of RUs. This can include the same RU frequency resource being used to transmit to different UEs. In the downlink, multiple reuse layers of at least one RU can each transmit to a different UE on the same frequency at the same time (where each RU in a reuse layer is sufficiently RF-isolated from each RU in the other reuse layer(s)). On the uplink, each of multiple UEs can transmit to a different reuse layer of at least one RU on the same frequency at the same time (where each RU in a reuse layer is sufficiently RF-isolated from each RU in the other reuse layer(s)).

One possibility is to send all downlink traffic from the controller in a C-RAN to all the RUs via multicast. For a given sector implemented by the C-RAN, there are one or more IP addresses upon which downlink in-phase, quadrature-phase (I/Q) packets are sent and all the RUs register to the same set of multicast IP address. So when reuse is employed, the packets of all reuse layer reach all the RU. So if there is 4× reuse in DL then 4× times packet reach each RU even though the packet of interest for a given RU is 1× or less. However, it may be desirable to send different sets of data to different RUs (for transmission to UEs) of a C-RAN. There several possible solutions to accomplish this tailored transmission of downlink traffic.

In a first possible solution, the originator (e.g., the controller in a C-RAN) can replicate the packet and send the packets only to the RUs of interest by unicasting. This places a processing load on the controller.

In a second possible solution, the controller in a C-RAN can add an indicator (e.g., a bitmask) to data that it broadcasts, where the bitmask indicates the remote unit(s) the data is intended for.

In a third possible solution, each subset of RUs that form a transmission group can also form an independent multicast group, after which the originator sends data to the multicast group that will have only the required RUs.

In a fourth possible solution, the fronthaul network/interface (e.g., in a switch) only forwards traffic of interest to an RU in a given port. The inspection/analysis of packet traffic (e.g., within the fronthaul network/interface) is referred to herein as deep packet inspection (DPI). For example, switch in a fronthaul network/interface may selectively forward packets to different RUs based on presence and/or bits set in a bitmask in the packets.

The Fronthaul Working Group of the Open Radio Network Alliance (O-RAN) Alliance is seeking to standardize how data is sent on radio access network fronthaul interfaces. In some configurations, the fronthaul interfaces described herein may comply with the O-RAN 1.0 interface as found in O-RAN-WG4.CUS.0-v01.00 Control, User and Synchronization Plane Specification, Version 1.00 (available at https://www.o-ran.org/specifications), which is incorporated by reference herein.

Example 4G C-RAN

FIG. 1A is a block diagram illustrating an exemplary configuration of a communication system 100A that includes 3GPP Fourth Generation (4G) components. In the exemplary configuration shown in FIG. 1, the system 100A is implemented using the cloud radio access network (C-RAN) (point-to-multipoint distributed base station) architecture that employs at least one baseband unit 104 and one or more remote units (RUs) 106A-M that serve at least one cell.

The RUs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

The system 100A may also be referred to here as a "C-RAN" or a "C-RAN system." The baseband unit 104 is also referred to here as "baseband controller" 104, "CU" 104, or just "controller" 104. Each RU 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RUs 106 may be physically separated from each other within the site 102, although they are each communicatively coupled to the baseband controller 104 via a fronthaul network 116.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RU 106 may be a computing device with at least one processor that executes instructions stored in memory. Furthermore, each RU 106 may implement one or more instances (e.g., modules) of a radio unit 106.

The C-RAN 100A may optionally implement frequency reuse where the same frequency resource(s) are used for multiple sets of UEs 110, each set of UEs 110 being under a different, geographically diverse set of RUs 106.

The system 100A is coupled to a core network 112 of each wireless network operator over an appropriate backhaul network 114. For example, the Internet may be used for backhaul between the system 100A and each core network 112. However, it is understood that the backhaul network 114 can be implemented in other ways. Each of the backhaul network 114 and/or the fronthaul network 116 described herein may be implemented with one or more switches, routers, and/or other networking devices, e.g., the backhaul network 114 and/or the fronthaul network 116 may be implemented with a switched ETHERNET network.

The system 100A may be implemented as a Long Term Evolution (LTE) radio access network providing wireless service using an LTE air interface. LTE is a standard developed by the 3GPP standards organization. In this configuration, the baseband controller 104 and RUs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., the system 100A may be implemented as a 3GPP 5G RAN providing wireless service using a 5G air interface.

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and remote unit 106 can be implemented so as to use an air interface that supports one or more of frequency-division duplexing (FDD) and/or time-division duplexing (TDD). Also, the baseband controller 104 and the remote units 106 can be implemented to use an air interface that supports one or more of the multiple-input-multiple-output (MIMO), single-input-single-output (SISO), single-input-multiple-output (SIMO), and/or beam forming schemes. For example, the baseband controller 104 and the remote units 106 can implement one or more of the LTE transmission modes. Moreover, the baseband controller 104 and the remote units 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RUs 106. Communicating such baseband I/Q data typically requires a relatively high data rate front haul.

In some configurations, a baseband signal can be pre-processed at a source RU 106 and converted to frequency domain signals (after removing guard band/cyclic prefix data, etc.) in order to effectively manage the fronthaul rates, before being sent to the baseband controller 104. The RU 106 can further reduce the data rates by quantizing such frequency domain signals and reducing the number of bits used to carry such signals and sending the data. In a further simplification, certain symbol data/channel data may be fully processed in the source RU 106 itself and only the resultant information is passed to the baseband controller 104.

The Third Generation Partnership Project (3GPP) has adopted a layered model for the LTE radio access interface. Generally, some combination of the baseband controller 104 and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RUs 106) may be implemented. Where baseband signal I/Q data is fronthauled between the baseband controller 104 and the RUs 106, each baseband controller 104 can be configured to perform all or some of the digital L1, L2, and L3 processing for the air interface. In this case, the L1 functions in each RU 106 is configured to implement all or some of the digital L1 processing for the air interface.

Where the fronthaul ETHERNET network 116 is not able to deliver the data rate need to front haul (uncompressed) I/Q data, the I/Q data can be compressed prior to being communicated over the ETHERNET network 116, thereby reducing the data rate needed communicate such I/Q data over the ETHERNET network 116.

Data can be fronthauled between the baseband controller 104 and RUs 106 in other ways (for example, using fronthaul interfaces and techniques specified in the Common Public Radio Interface (CPRI) and/or Open Base Station Architecture Initiative (OBSAI) family of specifications). Accordingly, the baseband controller 104 described herein may be similar to and/or perform at least some of the functionality of the O-RAN Distributed Unit (O-DU).

Additionally, it should be noted that the present systems and methods may also be used in other distributed RANs (in addition to a C-RAN 100A), e.g., a distributed antenna system (DAS).

Figure 9A:
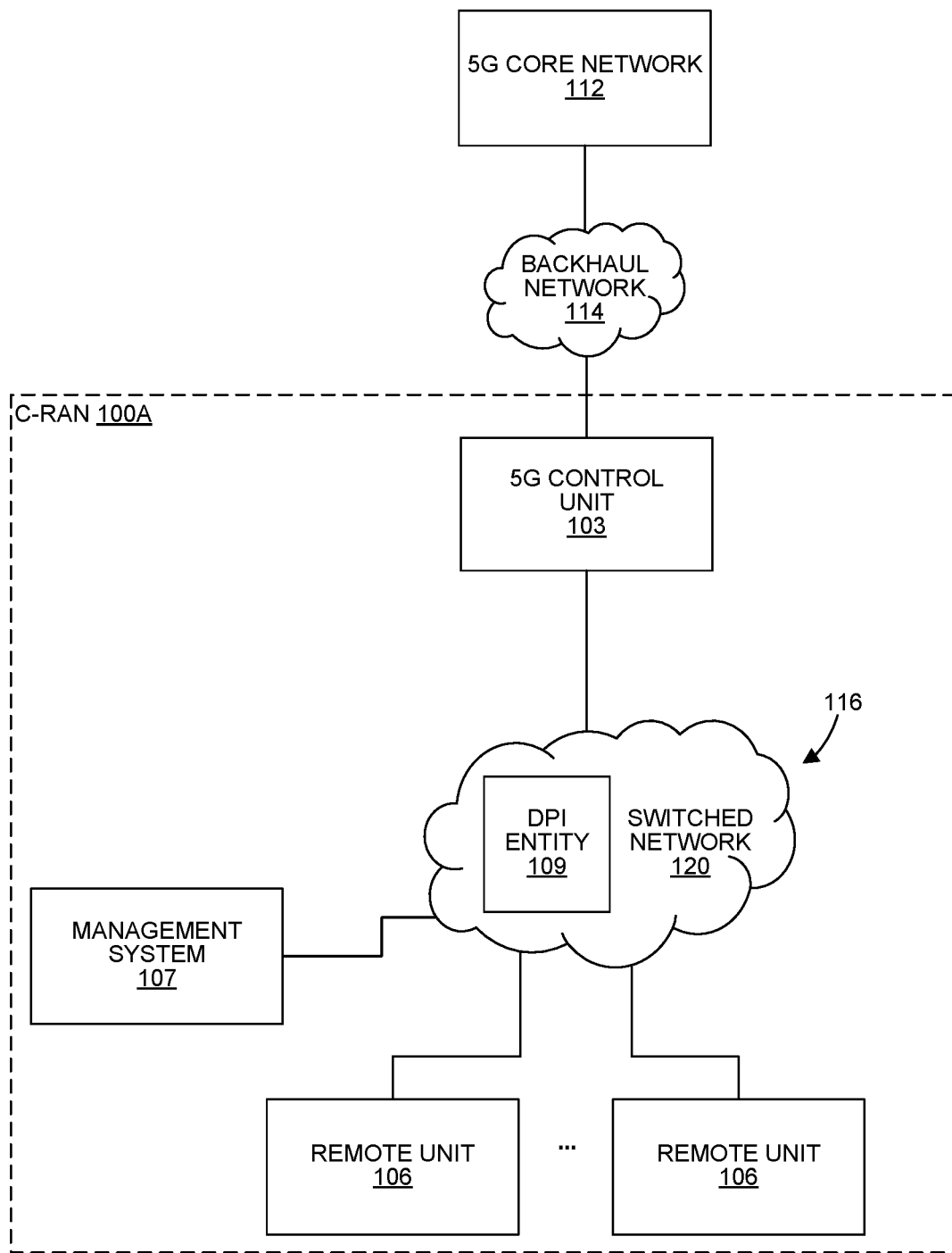
FIG. 9A illustrates an example C-RAN with a DPI entity (that performs deep packet inspection) in a switched network that implements a fronthaul network.

FIG. 9A illustrates an example C-RAN 100A with a DPI entity 109 (that performs deep packet inspection) in a switched network 120 that implements a fronthaul network 116. A management system 107 may be communicatively coupled to the baseband controller 104 and RUs 106, for example, via the backhaul network 114 and/or the fronthaul network 116. A hierarchical architecture can be used for management-plane ("M-plane") communications. When a hierarchical architecture is used, the management system 107 can send and receive management communications to and from the baseband controller 104, which in turn forwards relevant M-plane communications to and from the RUs 106 as needed. A direct architecture can also be used for M-plane communications. When a direct architecture is used, the management system 107 can communicate directly with the RUs 106 (without having the M-plane communications forwarded by the controller 104). A hybrid architecture can also be used in which some M-plane communications are communicated using a hierarchical architecture and some M-plane communications are communicated using a direct architecture. Proprietary protocols and interfaces can be used for such M-plane communications. Also, protocols and interfaces that are specified by standards such as O-RAN can be used for such M-plane communications.

Example 5G C-RANs

Figure 1B:
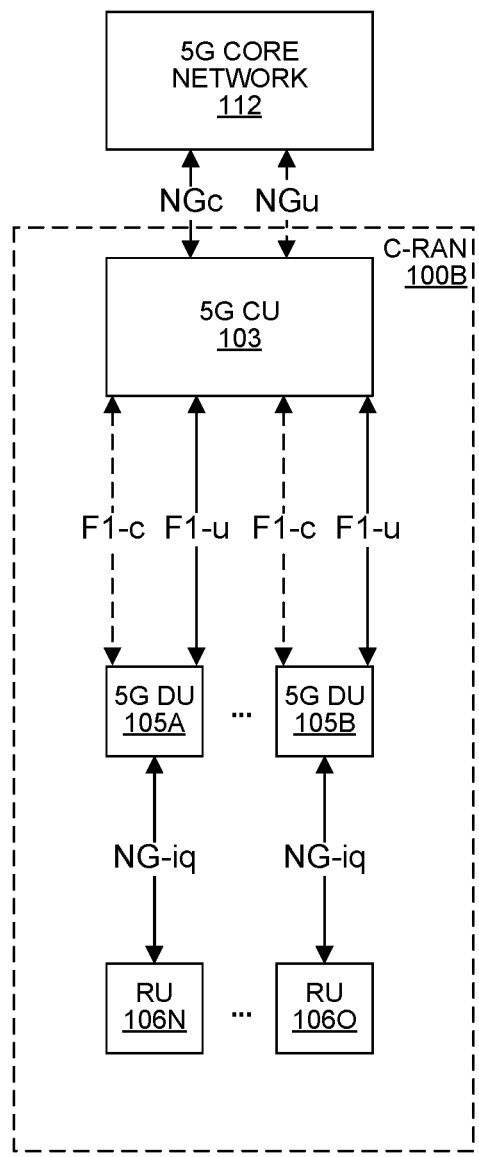
FIG. 1B is a block diagram illustrating an exemplary configuration of a communication system that includes 3GPP Fifth Generation (5G) components.

FIG. 1B is a block diagram illustrating an exemplary configuration of a system 100B that includes 3GPP Fifth Generation (5G) components. Optionally, the system 100B may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100, interfaces denoted with "–c" or simply "c" (illustrated with dashed lines) provide control plane connectivity, while interfaces denoted with "–u" or simply "u" (illustrated with solid lines) provide user plane connectivity. More explanation of the various devices and interfaces in FIG. 1B can be found in 3GPP TR 38.801 Radio Access Architecture and Interfaces, Release 14 (available at https://portal.3gpp.org/desktopmodules/Specifications/SpecificationDetails.aspx?specificationId=3056), which is incorporated by reference herein.

FIG. 1B illustrates a C-RAN 100B implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100B implementing the example Next Generation NodeB (gNB) includes a single CU 103, which handles control plane functions and user plane functions. The 5G CU 103 (in the C-RAN 100B) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-0 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface may facilitate any of the NG-iq, F1-c, and/or F1-u interfaces in FIG. 1B.

Figure 9B:
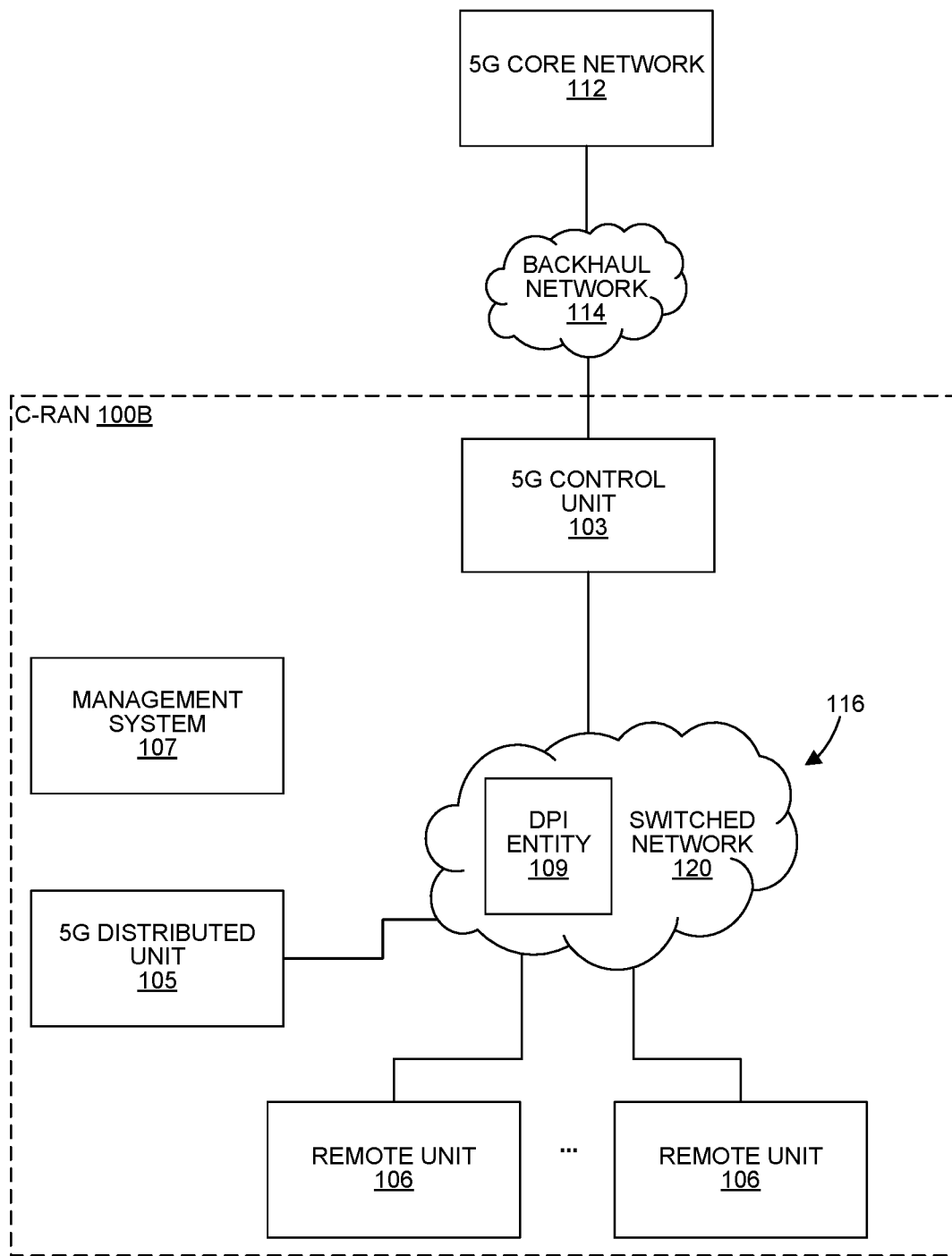
FIG. 9B illustrates another example C-RAN with a DPI entity (that performs deep packet inspection) in a switched network that implements a fronthaul network.

FIG. 9B illustrates an example C-RAN 100B with a DPI entity 109 (that performs deep packet inspection) in a switched network 120 that implements a fronthaul network 116. A management system 107 may be communicatively coupled to the CUs 103, DUs 105, and RUs 106, for example, via the backhaul network 114 and/or the fronthaul network 116. A hierarchical architecture can be used for M-plane communications. When a hierarchical architecture is used, the management system 107 can send and receive management communications to and from the CUs 103, which in turn forward relevant M-plane communications to and from the DUs 105, which in turn forwards the relevant communications to and from the RUs 106 as needed. A direct architecture can also be used for M-plane communications. When a direct architecture is used, the management system 107 can communicate directly with the CUs 103, DUs 105, and RUs 106 (without having M-plane communications forwarded by the CUs 103 to and from the DUs 105 and without having M-plane communications forwarded by DUs 103 to and from the RUs 106). A hybrid architecture can also be used in which some M-plane communications are communicated using a hierarchical architecture and some M-plane communications are communicated using a direct architecture. Proprietary protocols and interfaces can be used for such M-plane communications. Also, protocols and interfaces that are specified by standards such as O-RAN can be used for such M-plane communications.

Functional Splits Between RU and DU

Figure 2:
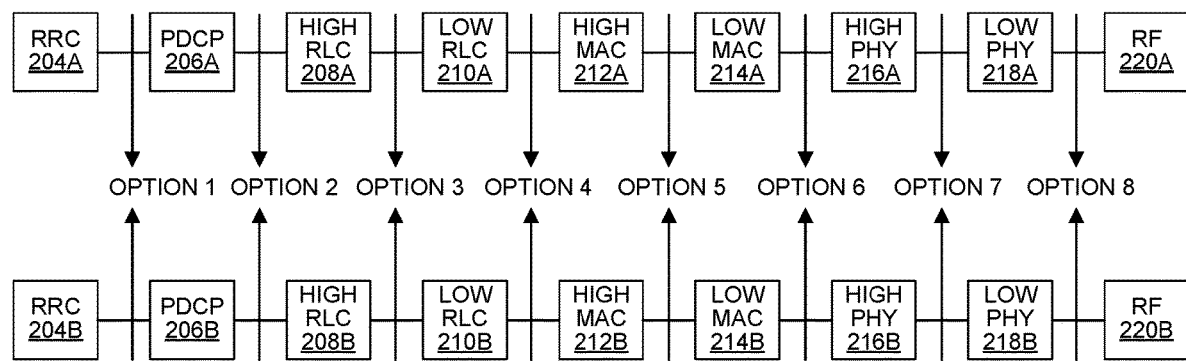
FIG. 2 is a block diagram illustrating example functional splits between the RUs and the baseband controller (in 4G) or the Distributed Unit (DU) (in 5G)

FIG. 2 is a block diagram illustrating example functional splits between the RUs 106 and the baseband controller 104

(in 4G) or the Distributed Unit (DU) 105 (in 5G). Some combination of the DUs 105 (or baseband controller 104 in 5G) and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface.

Various options of functional splits are illustrated in FIG. 2, where the functions on the left side of the vertical arrows for a given option are implemented at the DU 105 in 5G (or baseband controller 104 in 4G) and the functions on the right side of the vertical arrows are implemented at the RUs 106. In 5G configurations, the functions on the left side of the vertical arrows for a given option may be implemented in some combination of the DU(s) 105 and CU 103. The top half of FIG. 2 illustrates the split between a first RU 106 and a DU 105 (or baseband controller 104), and the bottom half of FIG. 2 illustrates the split between a second RU 106 and the DU 105 (or baseband controller 104).

In option 1, the Radio Resource Control (RRC) 204A-B portions of L3 processing are performed at the DU 105 (or baseband controller 104), while the Packet Data Convergence Protocol (PDCP) 206A-B portions of the L3 processing (along with all analog RF 220A-B, L1, and L2 processing) are performed at the RUs 106. In option 2, the RRC 204 and PDCP 206 portions of L3 are performed at the DU 105 (or baseband controller 104), while all analog RF, L1, and L2 functions are performed at the RUs 106. In option 3, the L3 (RRC 204 and PDCP 206 portions) and high Radio Link Control (RLC) portions 208A of the L2 processing are performed at the DU 105 (or baseband controller 104), while the remaining L2 processing (low RLC 210A-B, high MAC 212A-B, low MAC 214A-B), along with L1 and analog RF 220 processing, are performed at the RUs 106. In option 4, the L3 (RRC 204 and PDCP 206 portions), high RLC 208 portions, and low RLC 210 portions of the L2 processing are performed at the DU 105 (or baseband controller 104), while the remaining high MAC 212 portions and low MAC 214A-B portions of the L2 processing, along with L1 and analog RF 220 processing, are performed at the RUs 106.

In option 5, the L3 (RRC 204 and PDCP 206 portions), high RLC 208 portions, low RLC 210 portions, and high MAC 212 portions of the L2 processing are performed at the DU 105 (or baseband controller 104), while the remaining low MAC 214A-B portions of the L2 processing, along with L1 and analog RF 220 processing, are performed at the RUs 106. In option 6, all L3 (RRC 204 and PDCP 206 portions) and L2 processing (high RLC 208 portions, low RLC 210 portions, high MAC 212 portions, and low MAC 214 portions) is performed at the DU 105 (or baseband controller 104), while the L1 processing (high physical layer (PHY) 216A-B and low PHY 218A-B portions) and analog RF 220 processing, are performed at the RUs 106. In some configurations, the option 6 split may create very low data rate and high latency margin between RU(s) 106 and the baseband controller 104.

In option 7, all L3 processing, L2 processing and high PHY 216 portions of the L1 processing are performed at the DU 105 (or baseband controller 104), while the low PHY 218A-B portions of the L1 processing (and analog RF 220 processing) are performed at the RUs 106.

In option 8, all L3, L2, and L1 (high PHY 216 and low PHY 218 portions) are performed at the DU 105 (or baseband controller 104), while the analog RF 220 processing is performed at the RUs 106.

The term "high" with respect to RLC, MAC, and PHY refers to the upper sublayers of the layer in question. The term "low" with respect to RLC, MAC, and PHY refers to the lower sublayers of the layer in question.

O-RAN Interface

Figure 3:
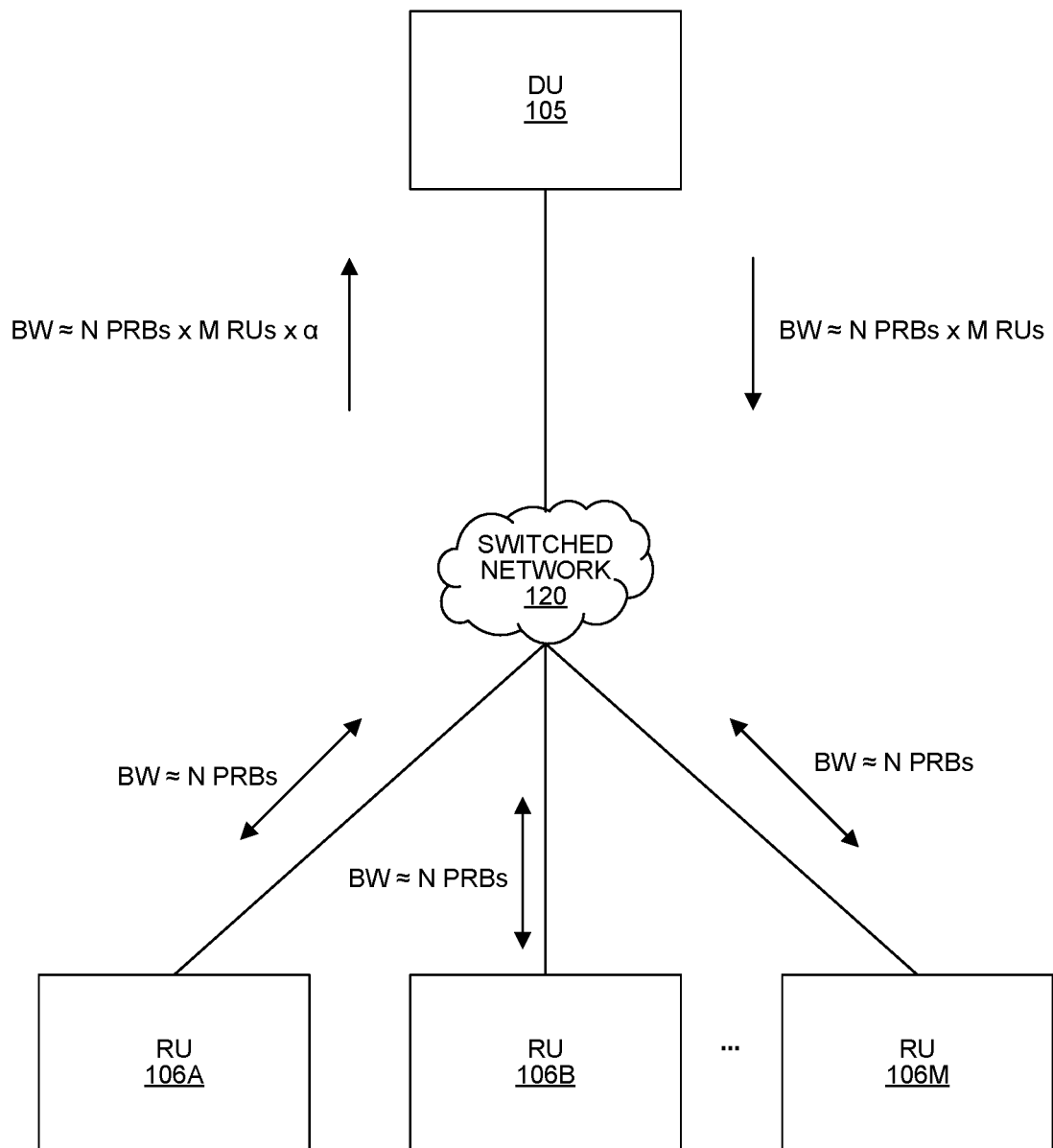
FIG. 3 is a block diagram illustrating an example O-RAN 1.0 fronthaul interface between a DU and multiple RUs.

FIG. 3 is a block diagram illustrating an example O-RAN 1.0 fronthaul interface between a DU 105 and multiple (M) RUs 106. The DU 105 may be communicatively coupled to the RUs 106 via a switched network 120. Although not shown, the DU 105 may also be communicatively coupled to a 5G CU 103 (in 5G). Furthermore, in 4G configurations, the DU 105 may instead be a baseband controller 104.

The Third Generation Partnership Project (3GPP) specifies the functional split between the DU 105 and RUs 106 (what processing happens in the RUs 106 and what happens in the DU 105). For example, the "7.2x" protocol split designates that a portion of physical layer (L1) processing is performed at the RU 106 and a portion at the DU 105. In other words, the 7.2x split is an Option 7 split in middle of the physical layer. In some configurations, there may be minor variation in which processing is performed at the DU 105 or RU 106, depending on the channel being processed.

However, 3GPP has not standardized how the data is conveyed between the DU 105 and RUs 106. The Open Radio Network (O-RAN) Alliance has standardized the actual interface between the DU 105 and RU 106, i.e., how the data is packetized and how it is transmitted. The O-RAN 1.0 standard (using a 7.2x split) technically supports one-DU-to-many-RU mapping, but each configured DU-RU link is addressed and managed independently. Therefore, the O-RAN 1.0 configuration in FIG. 3 effectively implements multiple one-to-one links where the DU 105 sends M copies of the same packet stream. This creates an inefficient use of bandwidth across the fronthaul interface (between the DU 105 and RUs). Specifically, if each of the M RUs 106 transmit N PRBs, the uplink bandwidth from the switched network 120 to the DU 105 will be approximately N PRBs×M RUs×α. Alpha (α) represents a fraction (less than 1), which accounts for the fact that the traffic can be less than the full multiple shown, e.g., less than the maximum number of N PRBs due to pruning, that is, some PRBs not being sent from the RUs 106 to the DU 105.

The downlink bandwidth from the DU 105 to the switched network 120, in the O-RAN 1.0 configuration in FIG. 3, will be approximately N PRBs×M RUs 106. The bandwidth, for uplink or downlink, between the switched network 120 and each RU 106 is approximately N PRBs. Accordingly, the example O-RAN fronthaul interface in FIG. 3 is an inefficient use of bandwidth on the link between the DU 105 and switched network 120.

Data transfer is scheduled and managed on a per-symbol basis in O-RAN 1.0, where the entire PDSCH resource element (RE) grid is delivered in sequence.

Figure 4:
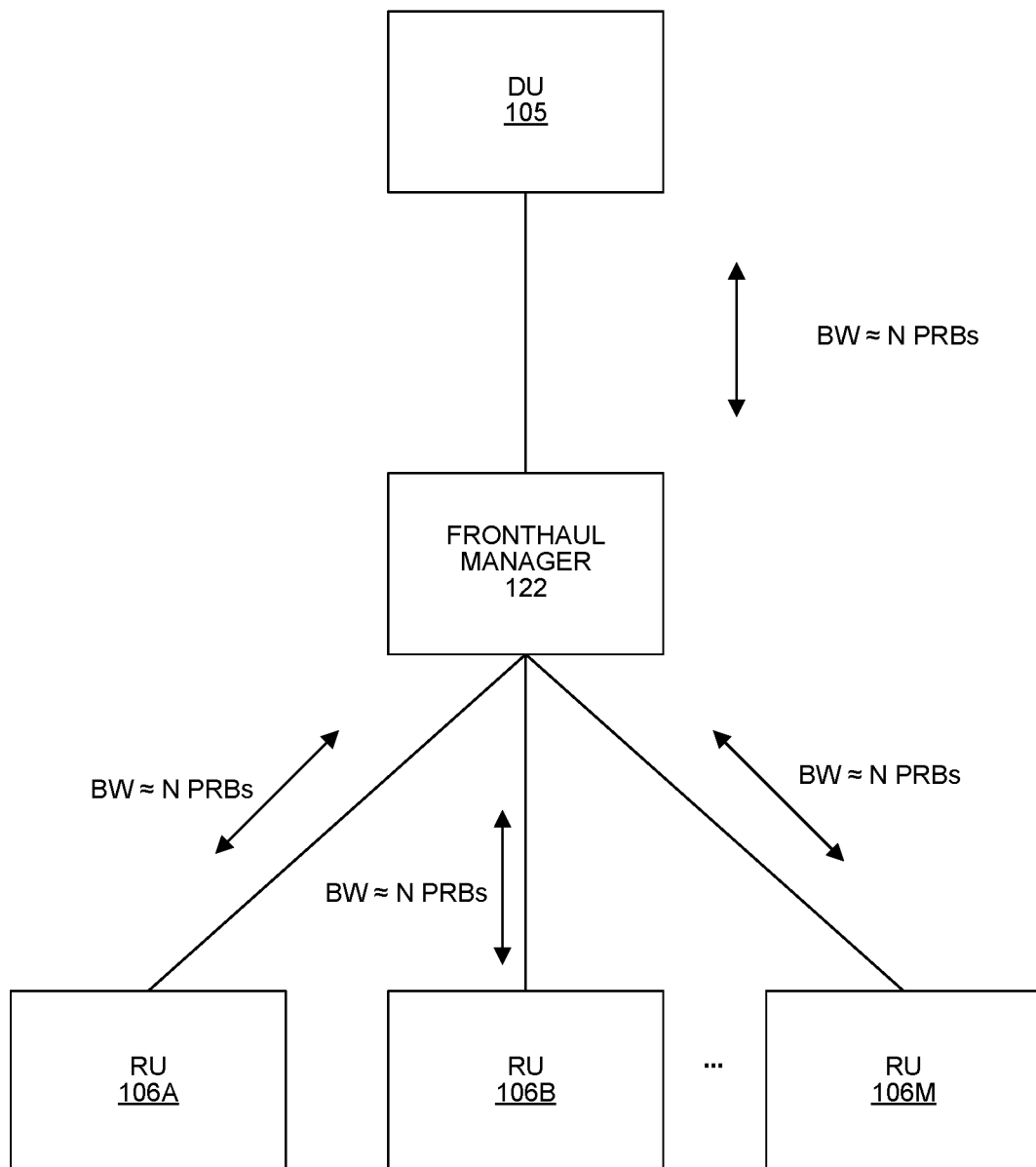
FIG. 4 is a block diagram illustrating an example fronthaul interface between a DU and multiple (M) RUs according to the O-RAN shared cell proposal.

FIG. 4 is a block diagram illustrating an example fronthaul interface between a DU 105 and multiple (M) RUs 106 according to the O-RAN shared cell proposal. The DU may be communicatively coupled to the RUs 106 via a fronthaul manager (FHM) 122. Although not shown, the DU 105 may also be communicatively coupled to an ng-eNB CU (not shown) or a gNB CU 103 (in 5G). Furthermore, in 4G configurations, the DU 105 may instead be a baseband controller 104.

The O-RAN shared cell proposal attempts to make more efficient use of bandwidth to and from the DU 105 (compared to O-RAN 1.0). Specifically, the shared cell proposal includes a fronthaul manager (FHM) 122 in order to more efficiently support one-DU-to-many-RU mapping. To do this, the fronthaul manager 122: (1) replicates the downlink packet stream (from the DU 105) for each RU 106; and (2)

uses combining/digital summation on the uplink packet stream from the RUs 106 (before sending to the DU 105). The combining/digital summation includes: (1) adding the corresponding in-phase (I) samples in corresponding PRBs (from all the RUs 106); (2) adding the corresponding quadrature-phase (Q) samples in corresponding PRBs (from all the RUs 106); and (3) sending a combined stream of FQ data from the fronthaul manager 122 to the DU 105. The combining/digital summation may optionally include some overflow management. Using the shared cell proposal, the DU 105 can send and receive a single packet stream (with a bandwidth of approximately N PRBs) instead of M packet streams (one for each RU 106 with a total bandwidth of approximately N PRBs×M RUs). By reducing the DU 105 transmitted and received data to a single stream of N PRBs, the shared cell proposal in FIG. 4 will reduce bandwidth (between the DU 105 and FHM) compared to the O-RAN 1.0 implementation in FIG. 3.

However, both the O-RAN 1.0 implementation (in FIG. 3) and the shared cell proposal (in FIG. 4) assume that all downlink transmissions from all RUs 106 are identical, like in a distributed antenna system (DAS). In other words, neither the O-RAN 1.0 implementation (in FIG. 3) nor the shared cell proposal (in FIG. 4) distinguish between the different traffic going to the different RUs 106, which would be problematic in a C-RAN 100, as discussed below.

Needs of a C-RAN Fronthaul Interface

Figure 5:
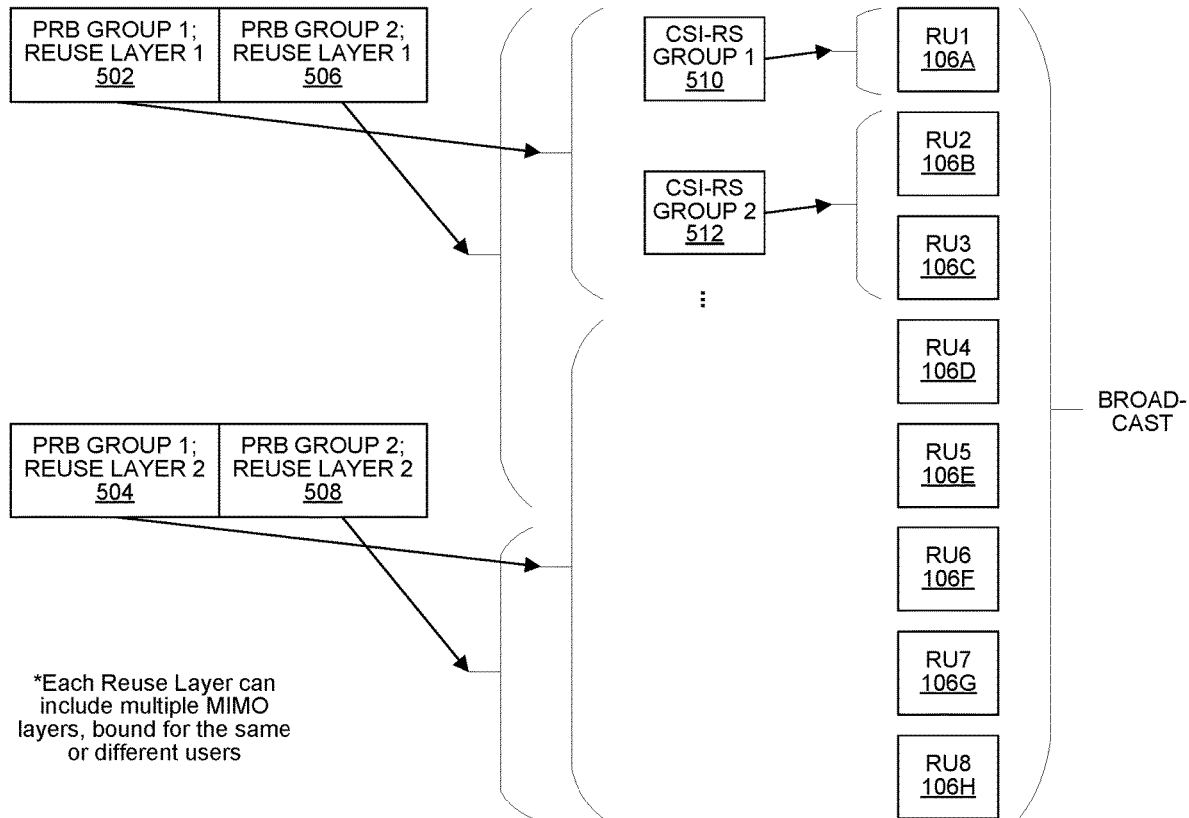
FIG. 5 is a block diagram illustrating an example mapping of different data to different sets of RUs in a C-RAN.

FIG. 5 is a block diagram illustrating an example mapping of different data to different sets of RUs 106A-H in a C-RAN 100. Specifically, FIG. 5 illustrates mapping of different PRB groups and reuse layers to different RUs 106. FIG. 5 is for a C-RAN 100 with 8 different RUs 106, however, a C-RAN 100 may have more than 8 RUs 106.

It is desirable to send different data to different RUs 106 in a C-RAN 100 for any of the following reasons: (1) if the whole set of PRBs (e.g., 100) is divided and grouped into two different PRB groups to which RUs 106 are assigned (e.g., PRB groups 1 and 2 in FIG. 5); (2) in frequency reuse, samples that are transmitted (on the same time and frequency resource) from different sets of RUs 106 (on the downlink) or to different sets of RUs 106 (on the uplink) need to be kept separate; and/or (3) different channels need different types of processing, e.g., narrowcast, unicast, broadcast.

With respect to reason 1, PRB groupings are all created by the scheduler (L2 processing in the DU 105 or CU in 5G or the baseband controller 104 in 4G) in order to service a set of UEs 110. UEs 110 are assigned a certain number of PRB groups based on their demand, and also taking fairness and other factors into account. Sets of RUs 106 are assigned to different such PRB groups based on the knowledge of the proximity of the UEs 110 to the RUs 106. This knowledge can be gained by the scheduler through uplink measurements, UE 110 feedback information, etc. If PRB groups are used, a particular RU 106 only has use for packets for the PRB group to which it belongs. FIG. 5 is shown for two PRB groups, although more PRB groups may be utilized.

With respect to reason 2, reuse layers are all created by the scheduler (L2 processing in the DU 105 or CU in 5G or the baseband controller 104 in 4G) in order to service a set of UEs 110, e.g., based on the knowledge of the proximity of the UEs 110 to the RUs 106 from uplink measurements, UE 110 feedback information, etc. In downlink frequency reuse, multiple reuse layers of at least one RU 106 can each transmit to a different UE 110 on the same frequency at the same time (where each RU 106 in a reuse layer is sufficiently RF-isolated from each RU 106 in the other reuse layer(s)). On the uplink, each of multiple UEs 110 can transmit to a different reuse layer of at least one RU 106 on the same frequency at the same time (where each RU 106 in a reuse layer is sufficiently RF-isolated from each RU 106 in the other reuse layer(s)). FIG. 5 is shown with a reuse factor of two for simplicity (where two different sets of RUs 106 communicate with two different UEs 110 on the same time and frequency resource), although higher reuse factors may be utilized.

As an example, when accounting for the PRB groups and reuse layers, data may be mapped as follows: (1) RU1 106A through RU3 106C are assigned to PRB group 1/reuse layer 1 502; (2) RU4 106D through RU8 106H are assigned to PRB group 1/reuse layer 2 504; (3) RU1 106A through RU5 106E are assigned to PRB group 2/reuse layer 1 506; and (4) RU6 106F through RU8 106H are assigned to PRB group 2/reuse layer 2 508.

With respect to reason 3, the following transmission types may be used: (1) narrowcasting different data sets to different RUs 106 for some channels and reference signals (e.g., the Physical Downlink Shared Channel (PDSCH), Physical Downlink Control Channel (PDCCH), Demodulation Reference Signal (DMRS), and Phase Tracking Reference Signal (PTRS), etc.); (2) broadcasting common channels and reference signals to all RUs 106 (e.g., the Physical Broadcast Channel (PBCH) and PDCCH (for 4G and optionally 5G), etc.); and (3) unicasting or narrowcasting some channels or reference signals (e.g., Channel State Information Reference Signal (CSI-RS) group 1 510 or CSI-RS group 2 512, etc.). Unlike the shared cell model, it is desirable to transmit, based on the channel or signal being processed, different sets of data to different sets of RUs 106 that are served by the same DU 105. For example, RU1 106A are assigned to CSI-RS group 1 510, while RU2 106B and RU3 106C are assigned to CSI-RS group 2 512.

Using the example O-RAN 1.0 implementation (in FIG. 3) to send different data to different RUs 106 is inefficient because it includes merely replicating I/Q data to all RUs 106 in a grouping. Additionally, using the shared cell proposal (in FIG. 4) requires the use of a new entity (FHM) that is not off-the-rack. Accordingly, the present systems and methods may be used to modify the O-RAN 1.0 interface to selectively send different data (c-plane and/or u-plane) to and from different subsets of RUs 106.

Fronthaul Interface for Use with a C-RAN

Figure 6A:
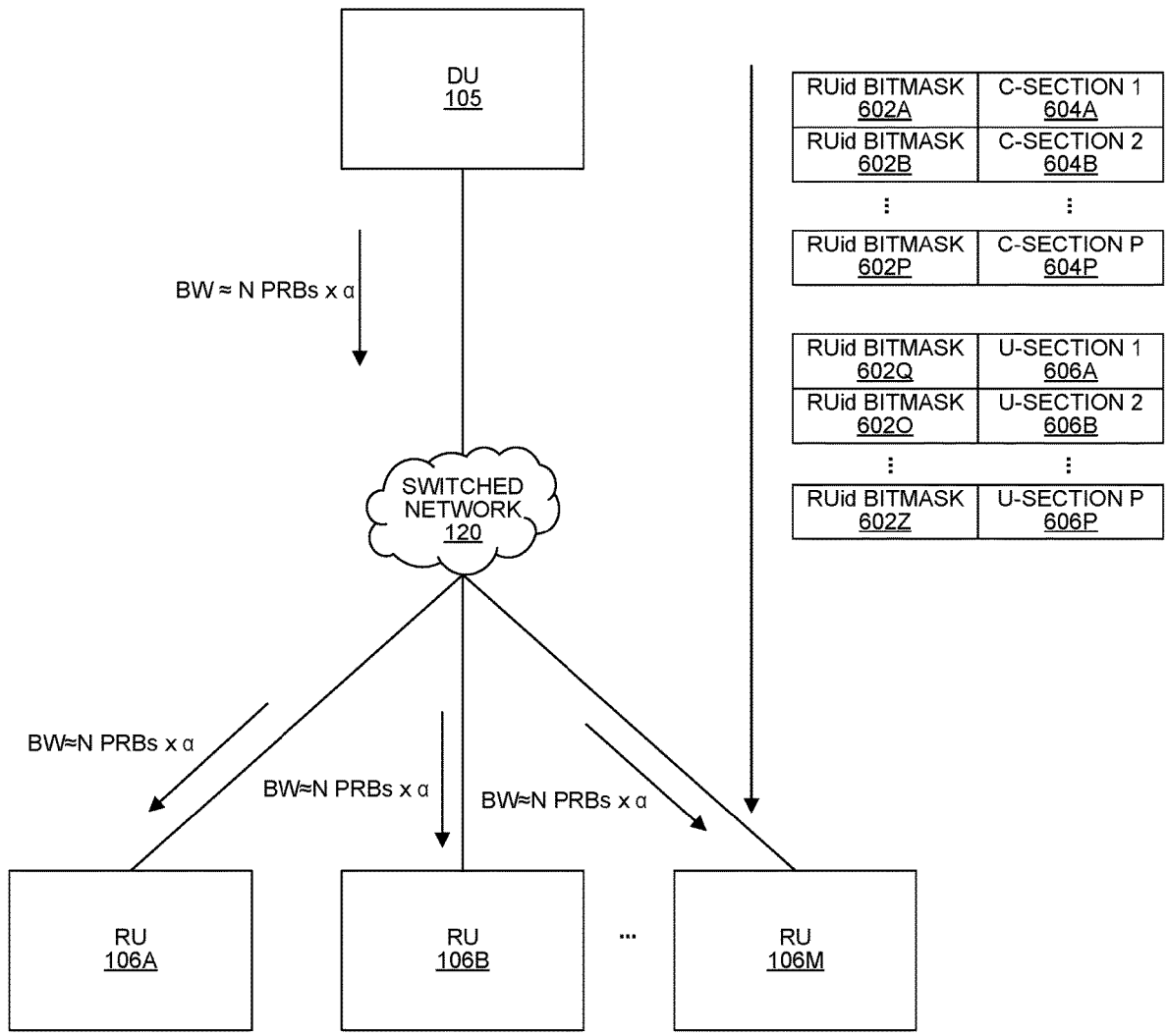
FIG. 6A is a block diagram illustrating an example downlink broadcast configuration for a fronthaul interface between a DU and multiple (M) RUs.

FIG. 6A is a block diagram illustrating an example downlink broadcast configuration for a fronthaul interface between a DU 105 and multiple (M) RUs 106. Specifically, FIG. 6A illustrates a downlink "broadcast" configuration because the DU 105 broadcasts all data to all RUs 106 and each RU 106 filters the data to determine which data is intended for it (the RU 106 does not typically broadcast all the data it receives over the air). In FIG. 6A, the DU 105 may be communicatively coupled to the RUs 106 via a switched network 120. Although not shown, the DU 105 may also be communicatively coupled to an ng-eNB CU (not shown) or a gNB CU 103 (in 5G). Furthermore, in 4G configurations, the DU 105 may instead be a baseband controller 104.

As described above, it is desirable to be able to send different sets of data to different RUs 106 in a C-RAN 100. Accordingly, additional data may be added to the control plane (C-plane) data and the user plane (U-plane) data (sent from the DU 105 to the RUs 106) indicating which RU(s) 106 the C-plane and/or U-plane data is intended for.

In some configurations, the additional data may be a bitmask, e.g., RUid bitmasks 602A-Z. Each RUid bitmask 602 may be a set of bits (e.g., each having a value of "1" or "0"), the length of which is equal to at least the number of RUs 106 communicatively coupled to (e.g., served by) a DU 105 in a single sector. The length of the RUid bitmasks 602 may be configured during initial configuration of the C-RAN 100 and/or reconfigured following initial configuration. During initial configuration (or during reconfiguration), an association is made between each bit in the RUid bitmasks 602 and a particular RU 106, i.e., each bit position is mapped to a particular RU 106. In some examples, RUid bitmasks 602 may be reduced to a length of zero, which corresponds to O-RAN 1.0, e.g., so the RUid bitmask 602 is backward compatible. That is, a DU 105 that supports the enhanced fronthaul interface mode described here in which different sets of data can be sent to different RUs 106 using the additional data (that is, the RUid bitmask) can also be configured to operate in a backward-compatible, O-RAN 1.0 fronthaul interface mode by reducing the length of the RUid bitmask to zero. Furthermore, it is understood that the additional data may take any form suitable for indicating which RU(s) 106 a set of C-plane or U-plane data is intended for.

Each RU 106 serving a given sector can be assigned a unique identifier ("RUid"). For example, each RU 106 serving a given sector can be assigned an RUid that is an integer between 0 and the number of RUs serving that sector ("nRUs") minus 1 (that is, between 0 and nRUs-1). Also, each RU 106 serving a given sector is assigned a particular bit position within the RUid bitmask 602. This bit position within the RUid bitmask 602 is also referred to here as an "RU-index." If a RUid is assigned to each RU 106, the RU-index can be determined from the RUid. For example, where each RU 106 serving the sector is assigned an RUid that is an integer between 0 and nRUs-1, the bit positions in the RUid bitmask 602 can be numbered (indexed) from 0 to nRUs-1. The RU-index assigned to each RU 106 serving the sector can be the bit-position number (index) that corresponds to the RUid assigned to that RU 106. That is, the RU-index is equal to the RUid assigned to that RU 106. For example, if an RU 106 is assigned an RUid of 6, then the RU-index assigned to that RU 106 is 6. However, it is to be understood that the RU-index need not be determined from the RUid assigned to each RU 106. Also, it is to be understood that the use of the RUid is optional (that is, in some embodiments, a respective RU-index is assigned to each RU 106 serving the sector but no separate RUid is assigned to each RU 106).

The management system 107 can use O-RAN M-plane communications to configure (or reconfigure) the C-RAN to use the enhanced fronthaul interface mode for a given sector (including the assignment of RUids (if used) and RU-indexes). The management system 107 can determine the RUid assignments (if used) and RU-index assignments and then communicate these assignments to the relevant CU 103, DU 105, and RUs 106 along with other information specifying how the enhanced fronthaul interface mode should be configured. The management system 107 can also use O-RAN M-plane communications to synchronize when the CU 103, DU 105, and RUs 106 should start operating in the enhanced fronthaul interface mode using the new configuration. For example, the management system 107 can use O-RAN M-plane communications to specify a particular point in time when to start operating in the enhanced fronthaul interface mode using the new configuration.

In some configurations, the DU 105 transmits C-plane data in a grouping of at least one packet referred to as a C-Section 604A-P, and the DU 105 transmits U-plane data in a grouping of at least one packet referred to as a U-Section 606A-P. In these configurations, an RUid bitmask 602 may be included inside each C-Section 604 and U-Section 606. Alternatively, the additional data (e.g., RUid bitmask 602) may be associated with the C-plane data and U-plane data in some other way, e.g., appended to. Each C-Section 604 and U-Section 606 may respectively include control and I/Q data.

In a simple example, there is one bit in every RUid bitmask 602 for every RU 106 served by the DU 105, each bit position corresponding to a particular RU 106. When any particular bit in an RUid bitmask 602 is set (e.g., to "1"), it signifies that the grouping of packets sent in the associated section is intended to be received by a particular RU 106 corresponding to the set bit. More than one bit (each corresponding to a different RU 106), or all bits, may be set in an RUid bitmask 602. All the packets are broadcast (e.g., via ETHERNET) from the DU 105 to all RUs 106, and each RU 106 can identify whether a grouping of packets is intended for it (by determining whether the bit in the RUid bitmasks 602 corresponding to the respective RU 106 is set) without decoding all sections. In other words, each RU 106 filters packets that are not address to it based on the RUid bitmask 602 sent in (or otherwise associated with) the associated section/packet(s). Furthermore, data meant for all (or many) RUs 106 is still sent only once over the initial access link, e.g., from the DU 105 to the switched network 120.

The example downlink broadcast configuration of FIG. 6A allows a DU 105 to broadcast a single stream to all RUs 106 (e.g., via ETHERNET), but enables different data to be tailored to different RUs 106 because each RU 106 can filter received data to determine if they need to decode a section. This has a further advantage over the shared cell proposal (in FIG. 4) because it does not require an FHM 122 for replication on the downlink or combining/digital summation on the uplink. For example, the switched network 120 may be implemented using off-the-shelf devices, e.g., switch(es), router(s), and/or other networking device(s). In the downlink broadcast configuration, the bandwidth utilized from the DU 105 to the switched network 120 may be approximately N PRBs×α, and the bandwidth utilized from the switched network 120 to each RU 106 may be approximately N PRBs×α.

Two possible modifications to the example downlink broadcast configuration are possible. In a first modification, multicasting capabilities provided by the switches (or other networking equipment) in the switched network 120 (for example, ETHERNET or IP multicast capabilities) are used to transport fronthaul data.

For example, such a multicast modification can be used for downlink fronthaul data. Various multicast groups can be defined, with each multicast group containing a different subset of the RUs 106 serving a given sector. Each RU 106 can be (and typically would be) included in more than one multicast group. The relevant switches (or other networking equipment) in the switched network 120 are configured to implement the defined multicast groups.

When downlink fronthaul data (for example, C-plane or U-plane data) needs to be transmitted from the relevant central unit (that is, the controller 104 or the DU 105) to a particular subset of RUs 106, the central unit checks if there is a multicast group that "matches" this subset. In one implementation, a multicast group "matches" a subset of RUs 106 if that multicast group includes all of the RUs 106 in that particular subset of RUs 106 (even if though that multicast group may include other "extra" RUs 106 that are not in the subset of RUs 106 to which the downlink fronthaul data is to be transmitted over the fronthaul). If there is more than one matching multicast group, the matching multicast group that "best matches" the subset of RUs 106 is determined. The matching multicast group that includes the least total number of RUs 106 can be considered to best match the subset of RUs 106. If there are multiple matching multicast groups that include the least number of RUs 106, one of those multiple matching multicast groups can be selected (for example, selected randomly or using some other process).

If there is a matching multicast group, the relevant central unit (that is, the controller 104 or the DU 105) multicasts the downlink fronthaul data to the multicast group that best matches the subset of RUs 106 to which the data is to be communicated. When multicast transmission is used, only a single version of the downlink fronthaul data is transmitted over the boundary ETHERNET link used to couple the relevant central unit to the switched network 120. The switches in the switched network 120 (as a part of standard ETHERNET or IP multicasting) distribute the downlink fronthaul data as needed and send it to all of the RUs 106 included in that multicast group. Any RU 106 that is not a member of that multicast group will not receive the downlink fronthaul data transmitted to that multicast group. As a result, the RUs 106 that are not members of that multicast group will not receive downlink fronthaul data that is not intended for them, which conserves the bandwidth of the boundary ETHERNET links that terminate at those RUs 106.

When multicasting is used in this way, the RUid bitmask can also be included in the fronthaul data that is multicasted (though in some other examples, the RUid bitmask is not included in the fronthaul data that is multicasted). Because the number of multicast groups that may be used in the switched network 120 is typically limited, it may be the case that there is no suitable "matching" multicast group. In this case, the relevant central unit (that is, the controller 104 or the DU 105) can use broadcast transmission of the downlink fronthaul data as described above and the RUs 106 can use the RUid bitmask and RU-index to determine if they should process the received downlink fronthaul data. Also, it may be the case that a "matching" multicast group includes some "extra" RUs 106 for which the fronthaul data is not intended. In this case, the central unit can use multicast transmission to transmit the downlink fronthaul data to the matching multicast group. As a result of this, the downlink fronthaul data will be received at these extra RUs 106 for which the fronthaul data is not intended. Even though some extra RUs 106 may receive fronthaul data that is not intended for them when fronthaul data is multicast over the fronthaul network, multicasting will still result in fewer RUs 106 receiving fronthaul data that is not intended for them (and will still result in fewer ETHERNET links supplying the RUs 106 being impacted) than would be the case if the fronthaul data was broadcast over the fronthaul network. The RUs 106 in the multicast group can use the RUid bitmask and RU-index to determine if they should process the received downlink fronthaul data. The extra RUs 106 in the matching multicast group for which the fronthaul data is not intended would not process the received downlink fronthaul data based on a determination that their RU-indexes do not match the RUid bitmask included in the received downlink fronthaul data.

An initial set of multicast groups can be defined for the switched network 120, with each multicast group containing a different subset of the RUs 106 and where each RU 106 can be (and typically would be) included in more than one multicast group. Then, periodically the set of multicast groups used in the switched network 120 can be added to (if the switched network 120 can accommodate additional multicast groups) or changed to reflect actual fronthaul traffic flows and/or actual locations of UEs and the RUs 106 used to serve them. In connection with doing this, the set of multicast groups used in the switched network 120 can be changed by removing the multicast groups that are least used and replacing them with multicast groups that are more likely to be used based on recent fronthaul traffic flows and/or recent locations of UEs and the RUs 106 used to serve them. The locations of UEs and the RUs 106 used to serve them can be determined in various ways, for example, using Sounding Reference Signal (SRS), Physical Uplink Control Channel (PUCCH), Physical Uplink Shared Channel (PUSCH), and Physical Random Access Channel (PRACH) measurements in the uplink at each RU 106, preferred beam information determined by the UEs, Channel State Information Reference Signal (CSI-RS) measurement reports received from the UEs. The definition of the multicast groups and configuring of the switches can be done by the entity that implements the scheduler for the air interface (for example, the controller 104 or the DU 105), by the management system 107, or combinations of the entity implementing the scheduler and the management system 107, as well by other entities (either independently or in combination with any of the preceding entities). O-RAN M-plane communications can be used for any related communications (for example, any needed communications to inform the management system 107, relevant central unit, and RUs 106 of the updated set of multicast groups, to configure the switches in the switched network 120 to implement the updated set of multicast groups, and to indicate to the management system 107, relevant central unit, and RUs 106 when to start using the updated set of multicast groups). Any of the M-plane communication architectures noted above (hierarchical, direct, or hybrid) can be used for such M-plane communications.

In a second modification, one or more entities 109 (one of which is shown in FIGS. 9A and 9B) that are in or are coupled to the switched network 120 used to implement the fronthaul network 116 are configured to perform deep packet inspection (DPI). Each such entity 109 is also referred to generically as a "DPI entity" 109. In such a DPI configuration, each DPI entity 109 may (1) analyze, using the RUid bitmasks 602, the C-plane data (e.g., C-Sections 604) and U-plane data (e.g., U-Sections 606) for all remote units 106; and (2) selectively send each RU 106 only the data intended for it. In other words, the relevant central unit (that is, the baseband controller 104 in the example shown in FIG. 9A or the DU 105 in the example shown in FIG. 9B) would still send the C-plane data (e.g., C-Sections 604) and U-plane data (e.g., U-Sections 606) for all RUs 106 to the switched network 120, but each DPI entity 109 would perform filtering (using the bitmasks) and forward each section only to the RUs 106 indicated in the bitmask for the section. Each section is not forwarded to any RU 106 that is not indicated in the bitmask for the section (that is, each section is not forwarded to any RU 106 that the section is not intended for), which conserves the bandwidth of the boundary ETHERNET links that terminate at those RUs 106. The DPI approach typically involves much less management overhead than is typically required with the multicast-group approach (for example, the DPI approach does not require the defining of multicast groups and the configuring of the switches to use the defined multicast groups, both initially and periodically thereafter).

Each DPI entity 109 can be implemented by embedding the DPI function as part of an ETHERNET switch. Moreover, as noted above, DPI can be performed in one or more other entities (in addition to, or instead of, being performed in one or more switches). Such one or more other entities can include the Fronthaul Manager (FHM) 122 described above in connection with the O-RAN shared cell proposal. Also, although only a single DPI entity 109 is shown in FIGS. 9A and 9B for ease of illustration, it is to be understood that multiple DPI entities 109 can be used. For example, the switched network 120 would typically include multiple switches. If the DPI is performed in the switches of the switched network 120, it may be preferable to implement a DPI function in each switch of the switched network 120, which may result in more efficient fronthaul bandwidth usage.

Figure 6B:
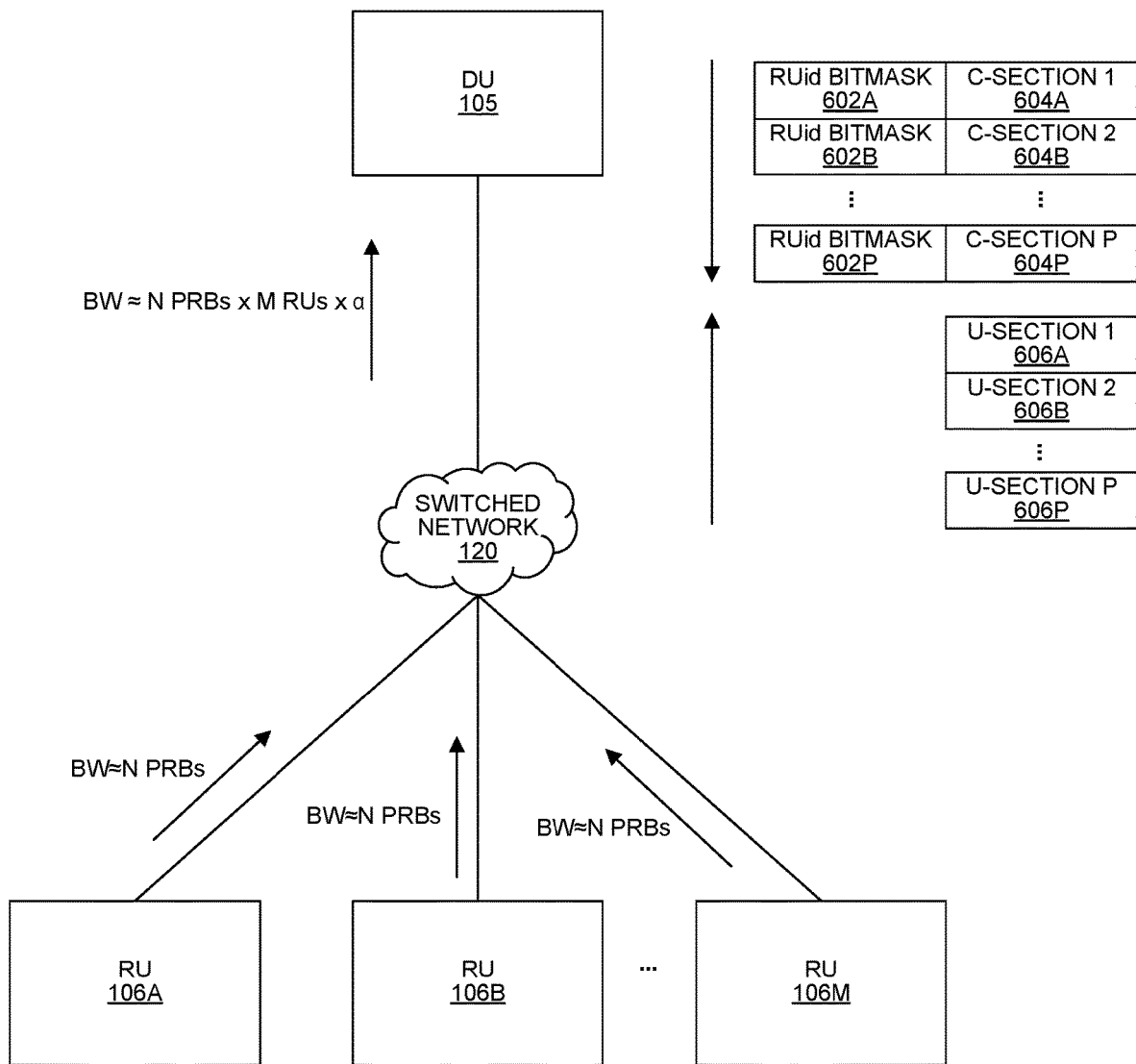
FIG. 6B is a block diagram illustrating an example uplink configuration for a fronthaul interface between a DU and multiple (M) RUs.

FIG. 6B is a block diagram illustrating an example uplink configuration for a fronthaul interface between a DU 105 and multiple (M) RUs 106. Similar to FIG. 6A, the DU 105 may be communicatively coupled to the RUs 106 via a switched network 120. Although not shown, the DU 105 may also be communicatively coupled to an ng-eNB CU (not shown) or a gNB CU 103 (in 5G). Furthermore, in 4G configurations, the DU 105 may instead be a baseband controller 104.

In a C-RAN 100, the DU 105 may send control plane data (e.g., C-Sections 604) to the RUs 106. Among other things, the control plane data may indicate to the RUs 106 which PRBs to send on the uplink (to the DU 105). Accordingly, additional data (e.g., an RUid bitmask) may be added to the control plane (C-plane) data. For example, where the DU 105 groups packets of C-plane data in C-Sections 604, the DU 105 may include an RUid bitmask 602 inside (or otherwise associated with) each C-Section 604, as described above. However, since uplink U-plane data (e.g., U-Sections 606) is unicast from each RU 106 to the DU 105, the additional data (e.g., RUid bitmasks 602) are not required for uplink U-plane data (U-Sections 606). The bandwidth utilization may be the same as the O-RAN 1.0 implementation (with minor C-plane overhead differences): approximately N PRBs×M RUs×α from the switched network 120 to the DU 105 and approximately N PRBs from each RU 106 to the switched network 120.

In FIG. 6A, both the C-plane and U-plane data is shown as being communicated over the fronthaul using the enhanced fronthaul interface mode and the broadcast scheme described above. However, for a given transmission time interval (TTI), different packets can be transmitted in different ways. That is, for a given TTI, some packets can be transmitted using unicast transmission, some packets can be transmitted using broadcast transmission, and, if used, some packets can be transmitted using multicast transmission. For example, there may be instances where the same U-plane packet is communicated over the fronthaul to multiple RUs 106 (to either all of the RUs 106 using broadcast or a subset of the RUs 106 using multicast) but separate and different C-plane messages (and C-plane packets) are communicated over the fronthaul to each of the RUs 106. These different C-plane messages can specify, for example, different beamforming or precoder information to be used in processing the U-plane data communicated in the common U-plane packet.

Figure 7:
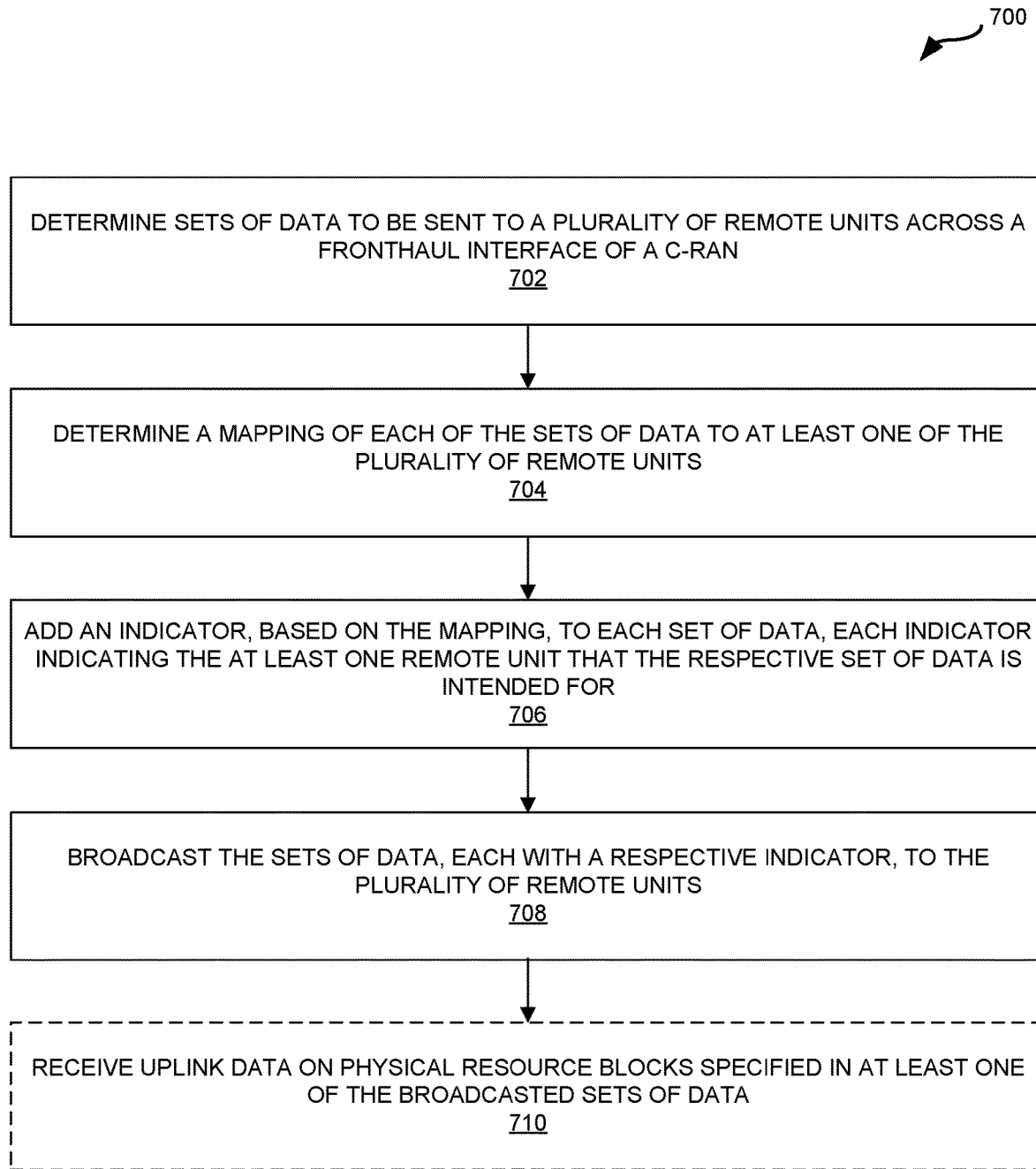
FIG. 7 is a flow diagram illustrating a method for sending data across a fronthaul interface in a C-RAN.

FIG. 7 is a flow diagram illustrating a method 700 for sending data across a fronthaul interface in a C-RAN 100. The method 700 may be performed by at least one processor in a DU 105 (in a 5G configuration) or a baseband controller 104 (in a 4G configuration). The DU 105 (or baseband controller 104) may be communicatively coupled to multiple (M) RUs 106 via a switched network 120. The DU 105 (or baseband controller 104) and the RUs 106 may form a C-RAN 100.

The blocks of the flow diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner). Also, most standard exception handling is not described for ease of explanation; however, it is to be understood that method 700 can and typically would include such exception handling.

The method 700 may begin at step 702 where the at least one processor determines sets of data to be sent to a plurality of remote units (RUs) 106 across a fronthaul interface of a C-RAN 100. Each set of data may include control plane (C-plane) data and/or user plane (U-plane) data. C-plane data may be transmitted in at least one C-Section 604, each including at least one packet of I/Q data and, optionally, an indication of at least one physical resource block (PRB) on which the I/Q data is to be transmitted over the air (by at least one RU 106). U-plane data may be transmitted in at least one U-Section 606, each including at least one packet of I/Q data and, optionally, an indication of at least one physical resource block (PRB) on which the I/Q data is to be transmitted over the air (by at least one RU 106).

The method 700 may proceed at step 704 where the at least one processor determines a mapping of each of the sets of data to at least one of the plurality of RUs 106. This mapping may be based on PRB groups, frequency reuse layers, and/or the channel(s) to which the respective set of data relates to.

As described above, PRB groupings are all created by the scheduler (L2 processing in the DU 105 or CU 103 in 5G or the baseband controller 104 in 4G) in order to service a set of UEs 110. UEs 110 are assigned certain numbers of PRB groups based on their demand, and also taking fairness and other factors into account. Sets of RUs 106 are assigned to different such PRB groups based on the knowledge of the proximity of the UEs 110 to the RUs 106. This knowledge can be gained by the scheduler through uplink measurements, UE 110 feedback information, etc. If PRB groups are used, a particular RU 106 only has use for packets for the PRB group to which it belongs.

Reuse layers are all created by the scheduler (L2 processing in the DU 105 or CU in 5G or the baseband controller 104 in 4G) in order to service a set of UEs 110, e.g., based on the knowledge of the proximity of the UEs 110 to the RUs 106 from uplink measurements, UE 110 feedback information, etc. In the downlink, frequency reuse utilizes multiple groups, each of which contains at least one RU 106 to each transmit to a different UE 110 on the same frequency at the same time (where each RU 106 in a reuse layer is sufficiently RF-isolated from each RU 106 in the other reuse layer(s)). On the uplink, each of multiple UEs 110 can transmit to a different reuse layer of at least one RU 106 on the same frequency at the same time (where each RU 106 in a reuse layer is sufficiently RF-isolated from each RU 106 in the other reuse layer(s)).

As described above, the following transmission types may be used: (1) narrowcasting different data sets to different RUs 106 for some channels and reference signals (e.g., the Physical Downlink Shared Channel (PDSCH), Physical Downlink Control Channel (PDCCH), Demodulation Reference Signal (DMRS), and Phase Tracking Reference Signal (PTRS), etc.); (2) broadcasting common channels and reference signals to all RUs 106 (e.g., the Physical Broadcast Channel (PBCH) and PDCCH (for 4G and optionally 5G), etc.); and (3) unicasting or narrowcasting some channels or reference signals (e.g., Channel State Information Reference Signal (CSI-RS) group 1 or CSI-RS group 2, etc.). Accordingly, different sets of data may be mapped to different sets of RUs 106 that are served by the same DU 105.

The method 700 may proceed at step 706 where the at least one processor adds an indicator, based on the mapping, to each set of data, each indicator indicating each RU 106 that the respective set of data is intended for.

For example, each indicator may be an RUid bitmask 602 with a bit for each of the plurality of RUs 106, where each bit position corresponds to an RU 106. In other words, each RUid bitmask 602 may have at least as many bits as the number of the RUs 106 connected to the DU 105, CU 103, or baseband controller 104. When any particular bit in an RUid bitmask 602 is set (e.g., to "1"), it signifies that the set of data (e.g., C-Section 604 and/or U-Section 606) is intended to be received by a particular RU 106 corresponding to the set bit. More than one bit (each corresponding to a different RU 106), or all bits, may be set in an RUid bitmask 602.

Each indicator may be included in (or otherwise associated with) a respective set of data. In configurations where C-Sections 604 and U-Sections 606 are used to transmit control plane data and user plane data, respectively, an RUid bitmask 602 may be included inside each C-Section 604 and U-Section 606. Alternatively, the additional data (e.g., RUid bitmask) may be associated with the C-plane data and U-plane data in some other way, e.g., appended to.

The method 700 may proceed at step 708 where the at least one processor broadcasts the sets of data, each with a respective indicator, to the plurality of RUs 106. For example, all the packets may be broadcast (e.g., via ETHERNET) from the DU 105 or baseband controller 104 to all RUs 106 via the fronthaul interface. Each RU 106 can then identify whether a grouping of packets is intended for it (by determining whether the bit in the RUid bitmasks 602 corresponding to the respective RU 106 is set) without decoding all sections. For example, if an RU's bit is set to "1", the RU 106 will decode the set of data. However, if an RU's bit is set to "0", the RU 106 does not decode the set of data.

The method 700 may proceed at optional step 710 where the at least one processor receives uplink data on PRBs specified in at least one of the broadcasted sets of data. For example, the broadcasted sets of data in step 708 may include commands to one or more RUs 106 telling the RU 106 which uplink signals (PRBs) it should send back on the uplink. In this case, optional step 710 includes the RU 106 sending back the requested uplink signals.

In some configurations, multiple RUs 106 may send back info for the same PRB, either because (1) the contributions of the RUs 106 will be "combined", i.e., cooperative reception; or (2) the RUs 106 have RF isolation, and the same PRB has been assigned to different UEs 110, i.e., reuse.

Figure 8:
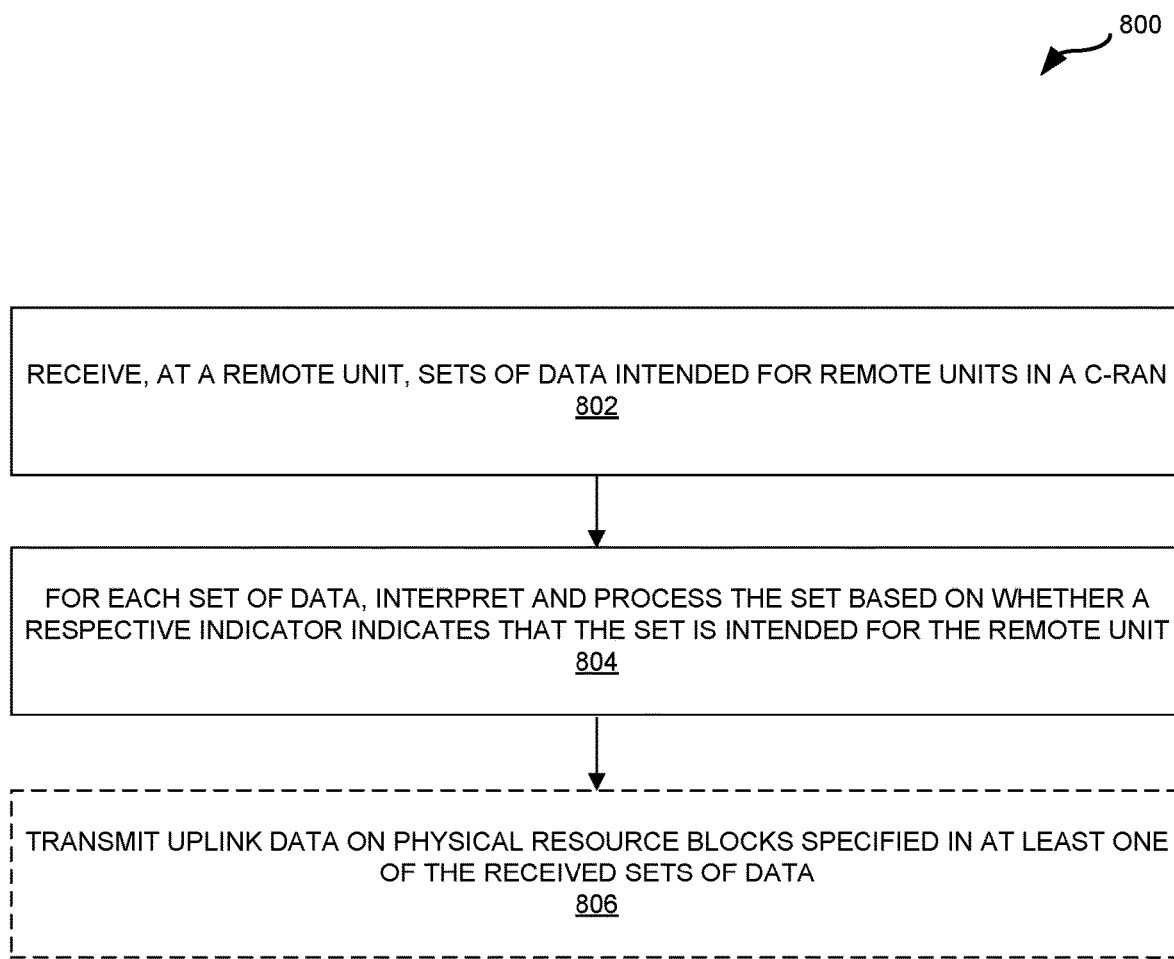
FIG. 8 is a flow diagram illustrating a method for sending data across a fronthaul interface in a C-RAN.

FIG. 8 is a flow diagram illustrating a method 800 for sending data across a fronthaul interface in a C-RAN 100. The method 800 may be performed by at least one processor in an RU 106. The RU 106 may be one of multiple (M) RUs 106 that is communicatively coupled to a DU 105 (in a 5G configuration) or a baseband controller 104 (in a 4G configuration) via a switched network 120. The RUs 106 and the DU 105 (or baseband controller 104) may form a C-RAN 100.

The blocks of the flow diagram shown in FIG. 8 have been arranged in a generally sequential manner for ease of explanation; however, it is to be understood that this arrangement is merely exemplary, and it should be recognized that the processing associated with method 800 (and the blocks shown in FIG. 8) can occur in a different order (for example, where at least some of the processing associated with the blocks is performed in parallel and/or in an event-driven manner). Also, most standard exception handling is not described for ease of explanation; however, it is to be understood that method 800 can and typically would include such exception handling.

The method 800 may begin at step 802 where the at least one processor receives sets of data intended for RUs 106 in the C-RAN 100. In examples, at least some of the sets of data are not intended for the RU 106 implementing the method 800. Each set of data may include control plane (C-plane) data and/or user plane (U-plane) data. C-plane data may be transmitted in at least one C-Section 604, each including at least one packet of I/Q data and, optionally, an indication of at least one physical resource block (PRB) on which the I/Q data is to be transmitted over the air (by at least one RU 106). U-plane data may be transmitted in at least one U-Section 606, each including at least one packet of I/Q data and, optionally, an indication of at least one physical resource block (PRB) on which the I/Q data is to be transmitted over the air (by at least one RU 106).

Each set of data may have an associated indicator (e.g., bitmask) that indicates the at least one RU 106 that the respective set of data is intended for. For example, each indicator may be an RUid bitmask 602 with a bit for each of the plurality of RUs 106, where each bit position corresponds to an RU 106.

The method 800 may proceed at step 804 where, for each set of data, the at least one processor interprets and processes the set based on whether a respective indicator indicates that the set is intended for the RU 106. When any particular bit in an RUid bitmask 602 is set (e.g., to "1"), it signifies that the set of data (e.g., C-Sections 604 and/or U-Sections 606) is intended to be received by a particular RU 106 corresponding to the set bit. For example, if an RU's bit is set to "1", the RU 106 will decode and process the set of data. However, if an RU's bit is set to "0", the RU 106 does not decode and process the set of data.

The method 800 may proceed at optional step 806 where the at least one processor transmits uplink data on PRBs specified in at least one of the received sets of data. For example, if the sets of data received (e.g., from the DU 105) in step 802 include commands to the RU 106 implementing the method 800 (and possibly more than the RU 106) telling the RU 106 which uplink signals (PRBs) it should send back to the DU 105, optional step 806 includes the RU 106 sending back the requested uplink signals.

In some configurations, multiple RUs 106 may send back info for the same PRB, either because (1) the contributions of the RUs 106 will be "combined", i.e., cooperative reception; or (2) the RUs 106 have RF isolation, and the same PRB has been assigned to different UEs 110, i.e., reuse.

Figure 10:
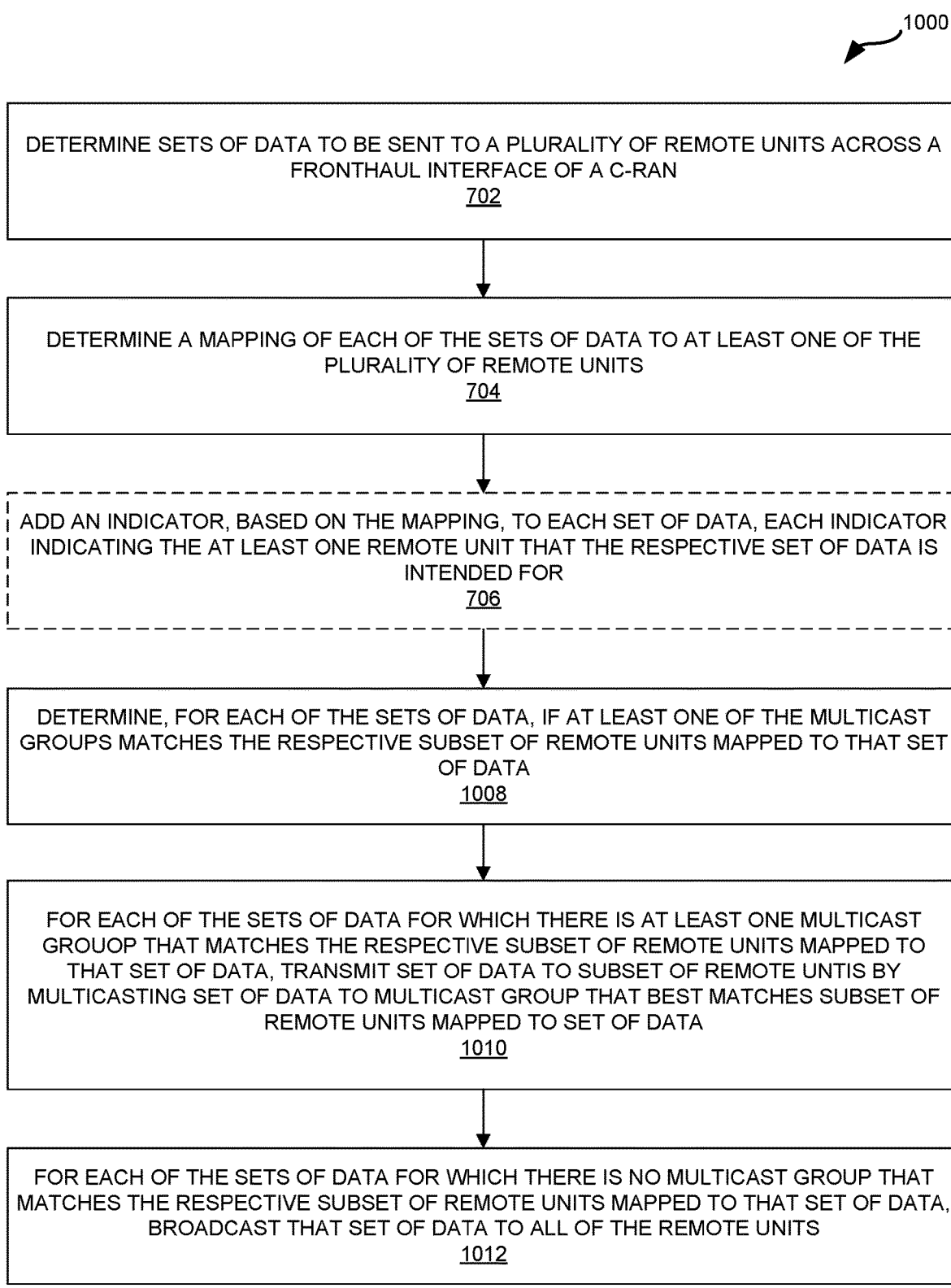
FIG. 10 is a flow diagram illustrating a method for sending data across a fronthaul interface in a C-RAN.

FIG. 10 is a flow diagram illustrating a method 1000 for sending data across a fronthaul interface and fronthaul network in a C-RAN 100 using multicast transmission and multicast groups (if possible). Except as described below, method 1000 is the same as method 700, and the corresponding description of method 700 set forth above also applies to method 1000 and is generally not repeated here for the sake of brevity.

The method 1000 may begin at step 702 where the at least one processor determines sets of data to be sent to a plurality of remote units (RUs) 106 across a fronthaul interface of a C-RAN 100. This can be done as described above in connection with FIG. 7.

The method 1000 may proceed at step 704 where the at least one processor determines a mapping of each of the sets of data to at least one of the plurality of RUs 106. That is, each of the sets of data is mapped to a subset of RUs 106, where each such subset of RUs 106 includes one or more RUs 106. This can be done as described above in connection with FIG. 7.

The method 1000 may proceed at optional step 706 where the at least one processor adds an indicator, based on the mapping, to each set of data, each indicator indicating each RU 106 that the respective set of data is intended for. This can be done as described above in connection with FIG. 7. This step 706 is optional in method 1000.

The method 1000 may proceed at step 1008 where the at least one processor determines, for each of the sets of data, if at least one of the multicast groups matches the respective subset of remote units 106 mapped to that set of data. For each of the sets of data for which there is at least one multicast group that matches the respective subset of remote units 106 mapped to that set of data, the method 1000 may proceed at step 1010 where the at least one processor transmits that set of data to the respective subset of remote units over the fronthaul network by multicasting that set of data to the multicast group that best matches the respective subset of remote units mapped to that set of data. When multicast transmission is used, only a single version of the downlink fronthaul data is transmitted over the boundary ETHERNET link used to couple the relevant central unit to the switched network 120. The switches in the switched network 120 (as a part of standard ETHERNET or IP multicasting) replicate the downlink fronthaul data as needed and send it to all of the RUs 106 included in that multicast group. Any RU 106 that is not a member of that multicast group will not receive the downlink fronthaul data transmitted to that multicast group. As a result, the RUs 106 that are not members of that multicast group will not receive downlink fronthaul data that is not intended for them, which conserves the bandwidth of the boundary ETHERNET links that terminate at those RUs 106.

For each of the sets of data for which there is no multicast group that matches the respective subset of remote units 106 mapped to that set of data, the method 1000 may proceed at step 1012 where the at least one processor broadcasts that set of data to all of the remote units 106 as described above in connection with block 708 of FIG. 7.

If optional step 706 is performed, then each such set of data is multicasted or broadcasted as the case may be, with the respective indicator. The indicator included with the set of data can be used by each RU 106 that receives the set of data to determine if that set of data is intended for it as described above. For example, where a set of data is multicasted to a multicast group having extra RUs 106, those extra RUs 106 will be able to use the indicator included with the set of data to determine that the set of data is not intended for it. Likewise, where a set of data is broadcasted to all of the RUs 106, the indicator can be used by each of the RUs 106 to determine if that set of data is intended for it in the manner described.

As noted above, in one implementation, a multicast group "matches" a subset of RUs 106 if that multicast group includes all of the RUs 106 in that particular subset of RUs 106 (even if that multicast group includes other extra RUs 106 that are not in the subset of RUs 106 to which the fronthaul data is to be transmitted over the fronthaul). If there is more than one matching multicast group, the matching multicast group that best matches the subset of RUs 106 can be determined based on the total number of RUs 106 included in each of the matching multicast groups. The matching multicast group that includes the least total number of RUs 106 can be considered to best match the subset of RUs 106. If there are multiple matching multicast groups that include the least number of RUs 106, one of those multiple matching multicast groups can be selected (for example, selected randomly or using some other process).

As noted above, an initial set of multicast groups for the switched network 120 are defined and the switches in the switched network 120 are configured to implement the initial set of multicast groups. Then, as noted above, periodically the set of multicast groups used in the switched network 120 can be added to (if the switched network 120 can accommodate additional multicast groups) or changed to reflect actual fronthaul traffic flows and/or actual locations of UEs and the RUs 106 used to serve them and the switches in the switched network 120 can be configured to implement the updated set of multicast groups.

Figure 11:
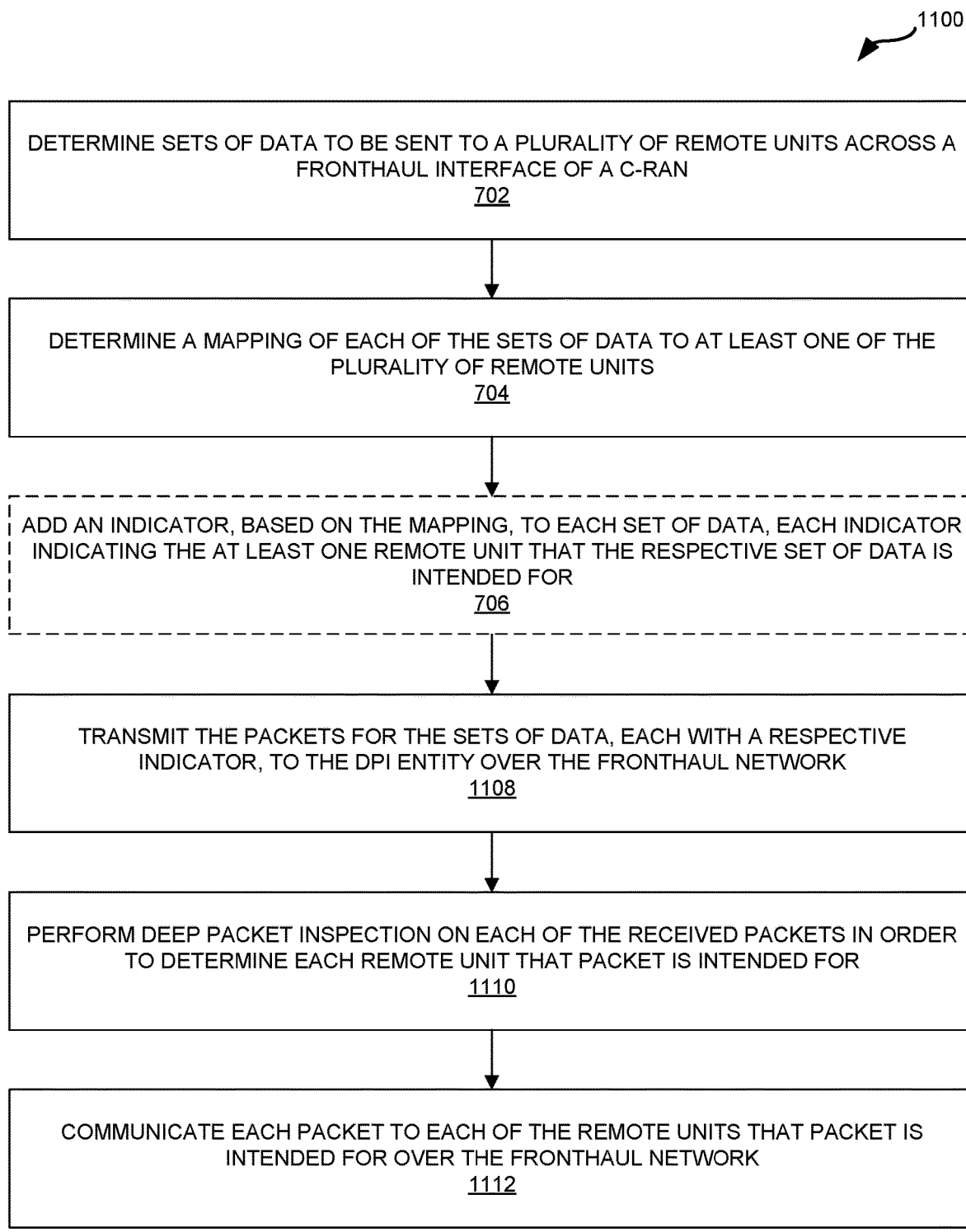
FIG. 11 is a flow diagram illustrating a method for sending data across a fronthaul interface in a C-RAN.

FIG. 11 is a flow diagram illustrating a method 1100 for sending data across a fronthaul interface in a C-RAN 100 using the second modification described above. When the second modification described above is used, deep packet inspection is used. The method 1100 may be implemented in part by at least one processor in a DU 105 (in a 5G configuration) or a baseband controller 104 (in a 4G configuration) and in part by an entity that performs deep packet inspection (such as an ETHERNET switch or another entity such as the Fronthaul Manager (FHM) described above in connection with the O-RAN shared cell proposal).

Except as described below, method 1100 is the same as method 700, and the corresponding description of method 700 set forth above also applies to method 1100 and is generally not repeated here for the sake of brevity.

The method 1100 may begin at step 702 where the at least one processor determines sets of data to be sent to a plurality of remote units (RUs) 106 across a fronthaul interface of a C-RAN 100. This can be done as described above in connection with FIG. 7.

The method 1100 may proceed at step 704 where the at least one processor determines a mapping of each of the sets of data to at least one of the plurality of RUs 106. That is, each of the sets of data is mapped to a subset of RUs 106, where each such subset of RUs 106 includes one or more RUs 106. This can be done as described above in connection with FIG. 7.

The method 1100 may proceed at step 706 where the at least one processor adds an indicator, based on the mapping, to each set of data, each indicator indicating each RU 106 that the respective set of data is intended for. This can be done as described above in connection with FIG. 7. More specifically, in the example described here where the fronthaul data is communicated over the fronthaul network in packets, an indicator, based on the mapping, is added to the packets for each set of data, where each such indicator indicates each remote unit for which the respective packet and set of data is intended.

The method 1100 may proceed at step 1108 where the at least one processor transmits the packets for the sets of data, each with a respective indicator, to the DPI entity 109 over the fronthaul network. The method 1100 may proceed at step 1110 where the DPI entity 109 is configured to perform deep packet inspection on each of the received packets in order to determine each remote unit 106 that packet is intended for and may proceed at step 1112 where the DPI entity 109 is configured to communicate each packet to each of the remote units 106 that packet is intended for over the fronthaul network.

As a result of doing this, each packet is not forwarded to any RU 106 that the packet is not intended for, which conserves the bandwidth of the boundary ETHERNET link that terminate at those RUs 106. As noted above, method 1100 does not require the management overhead required with method 1000 (for example, method 1100 does not require the defining of multicast groups and the configuring of the switches to use the defined multicast groups, both initially and periodically thereafter).

Figure 12:
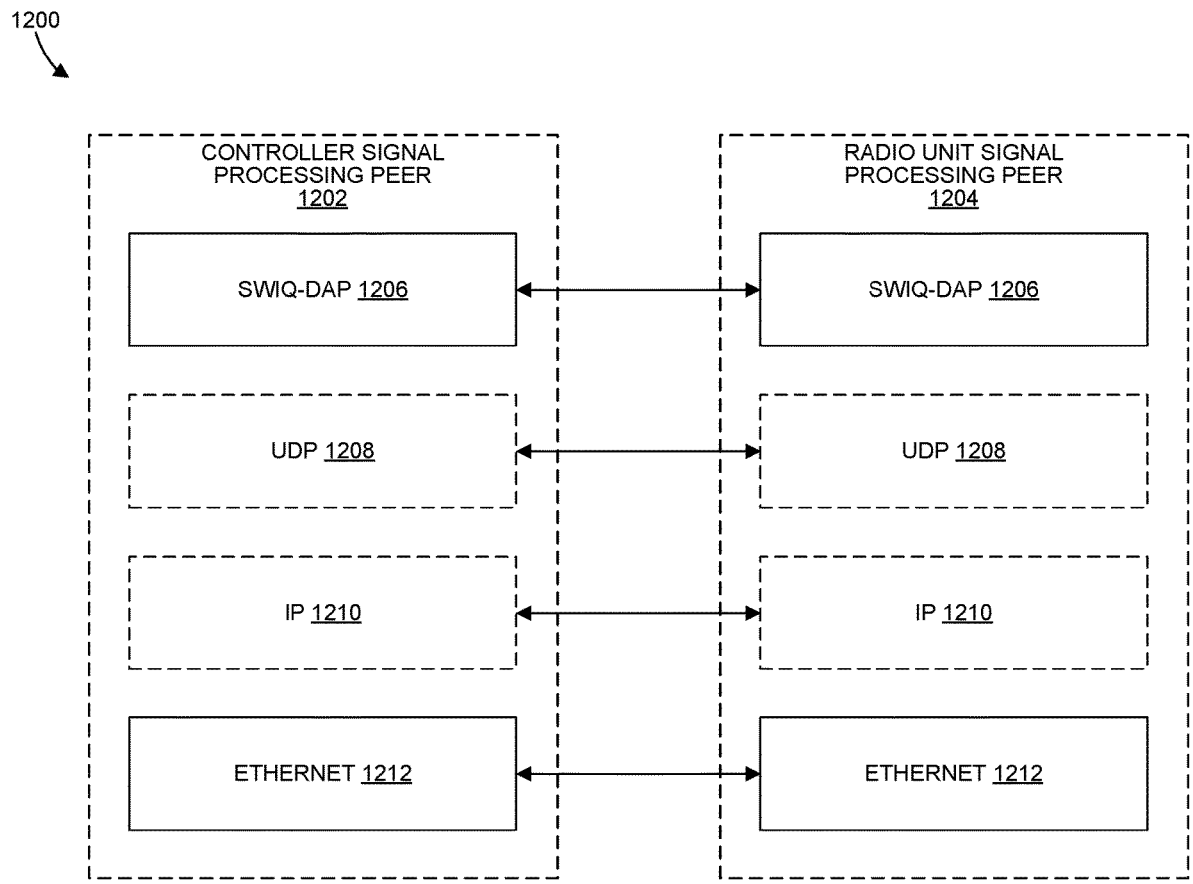
FIG. 12 is a block diagram illustrating one example of a protocol stack suitable for communicating I/Q data between each controller and the associated radio units over the fronthaul network.

FIG. 12 is a block diagram illustrating one example of a protocol stack 1200 suitable for communicating I/Q data between each controller 104 (or 5G CU 103 or DU 105) and the associated radio units 106 over the fronthaul network 116. The controller 104 (or CU 103 or DU 105) and each associated radio unit 106 implements a respective signal processing peer entity 1202 and 1204, respectively, that implements the protocol stack 1200.

As shown in FIG. 12, the highest layer of the protocol stack 1200 comprises the application layer protocol 1206 that is used for communicating I/Q data over the fronthaul 116 between the controller 104 (or CU 103 or DU 105) and each radio unit 106. As noted above, the I/Q data communicated over the fronthaul 116 is used in the digital signal processing that is performed in order to implement the wireless interface for the cell 108.

In this example, the application layer protocol 1206 is also referred to here as the "switched I/Q DSP Application Protocol" or "SwIQ-DAP" layer 1206. Because many different types of I/Q data can be communicated between the controller 104 (or CU 103 or DU 105) and each radio unit 106 over the fronthaul 116, the I/Q data is communicated using Type-Length-Value (TLV) elements 1300, which are illustrated in FIG. 13A.

Figure 13A:
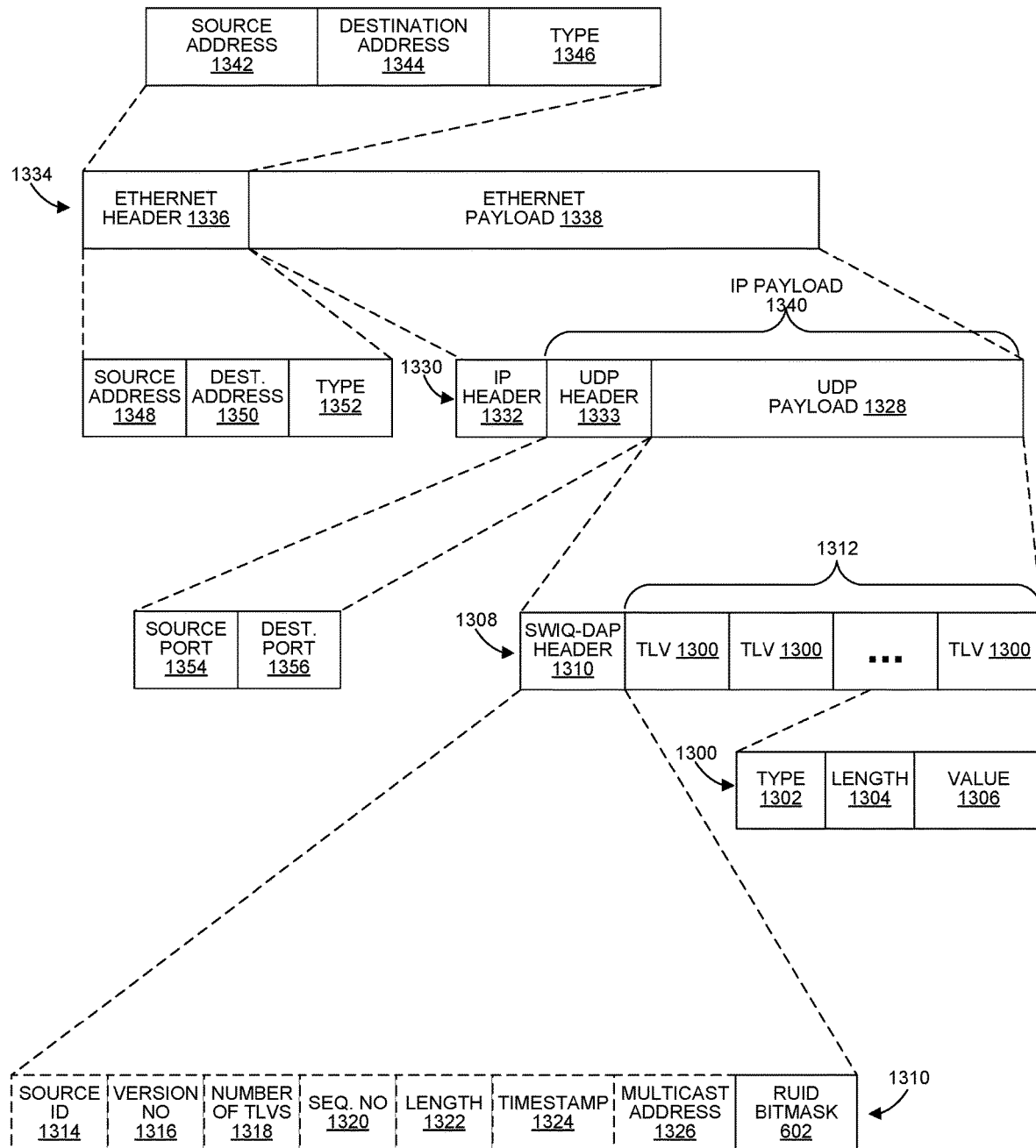
FIG. 13A is a block diagram illustrating one example of fields in an ETHERNET packet, an Internet Protocol (IP) packet, a SwIQ-DAP protocol data unit (PDU), a TLV element, and a SwIQ-DAP header.
Figure 13B:
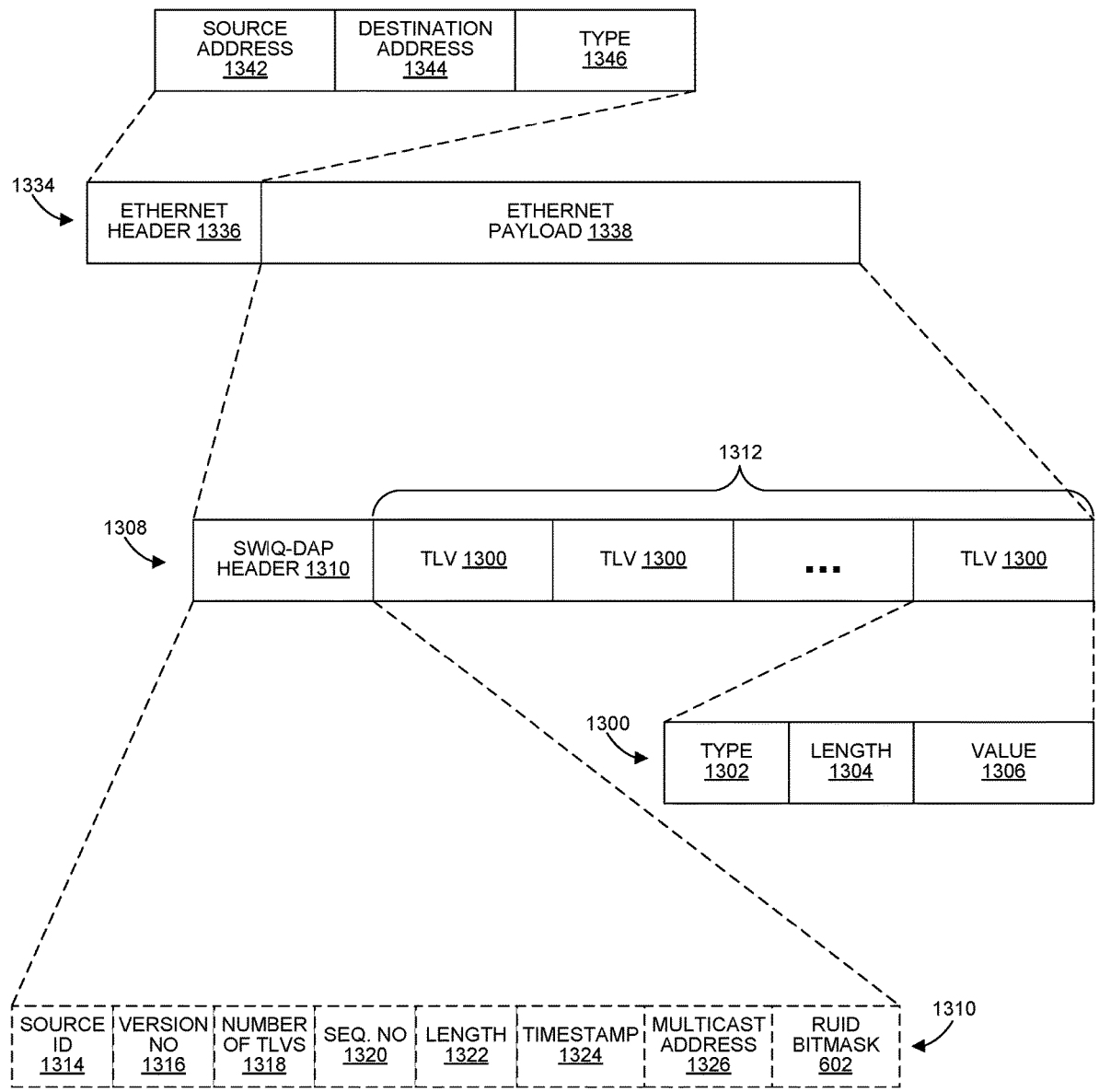
FIG. 13B is a block diagram illustrating another example of fields in an ETHERNET packet, a SwIQ-DAP protocol data unit (PDU), a TLV element, and a SwIQ-DAP header.

FIG. 13A is a block diagram illustrating one example of fields in an ETHERNET packet 534, an Internet Protocol (IP) packet 1330, a SwIQ-DAP protocol data unit (PDU) 1308, a TLV element 1300, and a SwIQ-DAP header 1310. FIGS. 13A-B do not include all fields that might be included in the various packets, PDUs, headers, etc. Each TLV element 1300 comprises a type field 1302 that identifies what type and format of I/Q data is contained in that element 1300, a length field 1304 that identifies how long that element 1300 is, and a value field 1306 that contains the data or payload for that element 1300. The type field 1302 and length field 1304 have a fixed length, whereas the length of the value field 1306 can vary.

In this example, as shown in FIG. 13A, one or more TLV elements 1300 are combined together into a single SwIQ-DAP protocol data unit (PDU) 1308. Each such SwIQ-DAP PDU 1308 includes a header 1310 and a payload 1312 comprising one or more TLV elements 1300 (the number of which depends on the maximum transmission unit (MTU) size specified for the SwIQ-DAP PDUs 1308). In this example, the SwIQ-DAP header 1310 comprises a source identifier field 1314 that is used to identify the sender of the PDU 1308. In one example where there is only one controller 104 (or CU 103 or DU 105) that serves each cell 108, the source identifier field 1314 is only used to for uplink data in order to identify which RU 106 has sent a SwIQ-DAP PDU 1308 to that one controller 104 (or CU 103 or DU 105) (since multiple RUs 106 can send such PDUs 1308 to the controller 104 (or CU 103 or DU 105)) but is left undefined for downlink SwIQ-DAP PDUs 1308 that are sent from the controller 104 (since there is only one controller 104 (or CU 103 or DU 105) that serves the cell 108). In another example where multiple controllers 104 (or DUs 105 or CUs 103) serve each cell 108, the source identifier field 1314 is used both to identify which RU 106 has sent each uplink SwIQ-DAP PDU 1308 to the controllers 104 and to identify which controller 104 (or CU 103 or DU 105) has sent each downlink SwIQ-DAP PDU 1308 to one or more RUs 106. In some examples, the SwIQ-DAP header 1310 does not have a fixed size.

In this example, the SwIQ-DAP header 1310 also comprises a version number field 1316 that identifies the version number for the SwIQ-DAP, a number of TLVs field 1318 that specifies the number of TLV elements 1300 that are included in that PDU 1308, a sequence number 1320 that specifies a transmission sequence number for that PDU 1308, a length field 1322 that specifies the length of that PDU 1308, and a time stamp field 1324 that contains a time stamp specifying when that PDU 1308 was sent. In this example, the SwIQ-DAP header 1310 also comprises an application-layer multicast address field 1326 that can be used to specify a multicast group of radio units 106 at the application layer level. This can be done as described above in connection with FIG. 3, where each bit position of the application-layer multicast address field 1326 is associated with a respective radio unit 106, where that bit position is set if the associated downlink I/Q data is intended for that radio unit 106 and where that bit positioned is cleared if the associated downlink I/Q data is not intended for that radio unit 106. It should be noted that the elements 1314-1326 are optional because actual implementations of the SwIQ-DAP header 1310 may include less than all (or none) of them.

In some configurations, the SwIQ-DAP header 1310 may include the RUid bitmask 602. For example, the RUid bitmask 602 may indicate the RUs 106 that are required to decode and/or transmit the payload 1312 associated with the SwIQ-DAP header 1310. During deep packet inspection, the DPI entity 109 may compare (e.g., bitwise AND) the RUid bitmask 602 to one or more bit patterns to determine whether to forward at least a portion of the ETHERNET packet 1334 to the destination RU(s) 106.

Optionally, the RUid bitmask 602 is required to be in the first X (e.g., 64, 128, etc.) bytes of the UDP payload 1328, in which case at least some of the SwIQ-DAP header 1310 would be located in the first X bytes of the UDP payload. This constraint is optionally implemented based on the at least one processor in the ETHERNET switch (in the fronthaul network 116) performing the deep packet inspection. For example, if the at least one processor can analyze 64 bytes deep into the UDP payload 1328 and still meet latency requirements of the system, then the RUid bitmask 602 should be in the first 64 bytes of the UDP payload 1328. However, if the at least one processor in the DPI entity 109 can analyze 128 bytes deep into the UDP payload 1328 and still meet latency requirements of the system, then the RUid bitmask 602 may only be required to be in the first 128 bytes of the UDP payload 1328. In other words, the exact requirement imposed on the positioning of the RUid bitmask 602 in the UDP payload 1328 may be based on limitations of the at least one processor performing the deep packet inspection. Alternatively or additionally, the RUid bitmask 602 is required to be in the first X (e.g., 64, 128, etc.) bytes of the ETHERNET payload 1338, in which case at least some of the SwIQ-DAP header 1310 would be located in the first X bytes of the ETHERNET payload 1338. Therefore, even though its shown at the end of the SwIQ-DAP header 1310, the RUid bitmask 602 could be located differently within the SwIQ-DAP header 1310.

As shown in FIG. 12, the next layers of the protocol stack 1200 comprises the optional User Datagram Protocol (UDP) layer 1208 and the optional Internet Protocol (IP) layer 1210 via which UDP datagrams (or "UDP packets") encapsulated in IP packets can be communicated between the controller 104 (or CU 103 or DU 105) and the radio units 106. In FIG. 13A, each SwIQ-DAP PDU 1308 is shown as being transmitted as a UDP datagram that is encapsulated in the payload 1340 of a multicast IP packet 1330. Each IP packet 1330 is also shown as including an IP header 1332 and a UDP header 1333, however, the IP header 1332 and/or the UDP header 1333 may not be included in some configurations.

The IP header 1332 may include a source IP address 1348, a destination IP address 1350, and/or an IP type 1352 field, which indicates the type and format of the IP payload 1340, e.g., UDP, Transmission Control Protocol (TCP), etc. In some configurations, the IP header 1332 may additionally or alternatively include a multicast IP address. In some configurations, the DPI entity 109 may analyze the IP header 1332 during deep packet inspection to determine whether the IP payload 1340 includes a UDP datagram.

The UDP header 1333 may include a source port 1354 and/or a destination port 1356. In some examples, each port may be a 16-bit field. Some UDP port numbers may be reserved for certain standard functions, while other UDP port numbers can be customized for application-specific purposes. In some configurations, the DPI entity 109 may analyze the UDP header 1333 during deep packet inspection to determine whether the UDP destination port 1356 is in a predetermined range of UDP port numbers (or whether the UDP destination port 1356 equals a predetermined UDP port number) in order to identify whether an RUid bitmask 602 is present at a certain byte offset (sometimes more than one port can also be used to differentiate the packet type). In other words, in some configurations, the DPI entity 109 may identify the particular UDP destination port 1356 in order to know that an RUid bitmask 602 will be located at a certain byte offset in the UDP payload 1328 from the UDP header 1333. For example, if the UDP destination port 1356 is in a predetermined range or equals a predetermined value (e.g., 0x2222), the DPI entity 109 can then interpret byte(s) at a particular offset as an RUid bitmask 602. In this example, if the UDP destination port 1356 is not in the predetermined range or does not equal the predetermined value (e.g., 0x2222), the DPI entity 109 does not interpret the byte(s) at a particular offset as an RUid bitmask 602 before forwarding.

As noted above, the fronthaul 116 is implemented using a standard switched ETHERNET network 120. Therefore, the lowest layer (data link layer) of the protocol stack 1200 is an ETHERNET layer 1212 (shown in FIG. 12) via which ETHERNET packets 1334 (shown in FIG. 13A) are communicated over the ETHERNET network 120 between the controller 104 (or CU 103 or DU 105) and the radio units 106. As shown in FIG. 13A, each ETHERNET packet 1334 includes a standard ETHERNET header 1336 and a payload 1338. The ETHERNET header 1336 may include an ETHERNET source address 1342, an ETHERNET destination address 1344, an optional VLAN tag (not shown), an optional VLAN header (not shown), and/or an ETHERNET type 1346 field. The ETHERNET type 1346 field may indicate the type and format of the ETHERNET payload 1338, e.g., an IP packet 1330 or a payload according to some other protocol. In some configurations, the ETHERNET header 1336 may be analyzed during deep packet inspection to determine whether the ETHERNET payload 1338 includes an IP packet 1330. In other configurations where the ETHERNET type 1346 is not IP, the ETHERNET type 1346 may be a reserved predetermined value that indicates that an RUid bitmask 602 is present at a certain byte offset from the ETHERNET header 1336. One or more IP packets 1330 can be encapsulated in the payload 1338 of each ETHERNET packet 1334.

The protocol stack 1200 is configured so that I/Q fronthaul data can be communicated over the fronthaul 116 of a C-RAN 100 using a standard switched ETHERNET network 120 (instead of conventional synchronous CPRI point-to-point links). Various standard features provided by the UDP, IP, and ETHERNET layers 1208, 1210, and 1212 (for example, port numbers, IP multicast groups, VLANs, and packet tagging) can be used to help satisfy the requirements for the fronthaul 116 while additional features implemented in the application layer 1202 are used where needed.

FIG. 13B is a block diagram illustrating one example of fields in an ETHERNET packet 534, a SwIQ-DAP protocol data unit (PDU) 1308, a TLV element 1300, and a SwIQ-DAP header 1310. The example of FIG. 13B includes many of the same fields that are illustrated in the example of FIG. 13A, with a few differences.

Specifically, the example in FIG. 13B differs from the example of FIG. 13A because the example of FIG. 13B illustrates the SwIQ-DAP protocol data unit (PDU) 1308 in the ETHERNET payload 1338 without implementing an IP packet 1330 or a UDP datagram (in the IP payload 1340) from FIG. 13A. In this case, the deep packet inspection can be performed on another field. For example, the ETHERNET type 1346 may be a customized type that an SwIQ packet is present. O-RAN specifications currently support I/Q transport over Extended Common Public Radio Interface (ECPRI).

In other examples (not shown in FIG. 13B), an IP packet 1330 may be implemented with an IP header 1332, but without implementing a UDP datagram inside of it. In those configurations, another type of header may be used instead of UDP.

Figure 14A:
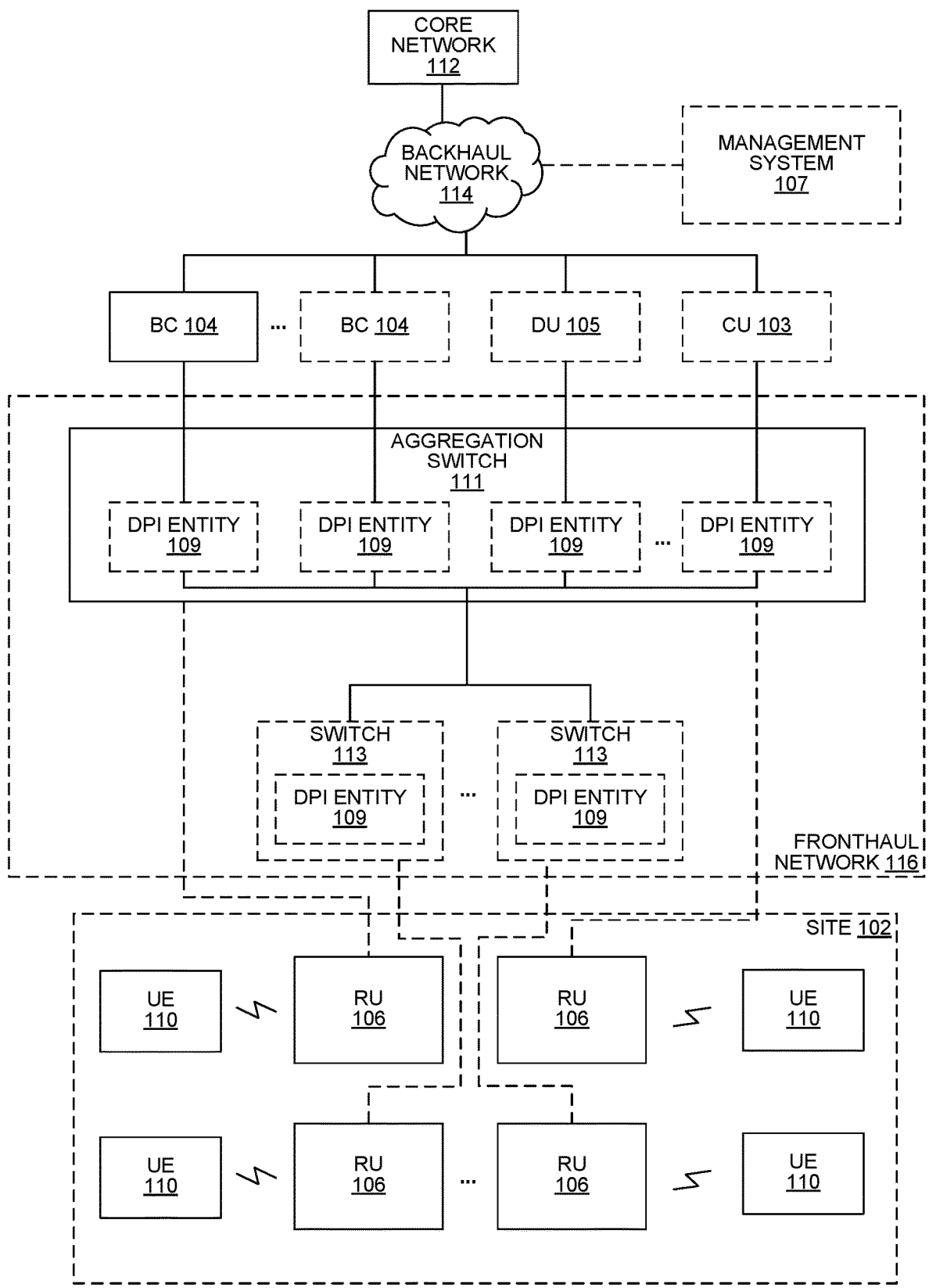
FIG. 14A is a block diagram illustrating an exemplary configuration for deep packet inspection in a fronthaul network of a cloud-radio access network (C-RAN) system.

FIG. 14A is a block diagram illustrating an exemplary configuration for deep packet inspection in a fronthaul network 116. The fronthaul network 116 may be implemented as an ETHERNET network, including one or more switch(es), router(s), and/or other networking device(s). Specifically, the fronthaul network 116 includes an aggregation switch 111 and, optionally, at least one switch 113. The aggregation switch 111 may transport data between at least one switch 113 and at least one baseband controller 104 (in 4G) or DU 105 or CU (in 5G), referred to as BC 104/DU 105/CU 103. For example, the aggregation switch 111 may receive downlink ETHERNET packets 1334 from the BC(s) 104/DU(s) 105/CU(s) 103 and selectively forward at least a portion of those to the switch(es) 113. In other configurations, the aggregation switch 111 may forward directly to the RUs 106 (without an intervening switch 113).

In some configurations, the switches 113 are daisy-chained, and only a single switch 113 is coupled to the aggregation switch 111. Alternatively, more than one switch 113 may be coupled to the aggregation switch 111. Furthermore, the fronthaul network 116 may be implemented using any number of aggregation switch(es) 111 and/or optional switch(es) 113. In some configurations, data may be transported between the aggregation switch 111 and the switch(es) 113 as I/Q data and/or "timing and management" (TM) data.

One or more of the aggregation switch 111 and/or switch(es) 113 may each include a DP entity 109. If at least one of the switches 113 includes a DPI entity, the switches 113 should be able to communicate with each other. Each DPI entity 109 may be implemented using at least one processor executing instructions that are stored in at least one memory and executable to perform the deep packet inspection functions described herein. During deep packet inspection, a DPI entity 109 (e.g., in an ETHERNET switch) looks at the RUid bitmask 602, if present, to determine whether to forward the ETHERNET packet 1334 (e.g., the downlink I/Q packet 1308) to the intended RU(s) 106. The RUid bitmask 602 can be any length suitable to accommodate the number of RUs 106 in the C-RAN 100, e.g., 32 bits, 64 bits, 128 bits, etc.

In some configurations, the RUid bitmask 602 in the SwIQ-DAP header 1310 (e.g., within the first X bytes of the ETHERNET packet 1334) is compared to predetermined bit patterns to determine whether the ETHERNET packet 1334 (or a portion of it) will be dropped or forwarded to the RU(s) 106 it is intended for.

Some switch management functions (e.g., VLAN, enabling/disabling ports, IP addition) may be performed via a secured connection. Other management functions can be performed via regular connection, e.g., configuring the bit patterns at the switch.

In some examples, the DPI entity 109 (e.g., in an ETHERNET switch) can only check the RUid bitmask 602 when the destination port 1356 is in a configured port range (or equals a predetermined value).

In some examples, each RU 106 is assigned an RUid, e.g., during a discovery process performed between the RU 106 and the BC 104, DU 105, or CU 103. The RU 106 registers itself with the DPI entity 109 (e.g., in an ETHERNET switch), requesting it to forward packets on a given multicast address (e.g., a.b.c.d) with its RUid bit set (in the RUid bitmask 602). A given RU can request multiple multicast address plus RUID combination. Multiple IP addresses can be used within a sector for load balancing. Multiple IP address can be used to differentiate traffic belonging to different sectors. Furthermore, an RU 106 can serve multiple sectors.

In some examples, the BCs 104/DUs 105/CUs 103 and RUs 106 use a registration procedure that is similar to the Internet Group Management Protocol (IGMP). For example, messages can used to indicate to the aggregation switch 111 and/or optional switches 113 which multicast groups should be used with which controllers 104 and RUs 106. In some examples, the active BC 104/DU 105/CU 103 and the RUs 106 serving a given cell 108 can join a downlink timing multicast group and downlink and uplink IQ data multicast groups assigned to that cell. In these examples, a standby BC 104/DU 105/CU 103 does not join any of the downlink timing multicast groups or downlink or uplink IQ data multicast groups for any of the cells.

Optionally, a management system 107 may be communicatively coupled to the BC(s) 104, CU(s) 103, DU(s) 105, and/or RUs 106, for example, via the backhaul network 114 and/or the fronthaul network 116. As described above, the management system 107 may be used for management-plane ("M-plane") communications, e.g., using a hierarchical architecture a direct architecture, or a hybrid architecture. Additionally, the management system 107 may determine configuration information for the various entities.

Figure 14B:
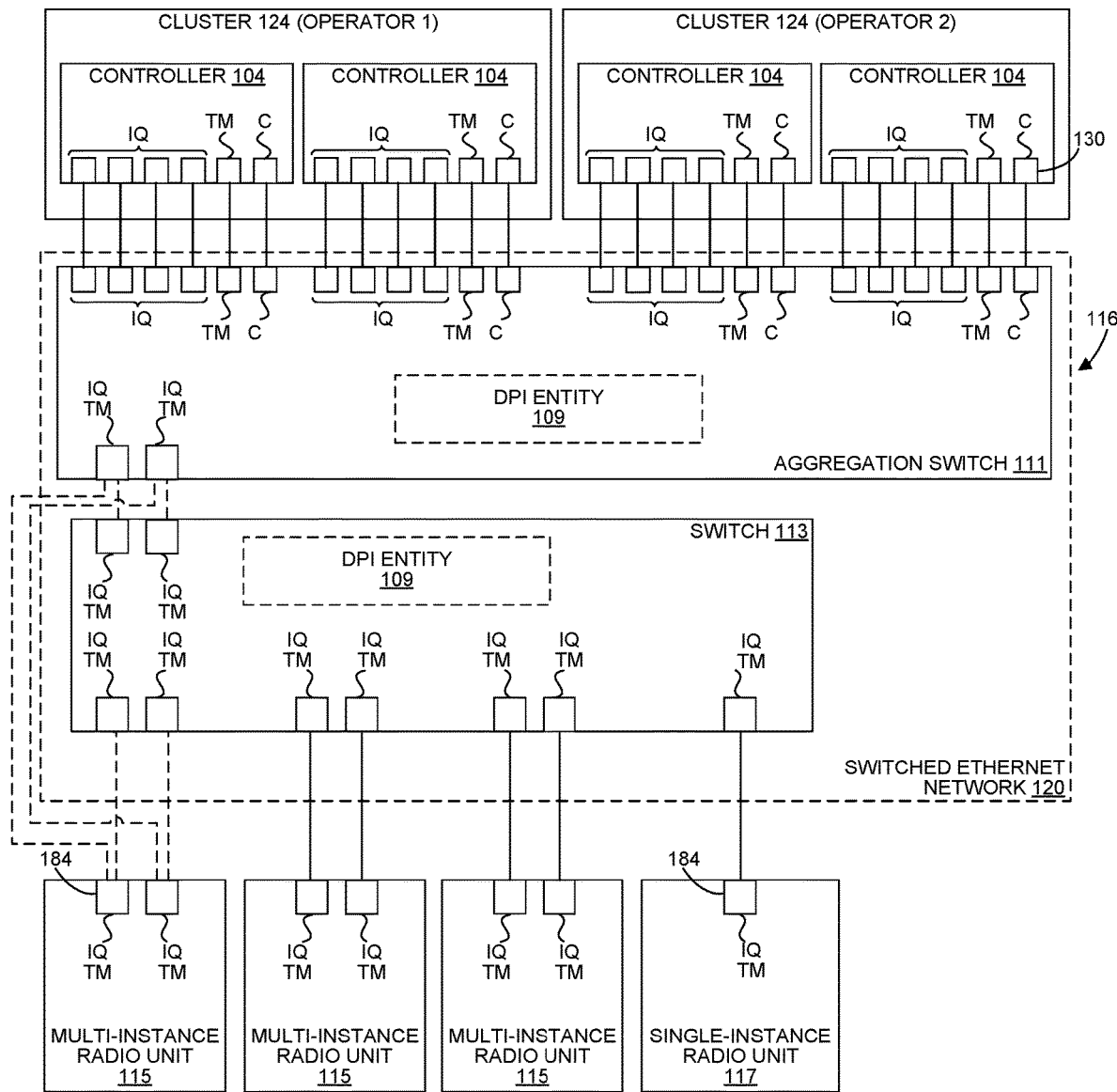
FIG. 14B is a block diagram illustrating additional details about an example implementing the fronthaul network for the C-RAN using a switched ETHERNET network.

FIG. 14B is a block diagram illustrating additional details about an example implementing the fronthaul network 116 for a C-RAN 100 using a switched ETHERNET network 120. The example in FIG. 14B includes many of the same or similar devices, systems, and/or modules in other Figures herein. In FIG. 14B, the term controller 104 is used to refer to a baseband controller 104, a 5G CU 103, or a 5G DU 105.

In general, the switched ETHERNET network 120 comprises one or more ETHERNET switches. In the example shown in FIG. 14B, the switched ETHERNET network 120 comprises an aggregation layer including one or more aggregation ETHERNET switches 111 and an access layer including one or more access ETHERNET switches 113. Although only one aggregation switch 111 and access ETHERNET switch 113 is shown in FIG. 14B for ease of illustration, other numbers of switches 111 and 113 can be used. Also, other ETHERNET network topologies can be used (for example, there may be additional layers (or hops) of ETHERNET switches between (or within one or more of) the aggregation layer and the access layer or entirely different topologies can be used). Each radio unit 115, 117 may alternatively be communicatively coupled to the aggregation switch 111 without an intervening switch 113.

As illustrated in more detail in FIG. 14B, in this exemplary embodiment, the controllers 104 and radio points 106 communicate with each other over the switched ETHERNET network 120 used to implement the fronthaul 116 using two common virtual local area networks (VLANs). In this embodiment, one VLAN is used for communicating timing information (for example, Institute of Electrical and Electronics Engineers (IEEE) 1588 Precision Time Protocol (PTP) messages used for synchronizing the controllers 104 and RUs 106) and management information (for example, Simple Object Access Protocol (SOAP) and eXtensible Markup Language (XML) messages) between the controllers 104 and the radio points 106. This VLAN is referred to here as the "timing and management" or "TM" VLAN. A second VLAN is used for communicating IQ data between the controllers 104 and the radio points 106 and is referred to here as the "IQ" VLAN.

In this embodiment, the TM and IQ VLANs are configured so that all of the controllers 104 in a cluster 124 and the associated RUs 106 are members of the TM and IQ VLANs.

In the example shown in FIG. 14B, the fronthaul 116 is used for fronthauling data for two clusters 124 serving two respective wireless operators. In this example, a separate VLAN is established for each cluster 124 for inter-controller communications between the controllers 104 included that cluster 124. Each such VLAN is referred here as a "cluster" or "C" VLAN.

In the example shown in FIG. 14B, each controller 104 includes multiple ETHERNET network interfaces 130 for coupling that controller 104 to the switched ETHERNET network 120 (more specifically, to one or more aggregation switches 111 in the example shown in FIG. 14B).

In the example shown in FIG. 14B, some of the ETHERNET network interfaces 130 in each controller 104 are dedicated for communicating timing and management data over the timing and management VLAN. Each such ETHERNET network interface 130 is also referred to here as a "timing and management" or "TM" ETHERNET network interface 130. In this example, some of the ETHERNET network interfaces 130 in each controller 104 are dedicated for communicating IQ data over the IQ VLAN and are also referred to here as "IQ" ETHERNET network interfaces 130. Also, in this example, some of the ETHERNET network interfaces 130 in each controller 104 are dedicated for communicating over the cluster VLAN. Each such ETHERNET network interface 130 is referred to here as a "cluster" or "C" ETHERNET network interface 130. Each controller 104 also includes one or more other ETHERNET network interfaces (not shown) that are used for communicating over the backhaul with the core network 112.

In the example shown in FIG. 14A and/or 14B, each single-instance radio point unit 117 comprises at least one ETHERNET network interface 184 and each multiple-instance radio point 115 comprises at least two ETHERNET network interfaces 184, where each such ETHERNET network interface 184 is used for communicating over both the timing and management VLAN and the IQ VLAN.

In the example shown in FIG. 14A and/or 14B, for each cell 108 served by a cluster 124, the controller 104 serving that cell 108 transmits timing messages over the timing VLAN by multicasting the timing messages using a respective timing multicast group defined for that cell 108. That is, each cell 108 served by the cluster 124 has a single timing multicast group assigned to it. In this embodiment, for each cell 108 served by a cluster 124, the RUs 106 transmit timing messages over the timing and management VLAN by unicasting the messages to the IP address assigned to the Timing and Management ETHERNET interface of the serving controller 104 for that cell 108.

Also, in the example shown in FIG. 14B, for each cell 108 served by a cluster 124, management messages are transmitted between the controllers 104 and the RUs 106 over the timing and management VLAN by unicasting the messages using the IP address assigned to the Timing and Management ETHERNET interface of the controller 104 or to an ETHERNET interface 184 of the RU 106 to which the message is sent.

A set of downlink and uplink IP multicast groups are used for transmitting downlink and uplink IQ data, respectively.

The timing, management, and IQ data can be communicated in other ways.

In general, when each radio point 106 boots up, each radio point instance implemented by that radio point 106 will use a discovery protocol in order to discover the controller 104 that radio point instance should be homed to. As a part of the discovery process, the radio point instance will be provided with the IP address assigned to the Timing and Management ETHERNET interface 130 of the discovered controller 104. The radio point instance uses that IP address to establish a SOAP (management) connection with the controller 104. The controller 104 communicates the IP addresses of the downlink and uplink IP multicast groups that the radio point instance should use for communicating downlink and uplink IQ data.

In configurations where multiple controllers 104 serve a given radio point instance (for example, where a controller 104 serves as backup controller for another primary controller 104 or where carrier aggregation is used and multiple controllers 104 are used to perform the baseband processing for the multiple carriers), each radio point instance serving a given cell 108 still registers to the appropriate downlink IP multicast groups for the cell 108 and sends data to the controllers 104 over the fronthaul 116 using the appropriate uplink IP multicast groups. Because IP multicast is used, multiple controllers 104 can register to, and receive data using, the same uplink IP multicast groups that the radio point instances for that cell 108 use to send data over the fronthaul 116 and multiple controllers 104 can send data over the fronthaul 116 to the radio point instances for that cell 108 using the downlink IP multicast groups that those radio point instances register to. That is, the radio point instances can be transparently served by multiple controllers 104 because of the use of IP multicast.

Moreover, the use of IP multicast does not preclude a single controller 104 serving multiple cells 108. In configurations where a single controller 104 serves multiple cells 108 (for example, a primary cell 108 and a secondary cell 108), that single controller 104 registers to the uplink IP multicast groups for the primary cell 108 and secondary cell 108 and sends data to the appropriate radio point instances over the fronthaul 116 using the downlink IP multicast cast groups for the primary cell 108 and secondary cell 108.

In some examples, downlink IQ data is transmitted between each controller 104 and the associated radio points 106 on a UE-by-UE basis, while the uplink IQ data is transmitted on a per-RU basis. In other (e.g., O-RAN) examples, both downlink and uplink IQ data is transmitted on a per-RU basis. For each UE 112 that is served by the cell 108, the serving controller 104 assigns a subset of that cell's RUs 106 to that UE 112 for downlink wireless transmissions to that UE 112. This subset of RUs 106 is referred to here as the "simulcast zone" for that UE 112. The simulcast zone for each UE 112 is determined based on receive power measurements made at each of the RUs 106 for certain uplink transmissions from the UE 112 (for example, LTE Physical Random Access Channel (PRACH) and Sounding Reference Signals (SRS) transmissions) and is updated as the UE 112 moves throughout the cell 108.

For the uplink, in this embodiment, for each cell 108, the radio points 106 serving that cell 108 transmit uplink IQ data to the serving controller 104 using a set of uplink IP multicast groups and multicast load balancing. In this embodiment, multiple link aggregation groups (LAGs) are defined for each cell 108, with each LAG having an uplink IP multicast group associated with it. The switches 111 and 113 in the switched ETHERNET network 120 are configured to use multicast load balancing to load balance the uplink IQ data traffic across the various IQ ETHERNET interfaces of the serving controller 104.

As with the uplink, multiple downlink IP multicast groups are used for load balancing purposes. For the downlink, multiple sets of downlink IP multicast groups are used for sending downlink IQ data to different combinations of RUs 106, where the sets of downlink IP multicast groups are dynamic. For one set of downlink IP multicast groups, each of the downlink IP multicast groups of that set include all of the RUs 106 serving the cell 108. These "all RU" downlink IP multicast groups are used in order to transmit downlink IQ data for common logical channels of the wireless interface to all of the RUs 106 of the cell 108. One example of where this may be done is for transmitting downlink IQ data for LTE System Information Blocks (SIBs). An "all RU" downlink IP multicast group can also be used in the event that there is no other suitable set of downlink IP multicast groups. For the other sets of downlink IP multicast groups, all of the constituent downlink IP multicast groups contain less than all of the RUs 106 serving the cell 108. These other sets of downlink IP multicast groups are created as needed in order to communicate downlink IQ data (in particular, downlink IQ data for the Physical Downlink Shared Channel (PDSCH)) to only those RUs 106 that are in the simulcast zone fora given UE 112.

When downlink data needs to be transmitted to a given UE 112 over the wireless interface, if there is an existing set of downlink IP multicast groups that "matches" the simulcast zone for that UE 112, then one of the downlink IP multicast groups from the matching set is used for transmitting downlink IQ data for that UE 112 to the RUs 106 in that UE's simulcast zone. If there is no set of downlink IP multicast groups that matches the simulcast zone of a given UE 112, a new set of downlink IP multicast groups can be created, where all of the downlink IP multicast groups of that set include the RUs 106 in that simulcast zone and then one of those newly created downlink IP multicast groups is used for transmitting downlink IQ data to only those RUs 106 in that simulcast zone. If it is not possible to create a new matching set of downlink IP multicast groups (for example, because the maximum number of downlink IP multicast groups has already been created and none of the existing downlink IP multicast group sets can be purged at that time due to non-use), then one of the previously mentioned "all RU" downlink IP multicast groups can be used.

However, using an "all RU" downlink IP multicast group may result in downlink IQ data for a given UE 112 being sent to RUs 106 that are not included in that UE's simulcast zone. To deal with this, an application-layer multicast address included in the IQ data (as described below) is used in this example to identify which RUs 106 the associated downlink IQ data is actually intended for. In this example, this application-layer multicast address comprises an address field that can be viewed as a plurality of bit positions. A respective one of the bit positions is assigned to each RU 106 serving the cell 108, where that bit position is set (that is, stores a first binary value (for example, one)) if the associated downlink IQ data is intended for the associated RU 106 and where that bit position is cleared (that is, stores a second binary value (for example, zero)) if the associated downlink IQ data is not intended for the associated RU 106. For example, all of the bit positions of the application-layer multicast address would be set for packets including downlink IQ data for common messages (such as SIBs), which are intended for all RUs 106. For downlink IQ data intended for a UE 112 that includes less than all of the RUs 106 in its simulcast zone, only the bit positions of the application-layer multicast address that correspond to RUs 106 in that simulcast zone are set, with the bit positions that correspond to all other RUs 106 being cleared. (One example of an application-layer multicast address is the application-layer multicast address field 1326 described below in connection with FIGS. 13A-B.)

Figure 15:
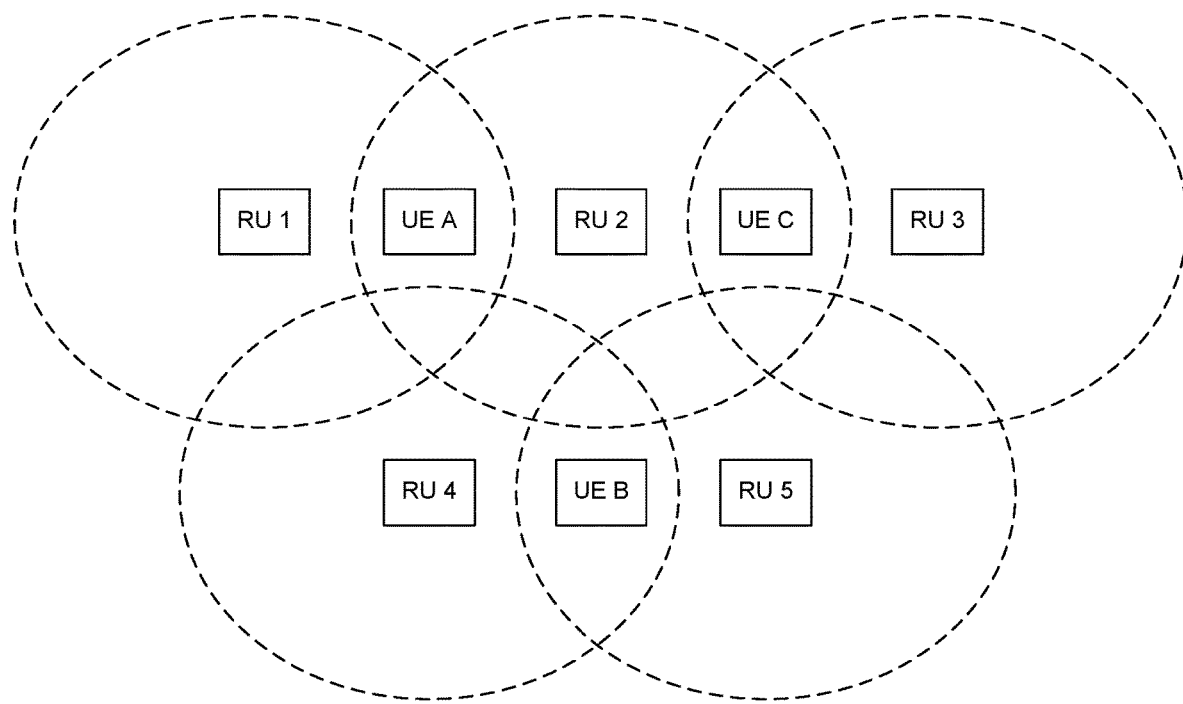
FIG. 15 is a block diagram of a wireless system with multiple RUs and UEs.

FIG. 15 is a block diagram of a wireless system with multiple RUs and UEs. In the following description, the wireless system is used to describe one example of how the IP and application-layer multicast groups can be used to communicate downlink IQ data over the switched ETHERNET network 120 from the serving controller 104 to the radio points 106. In the example shown in FIG. 15, five RUs 106 and three UEs 112 are shown. The RUs 106 are individually referenced in FIG. 15 as RU 1, RU 2, RU 3, RU 4, and RU 5, respectively. The UEs 112 are individually referenced in FIG. 15 as UE A, UE B, UE C, respectively. In the example, shown in FIG. 15, the simulcast zone for UE A includes a RU 1, RU 2, and RU 4, the simulcast zone for UE B includes RU 4 an RU 5, and UE C includes RU 2, RU 3, and RU 5. If UE A, UE B, and UE C all remain in the same location and continue to access the cell 108, three downlink IP multicast groups will be formed (if they do not already exist). These three downlink IP multicast groups include a first downlink IP multicast group including RU 1, RU 2, and RU 4 (and, in this example, is assigned an IP address of 293.2.1.10), a second downlink IP multicast group including RU 4 and RU 5 (and, in this example, is assigned an IP address of 293.2.1.11), and a third downlink IP multicast group including RU 2, RU 3, and RU 5 (and, in this example, is assigned an IP address of 293.2.1.12). However, it may take time for those "matching" downlink IP multicast groups to all be formed.

For example, when UE A first accesses the cell 108 and a downlink IP multicast group including RU 1, RU 2, and RU 4 has not yet been created, downlink IQ data can be sent to the RUs in the simulcast zone for UE A (that is, to RU 1, RU 2, and RU 4) using the "all RU" downlink IP multicast group (which in this example is assigned an IP address of 239.2.1.1). In this case, as shown in FIG. 15, packets including downlink IQ data intended for the RUs in the simulcast zone for UE A are sent to the "all RU" downlink IP multicast group (using the corresponding IP address of 239.2.1.1), with an application-layer multicast address of "11010" where the first bit position (corresponding to RU 1), the second bit position (corresponding to RU 2) and the fourth bit position (corresponding to RU 4) are set and the third bit position (corresponding to RU 3) and the fifth bit position (corresponding to RU 5) are cleared. In this example, only five bit positions are shown for ease of illustration though the application-layer multicast address typically would use a larger number of bit positions (for example, 64 bit positions, which corresponds to an eight-byte address).

After the downlink IP multicast group including RU 1, RU 2, and RU 4 is created, packets including downlink IQ data intended for the RUs in the simulcast zone for UE A are sent to that downlink IP multicast group (using the corresponding IP address of 239.2.1.10), with the same application-layer multicast address of "11010."

Also, in this example, packets including downlink IQ data for common messages (such as SIBs) are sent to the "all RU" downlink IP multicast group (using the corresponding IP address of 239.2.1.1), with an application-layer multicast address of "11111" (because the data is intended for all RUs).

Deep Packet Inspection

Figure 16:
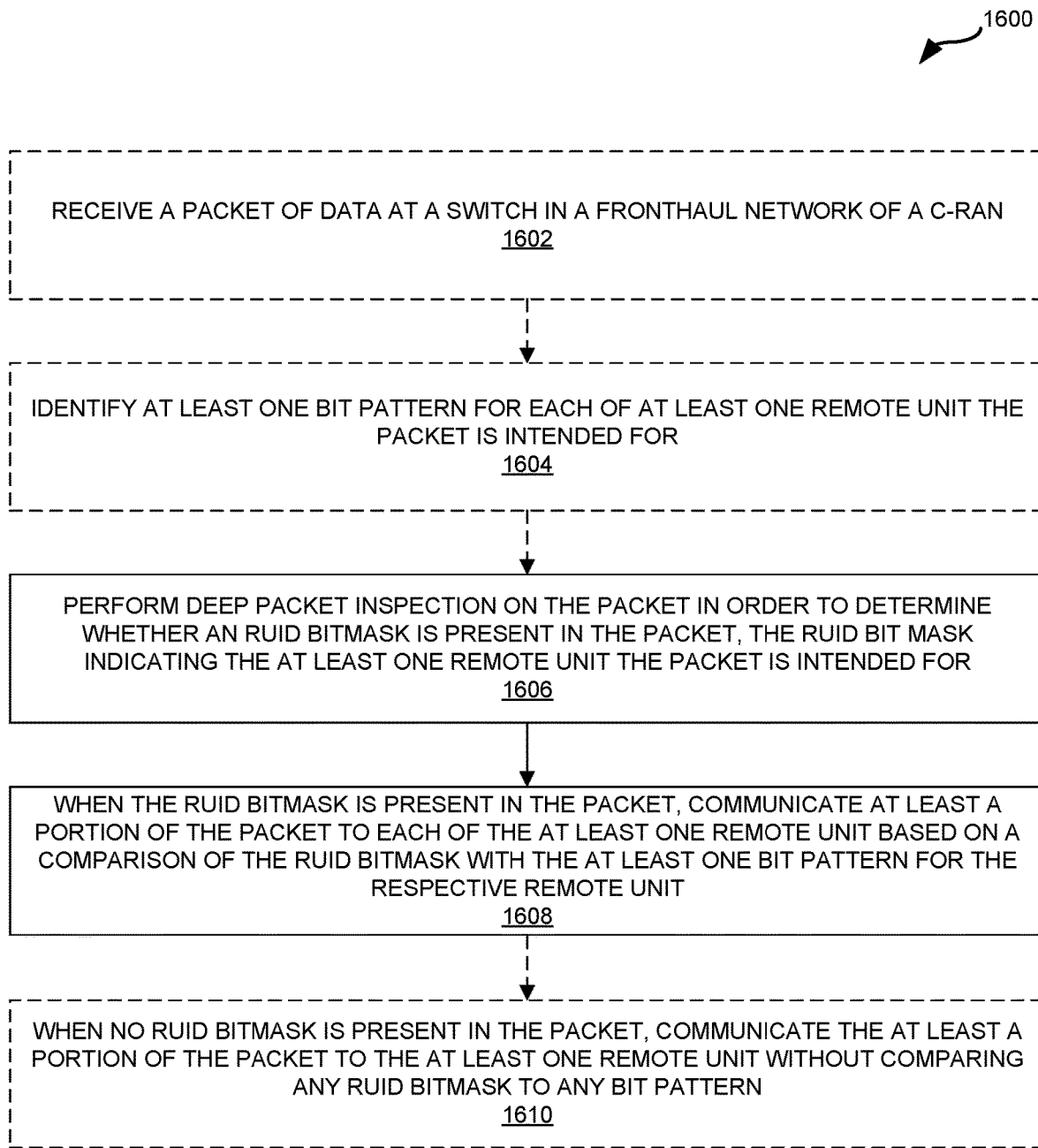
FIG. 16 is a flow diagram illustrating a method for sending data across a fronthaul interface and fronthaul network in a C-RAN using deep packet inspection (DPI)

FIG. 16 is a flow diagram illustrating a method 1600 for sending data across a fronthaul interface and fronthaul network 116 in a C-RAN 100 using deep packet inspection (DPI). The method 1600 may be performed by at least one processor in an ETHERNET switch in the fronthaul 116 in the C-RAN 100. For example, the ETHERNET switch may be an aggregation switch 111 or a switch 113, either of which implements a DPI entity 109. The ETHERNET switch may be communicatively coupled to BC(s) 104, DU(s) 105, CU(s) 103, and/or RU(s) 106 that form a C-RAN 100 (or a portion of a C-RAN 100). Furthermore, in some configurations, the ETHERNET switch implementing the method 1600 may be communicatively coupled to at least one other switch. For example, if an aggregation switch 111 implements the method 1600, it may be communicatively coupled to (1) at least one switch 113; and (2) BC(s) 104, DU(s) 105 and/or CU(s) 103. Alternatively, if an aggregation switch 111 implements the method 1600, it may be communicatively coupled to (1) at least one RU 106; and (2) BC(s) 104, DU(s) 105 and/or CU(s) 103. As another example, if a switch 113 implements the method 1600, it may be communicatively coupled to (1) an aggregation switch 111; and (2) at least one RU 106. Other configurations are possible. In some examples, the method 1600 is performed for every packet received at the ETHERNET switch.

The blocks of the flow diagram shown in FIG. 16 have been arranged in a generally sequential manner for ease of explanation; however, it is to be understood that this arrangement is merely exemplary, and it should be recognized that the processing associated with method 1600 (and the blocks shown in FIG. 16) can occur in a different order (for example, where at least some of the processing associated with the blocks is performed in parallel and/or in an event-driven manner). Also, most standard exception handling is not described for ease of explanation; however, it is to be understood that method 1600 can and typically would include such exception handling.

The method 1600 begins at optional step 1602 where at least one processor receives a packet of data. The packet may be an ETHERNET packet 1334 that includes I/Q data. In a first example, the ETHERNET packet 1334 may include a multicast IP packet 1330 with a UDP datagram 1308 in the IP payload 1340, which includes an I/Q packet 1308 with a header 1310 that has an RUid bitmask 602 (or other form of RU identification), e.g., as in FIG. 13A. In a second example, the ETHERNET packet 1334 may include an I/Q packet 1308 (that includes an RUid bitmask 602 in it) and no IP header 1332 or UDP header 1333, e.g., as in FIG. 13B. Alternatively, the packet received in step 502 may be the multicast IP packet 1330 or the I/Q packet 1308 itself. The packet may be one of multiple received packet, e.g., in a stream of ETHERNET packets 1334.

If the ETHERNET switch implementing the method 1600 is an aggregation switch 111, the packet may be received from may be received from (1) a BC 104, a DU 105, or a CU 103 in the downlink direction; or (2) a switch 113 or an RU 106 in the uplink direction. If the ETHERNET switch implementing the method 1600 is a switch 113, the packet may be received from may be received from (1) a BC 104, a DU 105, a CU 103, or an aggregation switch 111 in the downlink direction; or (2) a different switch 113 or an RU 106 in the uplink direction.

The method 1600 proceeds at optional step 1604 where the at least one processor identifies at least one bit pattern for each of at least one RU 106 the packet is intended for. Some RUs 106 can host multiple carriers, e.g., up to 4. When an RU 106 hosts more than one carrier, the RU 106 implements a radio unit instance, or modules implemented with a processor, for each carrier, all of which share the same physical ETHERNET port on the RU 106. Also when an RU 106 hosts more than one carrier, each radio unit instance communicates with a different BC 104, DU 105, or CU 103, which assigns the radio unit instance an RUid. Therefore, a multi-instance radio unit 115 may be assigned multiple RUids, each from a different BC 104, DU 105 or CU 103. For example, a particular radio unit instance might be assigned RUid=1 by a first BC 104, DU 105, or CU 103 and RUid=3 by a second BC 104, DU 105, or CU 103.

However, RUids assigned by different BCs 104, DUs 105, or CUs 103 may overlap with each other. Accordingly, an RUid of a radio unit instance is associated with the IP address that a BC 104, DU 105 or CU 103 uses to communicate with the radio unit instance. In some examples, at least one bit pattern is stored, at an ETHERNET switch, for each combination of (1) a radio unit instance implemented in an RU 106 the ETHERNET switch communicates with; and (2) the IP address that a BC 104, DU 105, or CU 103 uses to communicate with the radio unit instance. Put another way, the RUid of a radio unit instance depends on the IP address that a BC 104, DU 105, or CU 103 uses to communicate with the radio unit instance. Alternatively, a single-instance radio unit 117 may have only a single RUid assigned to it, in which case the RUid does not depend on the IP address that a BC 104, DU 105, or CU 103 uses to communicate with it. In some examples, the bit patterns can be configured at run-time via a secured connection.

In a first configuration of optional step 1604, the ETHERNET type 1346 of the packet is IP and the bit patterns are associated with RU(s) 106 identified by the destination IP address 1350 (e.g., a multicast IP address) in an IP packet 1330 in the ETHERNET packet 1334. In a second configuration of optional step 1604, the ETHERNET type 1346 of the packet is a predetermined value (not IP) and the bit patterns are associated with RU(s) 106 identified by a destination MAC address in the ETHERNET packet 1334. In other words, the bit pattern(s) may be selected for RU(s) 106 using a multicast IP address or a multicast MAC address depending on the ETHERNET type 1346 of the packet. Furthermore, if the ETHERNET type is neither IP nor the predetermined value, the packet may be forwarded without looking for an RUid bitmask 602, as described below. Alternatively, an RUid of a radio instance can be associated with the IP address of a BC 104, DU 105, or CU 103 that assigned the RUid.

The method 1600 proceeds at step 1606 where the at least one processor performs deep packet inspection (DPI) on the packet in order to determine whether an RUid bitmask 602 is present in the packet, the RUid bitmask 602 indicating the at least one RU 106 that the packet is intended for. Deep packet inspection may include the hierarchical inspection/ analysis of a packet to identify one or more fields in the packet. In some configurations, an I/Q packet 1308 (containing the RUid bitmask 602) is contained in a UDP datagram 1330, which is contained in an IP packet 1330, which is contained in an ETHERNET packet/frame 1334. Accordingly, deep packet inspection may be used to determine if (and at what relative position/offset) the RUid bitmask 602 appears in the received packet.

Each RUid bitmask 602 may be a set of bits (e.g., each bit having a value of "1" or "0"), the length of which is equal to at least the number of RUs 106 in a C-RAN 100 (or in a single sector of a C-RAN 100). A bit in the RUid bitmask 602 in a packet is set based on whether the RU 106 associated with the bit is required to decode and/or transmit information in the packet. For example, if all the RUs 106 are required to decode and/or transmit the payload of the packet (e.g., an I/Q payload 1312), then all the bits are set to one. Alternatively, when subset of RUs 106 is required to send the payload of the packet, then only the bits corresponding to the subset of RUs 106 are set to one. The RUid bitmask 602 can be any length suitable to accommodate the number of RUs 106 in the C-RAN 100, e.g., 32 bits, 64 bits, 128 bits, etc.

Alternatively, the RU identification can be communicated in other ways (instead of a bitmask having a bit for each RU 106 in the C-RAN 100). For example, the intended RUs 106 can be identified using (1) an explicit RUid value in the packet; and/or (2) a variable length RUid bitmap with a start offset.

The method 1600 proceeds at step 1608 where, when the RUid bitmask 602 is present in the packet, the at least one processor communicates at least a portion of the packet to each of the at least one RU 106 based on a comparison of the RUid bitmask 602 with the bit pattern(s) for the respective RU 106. In some configurations, the RUid bitmask 602 in the packet is compared to the bit pattern(s) (from optional step 1604) using a bitwise AND operation.

If the bitwise AND of the RUid bitmask 602 with the bit pattern(s) for an RU 106 all equal zero (indicating that the packet 1334 is not intended for the RU 106 on the designated IP address), the packet 1334 may be dropped by the ETHERNET switch. In other words, when none of the bit pattern(s) for the at least one RU 106 have a set bit in the same bit position as a set bit in the RUid bitmask 602, the at least one processor may drop the packet (not transmit to any RU 106).

On the other hand, if the bitwise AND of the RUid bitmask 602 with the bit pattern(s) for an RU 106 are not all equal to zero (indicating that the packet 1334 is intended for the RU 106 on the designated IP address), the packet 1334 (or a portion of it) may be communicated to the RU 106. In other words, for each bit pattern with a set bit in the same bit position as a set bit in the RUid bitmask 602, the at least one processor may communicate at least a portion of the packet to the RU 106 associated with the bit pattern.

The at least a portion of the packet may be all or parts of an ETHERNET packet/frame 1334, an IP packet 1330 contained in an ETHERNET packet 1334, a UDP datagram 1330 contained in an IP packet 1330, or an I/Q packet 1308 contained in a UDP datagram 1330. The communication can include unicasting, broadcasting, or multicasting as described herein.

The method 1600 proceeds at optional step 1610 where, when no RUid bitmask 602 is present in the packet, the at least one processor communicates the at least a portion of the packet to the at least one RU 106 without comparing any RUid bitmask 602 to any bit pattern of an RU 106. The packet may be constructed according to different protocols, many of which will not include an RUid bitmask 602. For example, an RUid bitmask 602 may not be included in the packet if the ETHERNET type 1346 is not IP or another reserved predetermined value. Similarly, an RUid bitmask 602 may not be included in the packet if the ETHERNET type 1346 is IP, but the IP type 1352 is not UDP. Similarly, an RUid bitmask 602 may not be included in the packet if the ETHERNET type 1346 is IP and the IP type 1352 is UDP, but the destination port 1356 is not in a predetermined range of port numbers. If the deep packet inspection cannot identify the RUid bitmask 602 (because it is not included in the packet or any other reason), the packet should still be communicated.

Figure 17:
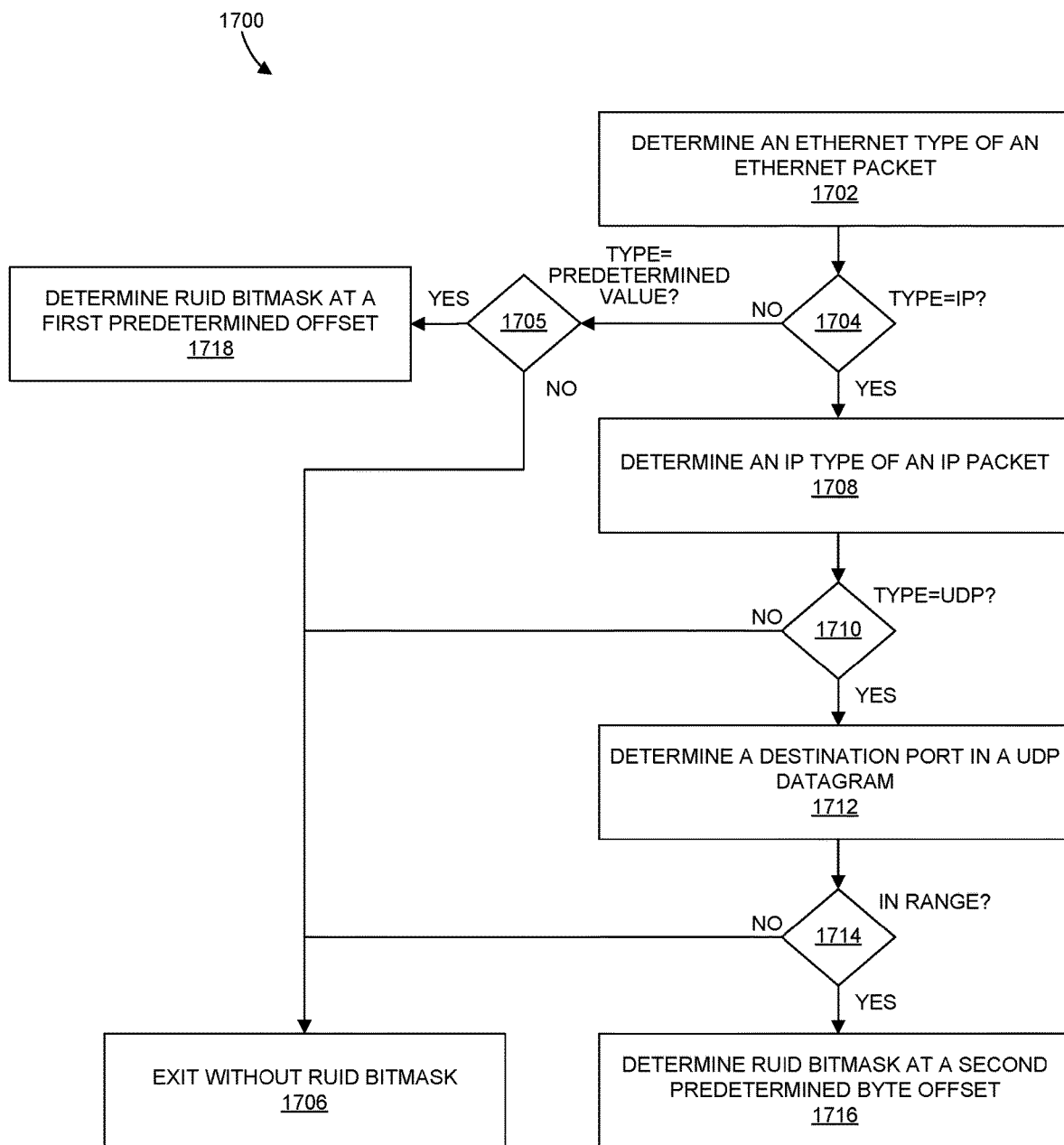
FIG. 17 is a flow diagram illustrating a method for performing deep packet inspection (DPI) on a packet.

FIG. 17 is a flow diagram illustrating a method 1700 for performing deep packet inspection (DPI) on a packet. The method 1700 may be performed by at least one processor in an ETHERNET switch in the fronthaul 116 in the C-RAN 100. For example, the ETHERNET switch may be an aggregation switch 111 or a switch 113, either of which implements a DPI entity 109. The ETHERNET switch may be communicatively coupled to BC(s) 104, DU(s) 105, CU(s) 103, and/or RU(s) 106 that form a C-RAN 100 (or a portion of a C-RAN 100). Furthermore, in some configurations, the ETHERNET switch implementing the method 1700 may be communicatively coupled to at least one other switch. For example, if an aggregation switch 111 implements the method 1700, it may be communicatively coupled to (1) at least one switch 113; and (2) BC(s) 104, DU(s) 105 and/or CU(s) 103. Alternatively, if an aggregation switch 111 implements the method 1700, it may be communicatively coupled to (1) at least one RU 106; and (2) BC(s) 104, DU(s) 105 and/or CU(s) 103. As another example, if a switch 113 implements the method 1700, it may be communicatively coupled to (1) an aggregation switch 111; and (2) at least one RU 106. Other configurations are possible. In some examples, the method 1700 is an example of the deep packet inspection (performed on a received packet) in step 1606 in the method 1600 of FIG. 16.

The blocks of the flow diagram shown in FIG. 17 have been arranged in a generally sequential manner for ease of explanation; however, it is to be understood that this arrangement is merely exemplary, and it should be recognized that the processing associated with method 1700 (and the blocks shown in FIG. 17) can occur in a different order (for example, where at least some of the processing associated with the blocks is performed in parallel and/or in an event-driven manner). Also, most standard exception handling is not described for ease of explanation; however, it is to be understood that method 1700 can and typically would include such exception handling.

The method 1700 begins at step 1702 where the at least one processor determines an ETHERNET type 1346 of an ETHERNET packet 1334. An ETHERNET packet 1334 may include an (1) ETHERNET header 1336 with an ETHERNET source address 1342, an ETHERNET destination address 1344, an optional VLAN tag, an optional VLAN header, and/or an ETHERNET type 1346 field; and (2) an ETHERNET payload 1338. The ETHERNET type 1346 field may indicate the type of the payload 1338, e.g., an IP packet 1330 or a payload according to some other protocol. For example, the ETHERNET type 1346 may indicate that the ETHERNET payload 1338 includes an IP packet 1330. In some configurations, a predetermined value (other than IP) may be reserved to indicate the inclusion (and byte offset) of an RUid bitmask 602 in ETHERNET packets 1334 that do not include an IP packet 1330 or a UDP datagram (e.g., inside an IP packet 1330). In other words, the reserved predetermined value, when included in the ETHERNET type 1346 field, can indicate that an RUid bitmask 602 is present at a certain byte offset in the ETHERNET payload 1338 from the ETHERNET header 1336 or the ETHERNET type 1346, specifically. This reserved predetermined value can be known by the BC(s) 104 (or DUs 105 or CUs 103), ETHERNET switch(es) 111, 113, the DU(s) 105, and/or RU(s) 106 in a system.

The method 1700 proceeds at step 1704 where the at least one processor determines whether the ETHERNET type 1346 is IP. If not, the method 1700 proceeds at step 1705 where the at least one processor determines if the ETHERNET type 1346 is the reserved predetermined value, e.g., 0x4321. If yes, the method 1700 proceeds at step 1718 where the at least one processor determines the RUid bitmask 602 in the ETHERNET packet 1334 at a first predetermined offset, e.g., a first predetermined byte offset from the ETHERNET header 1336 or the ETHERNET type 1346, specifically. In other words, in response to determining that the ETHERNET type 1346 is the reserved predetermined value, the at least one processor can interpret a set of bits (that is offset from the ETHERNET type 1346 field) as the RUid bitmask 602. If the ETHERNET type 1346 is not IP or the reserved predetermined value, the method 1700 proceeds at step 1706 where at least one processor exits the method 1700 without determining the RUid bitmask 602 (after which at least a portion of the packet is communicated without comparing the RUid bitmask 602 to any bit patterns).

However, if the ETHERNET type 1346 is IP, the method 1700 proceeds at step 1708 where the at least one processor determines an IP type 1352 in the IP packet 1330. The IP packet 1330 may include: (1) an IP header 1332 with a source IP address 1348, a destination IP address 1350, and/or an IP type 1352 field; and (2) an IP payload 1340. The IP type 1352 indicates the type 1352 of the IP payload 1340. For example, the IP type 1352 can indicate that the IP payload 1340 includes a UDP datagram. Alternatively, the IP type 1352 can indicate that the IP payload 1340 includes data in some other protocol, e.g., Transmission Control Protocol (TCP). The method 1700 proceeds at step 1710 where the at least one processor determines whether the IP type 1352 indicates UDP. If the IP type 1352 is not UDP, the method 1700 proceeds at step 1706 where at least one processor exits the method 1700 without determining the RUid bitmask 602.

If the IP type 1352 is UDP, the method 1700 proceeds at step 1712 where the at least one processor determines a destination port 1356 in the UDP datagram. The UDP datagram (in the IP payload 1340) may include a UDP header 1333 with a source port 1354 and/or a destination port 1356; and (a UDP payload 1328). Some UDP port numbers may be reserved for certain standard functions, while other UDP port numbers can be customized for application-specific purposes. The method 1700 proceeds at step 1714 where the at least one processor determines whether the UDP destination port 1356 is in a predetermined range of UDP port numbers (or whether the UDP destination port 1356 equals a predetermined UDP port number) in order to identify whether an RUid bitmask 602 is present at a certain byte offset from the UDP header 1356 or the UDP destination port 1356, specifically. In other words, a UDP destination port 1356 that either (1) falls into predetermined range of UDP port numbers or (2) equals a predetermined UDP port number indicates that an RUid bitmask 602 will be located at a certain byte offset in the UDP payload 1328 from the UDP header 1356 or the UDP destination port 1356, specifically.

If the UDP destination port 1356 either (1) falls into predetermined range of UDP port numbers or (2) equals a predetermined UDP port number, the method 1700 proceeds at step 1716 where the at least one processor determines the RUid bitmask 602 in the UDP payload 1328 at a second predetermined offset, e.g., a second predetermined byte offset. In other words, in response to determining that the UDP destination port 1356 either (1) falls into predetermined range of UDP port numbers or (2) equals a predetermined UDP port number, the at least one processor can interpret a set of bits (that is offset from the UDP header 1333 or the UDP destination port 1356, specifically) as the RUid bitmask 602. If the UDP destination port 1356 does not (1) fall into predetermined range of UDP port numbers or (2) equal a predetermined UDP port number, the method 1700 proceeds at step 1706 where at least one processor exits the method 1700 without determining the RUid bitmask 602.

Pseudo Code for IP/UDP DPI Example

The following pseudo code is an example implementation of DPI using IP/UDP:

```
if ETH_TYPE == IP
  if IP_TYPE == UDP
    if UDP_port_number within range
      Curr_RUID = RP_RUID based on multicast IP address
      if (Curr_RUID & Packet_RUID) != 0 //& is a bitwise AND
        forward packet
      else
        discard packet
      endif
    else
      forward packet
    endif
endif
``` where ETH_TYPE is the ETHERNET type 1346; IP_TYPE is the IP type 1352; Curr_RUID is a bit pattern for an RU 106; RP RUID is the RUid of an RU 106 indicated by a multicast IP address in the ETHERNET packet 1334; and Packet RUID is the RUid bitmask 602.

The following pseudo code is an example implementation of DPI based on ETHERNET packet transport (without using IP/UDP):

```
if ETH_TYPE == X
  Curr_RUID = RP_RUID based on multicast IP address
  if (Curr_RUID & Packet_RUID) != 0 //& is a bitwise AND
    forward packet
  else
    discard packet
  endif
else
  forward packet
endif
``` where X is reserved predetermined value that indicates the inclusion of an RUid bitmask 602 in ETHERNET packets 1334 that do not include an IP packet 1330 or a UDP datagram.

Forwarding Rules

Figure 18:
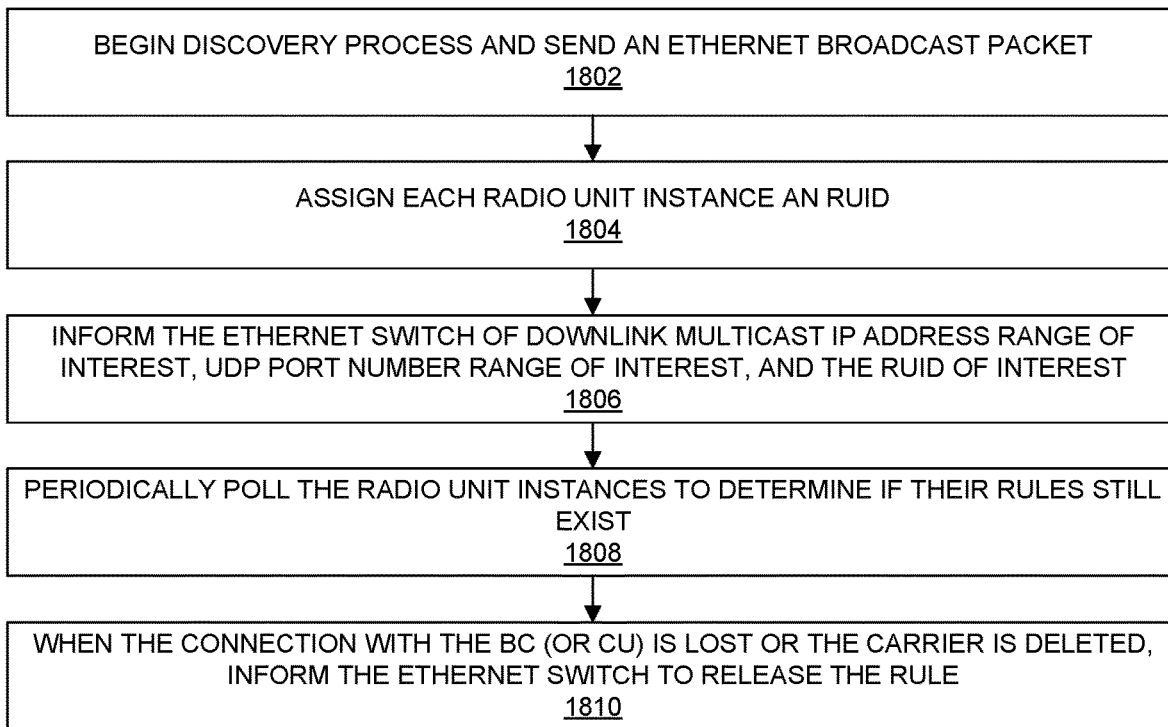
FIG. 18 is a flow diagram illustrating a method for establishing a multicast rule in an ETHERNET switch.

FIG. 18 is a flow diagram illustrating a method for establishing a multicast rule in an ETHERNET switch. The method 1800 may be implemented by an ETHERNET switch, at least one BC 104 (or CU 103 or DU 105), and each radio unit instance in an RU 106. For example, the ETHERNET switch may be an aggregation switch 111 or a switch 113, either of which implements a DPI entity 109. The ETHERNET switch may be communicatively coupled to BC(s) 104, DU(s) 105, CU(s) 103, and/or RU(s) 106 that form a C-RAN 100 (or a portion of a C-RAN 100). Furthermore, in some configurations, the ETHERNET switch implementing the method 1800 may be communicatively coupled to at least one other switch. For example, if an aggregation switch 111 implements the method 1800, it may be communicatively coupled to (1) at least one switch 113; and (2) BC(s) 104, DU(s) 105 and/or CU(s) 103. Alternatively, if an aggregation switch 111 implements the method 1700, it may be communicatively coupled to (1) at least one RU 106; and (2) BC(s) 104, DU(s) 105 and/or CU(s) 103. As another example, if a switch 113 implements the method 1800, it may be communicatively coupled to (1) an aggregation switch 111; and (2) at least one RU 106. Other configurations are possible.

The blocks of the flow diagram shown in FIG. 18 have been arranged in a generally sequential manner for ease of explanation; however, it is to be understood that this arrangement is merely exemplary, and it should be recognized that the processing associated with method 1800 (and the blocks shown in FIG. 18) can occur in a different order (for example, where at least some of the processing associated with the blocks is performed in parallel and/or in an event-driven manner). Also, most standard exception handling is not described for ease of explanation; however, it is to be understood that method 1800 can and typically would include such exception handling.

The method 1800 begins at step 1802 where RU begins a discovery process (e.g., upon powering up) and sends an ETHERNET broadcast packet. At step 1804, each radio unit instance (RPI) is assigned an RUid by one or more BCs 104 (or DUs 105 or CUs 103), e.g., via a SOAP connection with one of the radio unit instances. Additionally, an E-UTRA Absolute Radio Frequency Channel Number (EARFCN), various L1 and ETHERNET parameters of the radio unit instances may also be configured. At step 1806, each RPI will inform the ETHERNET switch of its downlink multicast IP address range of interest, UDP port number range of interest and the RUID (32/64 bit value) of interest. In some examples, a filter rule (e.g., a forwarding rule) is setup for each radio unit instance (RPI), e.g., using IGMP to join a multicast group. If a switch gets a request to add a join, it will update its table (e.g., routing table). At step 1808, the ETHERNET switch will periodically poll each RPI to determine if their rule still exists. The RU will respond to retain the rule. At step 1810, when the connection with the BC 104 (or CU 103 or DU 105) is lost or the carrier is deleted, the RU will inform the ETHERNET switch to release the rule it set up. If there is no response to the ETHERNET switch's periodic poll, it will delete the rule.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for a fronthaul interface for use with a C-RAN. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a cloud radio access network (C-RAN), comprising: a plurality of remote units (RUs), each being configured to exchange radio frequency (RF) signals with at least one user equipment (UE); a central unit communicatively coupled to the plurality of RUs via a fronthaul interface, the central unit being configured to: determine sets of data to be sent to a plurality of RUs across the fronthaul interface; determine a mapping of each of the sets of data to at least one of the plurality of RUs; add a respective indicator, based on the mapping, to each set of data, wherein each respective indicator indicates each RU that the respective set of data is intended for; and broadcast the sets of data, each with the respective indicator, to the plurality of RUs.

Example 2 includes the C-RAN of Example 1, wherein the central unit is a Distributed Unit (DU) configured to operate in a 3GPP Fifth Generation communication system.

Example 3 includes the C-RAN of any of Examples 1-2, wherein the central unit is a baseband controller configured to operate in a 3GPP Long Term Evolution (LTE) communication system.

Example 4 includes the C-RAN of any of Examples 1-3, wherein each respective indicator is a respective bitmask comprising a plurality of bit positions, where each bit position corresponds to a respective one of the plurality of the RUs.

Example 5 includes the C-RAN of Example 4, wherein a length of each respective indicator is predetermined and configured during initial configuration of the C-RAN, wherein the length of each respective indicator is one of: 0 bits long; and a number of bits equal to a number of the plurality of RUs.

Example 6 includes the C-RAN of any of Examples 1-5, wherein when a particular bit in the respective indicator of a particular set of data is set, the corresponding RU decodes the particular set of data.

Example 7 includes the C-RAN of any of Examples 1-6, wherein when a particular bit in the respective indicator of a particular set of data is not set, the corresponding RU does not decode the particular set of data.

Example 8 includes the C-RAN of any of Examples 1-7, wherein the mapping is based on physical resource block (PRB) groups in the C-RAN.

Example 9 includes the C-RAN of any of Examples 1-8, wherein the mapping is based on frequency reuse layers in the C-RAN.

Example 10 includes the C-RAN of any of Examples 1-9, wherein the mapping of a particular set of data is based on the at least one channel to which the particular set of data relates to.

Example 11 includes the C-RAN of any of Examples 1-10, wherein the fronthaul interface utilizes an ETHERNET network comprising at least one switch.

Example 12 includes a method performed by a central unit in a cloud radio access network (C-RAN), the method comprising: determining sets of data to be sent to a plurality of RUs across a fronthaul interface of the C-RAN, wherein the plurality of RUs are communicatively coupled to the central unit via the fronthaul interface; determining a mapping of each of the sets of data to at least one of the plurality of RUs; adding a respective indicator, based on the mapping, to each set of data, wherein each respective indicator indicates each RU that the respective set of data is intended for; and broadcasting the sets of data, each with the respective indicator, to the plurality of RUs.

Example 13 includes the method of Example 12, wherein the central unit is a Distributed Unit (DU) configured to operate in a 3GPP Fifth Generation communication system.

Example 14 includes the method of any of Examples 12-13, wherein the central unit is a baseband controller configured to operate in a 3GPP Long Term Evolution (LTE) communication system.

Example 15 includes the method of any of Examples 12-14, wherein each respective indicator is a respective bitmask comprising a plurality of bit positions, where each bit position corresponds to a respective one of the plurality of the RUs.

Example 16 includes the method of Example 15, wherein a length of each respective indicator is predetermined and configured during initial configuration of the C-RAN, wherein the length of each respective indicator is one of: 0 bits long; and a number of bits equal to a number of the plurality of RUs.

Example 17 includes the method of any of Examples 12-16, wherein when a particular bit in the respective indicator of a particular set of data is set, the corresponding RU decodes the particular set of data.

Example 18 includes the method of any of Examples 12-17, wherein when a particular bit in the respective indicator of a particular set of data is not set, the corresponding RU does not decode the particular set of data.

Example 19 includes the method of any of Examples 12-18, wherein the mapping is based on physical resource block (PRB) groups in the C-RAN.

Example 20 includes the method of any of Examples 12-19, wherein the mapping is based on frequency reuse layers in the C-RAN.

Example 21 includes the method of any of Examples 12-20, wherein the mapping of a particular set of data is based on the at least one channel to which the particular set of data relates to.

Example 22 includes the method of any of Examples 12-21, wherein the fronthaul interface utilizes an ETHERNET network comprising at least one switch.

The invention claimed is:

1. A system, comprising:
a plurality (N) of remote units (RUs), each being configured to exchange radio frequency signals with at least one user equipment (UE);
a centralized unit having circuitry and communicatively coupled to the plurality of remote units via a fronthaul network; and
an entity having at least one processor configured to perform deep packet inspection, the entity communicatively coupled to the centralized unit via the fronthaul network;
wherein the centralized unit is configured to transmit sets of data to the plurality of remote units across the fronthaul network in packets, each of the sets of data mapped to at least one of the plurality of remote units and each of the packets including a respective bitmask with N bits indicating each remote unit the associated packet is intended for, wherein there is a one-to-one mapping between the N RUs and the N bits in the respective bitmask, each bit mapped to a unique single RU;
wherein a first bitmask indicates two or more RUs a first packet with user plane data is intended for by setting the corresponding two or more of the N bits in the first bitmask;
wherein the entity is configured to perform the deep packet inspection on the packets in order to determine each remote unit the packets are intended for and communicate each packet to each remote unit the packet is intended for over the fronthaul network.

2. The system of claim 1, wherein the centralized unit is a Distributed Unit (DU) configured to operate in a Third Generation Partnership Project (3GPP) Fifth Generation communication system.

3. The system of claim 1, wherein the centralized unit is a baseband controller configured to operate in a Third Generation Partnership Project (3GPP) Long Term Evolution (LTE) communication system.

4. The system of claim 1, wherein the entity comprises one or more switches in the fronthaul network.

5. The system of claim 1, wherein the entity comprises a Fronthaul Manager (FHM).

6. The system of claim 5, wherein the entity is configured to combine uplink packet streams from the plurality of remote units before sending to the centralized unit.

7. The system of claim 1, wherein the fronthaul network is a switched ETHERNET network.

8. The system of claim 1, wherein the plurality of remote units and the centralized unit are part of a same cell.

9. The system of claim 1, wherein multiple sets of data are transmitted in a single packet, at least two of the multiple sets of data intended for different sets of the N RUs.

10. The system of claim 1, wherein the plurality of remote units perform Layer 1 processing for an air interface used to communicate with the at least one UE.

11. A method performed in a system that comprises a plurality (N) of remote units, the plurality of remote units being configured to exchange radio frequency signals with at least one user equipment (UE), the system also comprising a centralized unit communicatively coupled to the plurality of remote units via a fronthaul network and an entity configured to perform deep packet inspection, the entity communicatively coupled to the centralized unit and the plurality of remote units via the fronthaul network, the method comprising:
  transmitting, from the centralized unit, sets of data to the plurality of remote units across the fronthaul network in packets, each of the sets of data mapped to at least one of the plurality of remote units and each of the packets including a respective bitmask with N bits indicating each remote unit the associated packet is intended for, wherein there is a one-to-one mapping between the N RUs and the N bits in the respective bitmask, each bit mapped to a unique single RU;
  wherein a first bitmask indicates two or more RUs a first packet with user plane data is intended for by setting the corresponding two or more of the N bits in the first bitmask; and
  performing, by the entity, the deep packet inspection on the packets in order to determine each remote unit the packets are intended for and communicate each packet to each remote unit the packet is intended for over the fronthaul network.

12. The method of claim 11, wherein the centralized unit is a Distributed Unit (DU) configured to operate in a Third Generation Partnership Project (3GPP) Fifth Generation communication system.

13. The method of claim 11, wherein the centralized unit is a baseband controller configured to operate in a Third Generation Partnership Project (3GPP) Long Term Evolution (LTE) communication system.

14. The method of claim 11, wherein the entity comprises one or more switches in the fronthaul network.

15. The method of claim 11, wherein the entity comprises a Fronthaul Manager (FHM).

16. The method of claim 15, further comprising combining, at the entity, uplink packet streams from the plurality of remote units before sending to the centralized unit.

17. The method of claim 11, wherein the fronthaul network is a switched ETHERNET network.

18. The method of claim 11, wherein the plurality of remote units and the centralized unit are part of a same cell.

19. The method of claim 11, wherein multiple of the plurality of remote units in a same cell each transmit to a different UE on a same frequency at a same time.

20. The method of claim 11, further comprising performing, at the plurality of remote units, Layer 1 processing for an air interface used to communicate with the at least one UE.

* * * * *